(12) United States Patent
He

(10) Patent No.: US 11,579,621 B2
(45) Date of Patent: Feb. 14, 2023

(54) AUTOMATED RESTAURANT

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 880 days.

(21) Appl. No.: 16/515,050

(22) Filed: Jul. 18, 2019

(65) Prior Publication Data
US 2020/0159188 A1 May 21, 2020

Related U.S. Application Data

(60) Provisional application No. 62/769,047, filed on Nov. 19, 2018.

(51) Int. Cl.
| | | |
|---|---|---|
| *G05D 22/00* | (2006.01) | |
| *G05D 1/02* | (2020.01) | |
| *B25J 9/00* | (2006.01) | |
| *B25J 5/00* | (2006.01) | |
| *B62D 61/00* | (2006.01) | |
| *A47J 36/32* | (2006.01) | |
| *A47J 44/00* | (2006.01) | |
| *A47J 47/14* | (2006.01) | |
| *G05B 19/416* | (2006.01) | |
| *G06Q 30/0601* | (2023.01) | |
| *G06Q 50/12* | (2012.01) | |

(52) U.S. Cl.
CPC ............ *G05D 1/0246* (2013.01); *A47J 36/32* (2013.01); *A47J 44/00* (2013.01); *A47J 47/14* (2013.01); *B25J 5/007* (2013.01); *B25J 9/0003* (2013.01); *B62D 61/00* (2013.01); *G05B 19/416* (2013.01); *G06Q 30/0633* (2013.01); *G06Q 50/12* (2013.01); *G05B 2219/2637* (2013.01); *G05B 2219/32029* (2013.01)

(58) Field of Classification Search
CPC ......... G05D 1/0246; A47J 36/32; A47J 44/00; A47J 47/14; B25J 5/007; B25J 9/0003; B62D 61/00; G05B 19/416; G05B 2219/2637; G05B 2219/3202; G06Q 30/0633; G06Q 50/12
See application file for complete search history.

(56) References Cited

U.S. PATENT DOCUMENTS 10,455,987 B1 * 10/2019 He .......................... A47J 27/14

FOREIGN PATENT DOCUMENTS

WO    WO-2019026027 A1 *   2/2019   .............. A47J 43/04

* cited by examiner

*Primary Examiner* — Adam M Alharbi

(57) ABSTRACT

The present application discloses an automated restaurant comprising: a kitchen; a customer-tracking area comprising a dining area; and a plurality of vehicles. The kitchen comprises a storage apparatus to store ingredient containers, a transfer apparatus to move ingredient containers, and one or more cooking stations. Each vehicle is configured to move one or more food containers from cooking stations to dining tables. A tracking system comprises cameras, lidars, etc., which are fixedly mounted. The tracking system can dynamically map out the fixtures, humans and vehicles in the restaurant. Information from the tracking system is used to control the motion of the vehicles. The tracking system can dynamically track the positions of customers in the customer-tracking area, so that foods ordered by specific customers may be automatically sent by vehicles to the customers' locations.

20 Claims, 58 Drawing Sheets

Store sub-programs in the first computer 901, wherein each sub-program is configured to control some of the electric or electronic devices connected to the first computer 901 and second computers 902, Store the IDs of second computers in the first computer 901, Install a database in the first computer 901. 710

Store a menu which is a list of prepared foods. For each prepared food, store a recipe comprising a "list of container content types and numbers and relative timings," and a "list of cooking sub-programs and relative timings" where each sub-programs controls the timing and functions of the electric or electronic devices in the cooking station, and each sub-program comprises a start time, where the start time for the first sub-program is set to be zero. 711

Store the information of the storage apparatus 192, including a list of positions for the containers of food ingredients. 712

For each position of the container in the storage apparatus 192, and for each position of the container holder in each cooking station, store a "list of transport and cap-opening sub-programs" for controlling the electric and electronic devices in the container transfer apparatuses 600, so that a container in the position in the storage apparatus 192 is transferred out, and has its cap removed and then is transferred to the position to the cooking station. 713

Figure 16B

Create a "list of containers of food ingredient in the storage apparatus," wherein the list has the information of the position of each container of food ingredient, and the list also has the information of the content in each container. 721

When an inquiry is made for a prepared food, read the "list of ingredient container types and numbers and timings" of the prepared food, and determine if there are enough containers of each type in the "list of containers of food ingredients in the storage apparatus." If yes, then allow an order for the prepared food. If not, then do not allow an order for the prepared food. 722

When an order for a prepared food is made, determine the positions of the needed containers in the storage apparatus, and remove these containers from the "list of containers of food ingredients in the storage apparatus." 723

Schedule the following: (1) the cooking of the next ordered food at the next available cooking station; (2) for each container of food ingredient that is needed for cooking the ordered food, the position of the container in the storage apparatus 192, and the position of the container holder to hold the container on the container transfer apparatus 600 of the "next available cooking station" as scheduled in Part (1). 724

Add the following to the "list of instructions" on the first computer 901: (1) the "list of cooking sub-programs" of the ordered food item, with time substituted by the scheduled start time; (2) the "list of transport and cap-opening sub-programs" with specified start times as scheduled in Step 724, 725

Let the first computer 901 run the "list of instructions" and thus control the various apparatuses in the automated kitchen. 726

Figure 16C

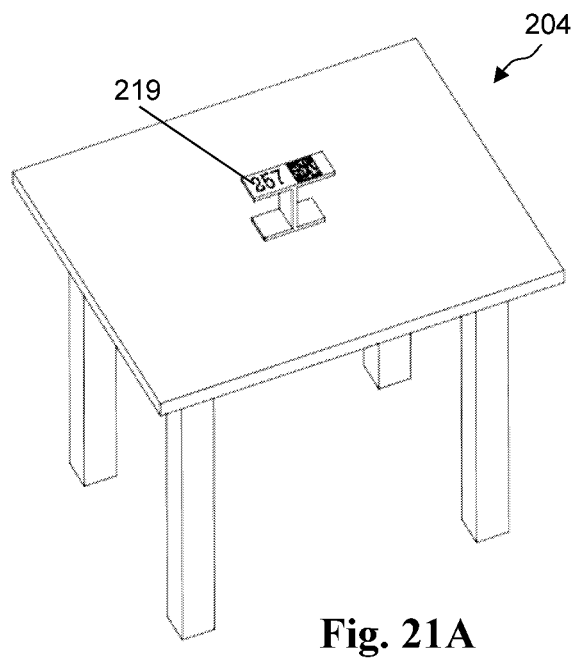
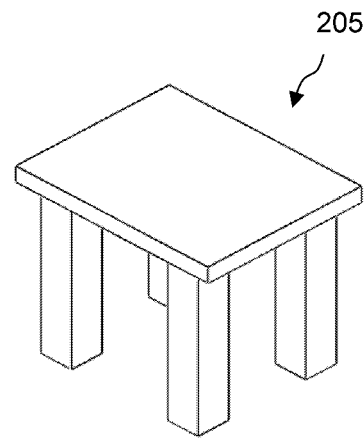
Fig. 21A
Fig. 21B
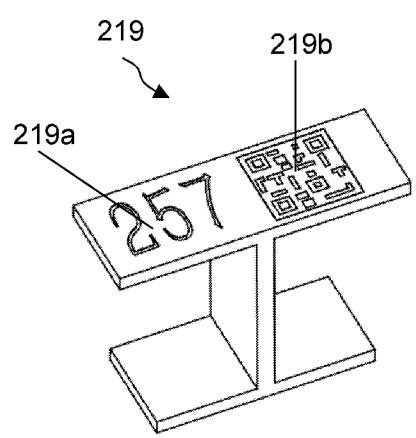
Fig. 21C
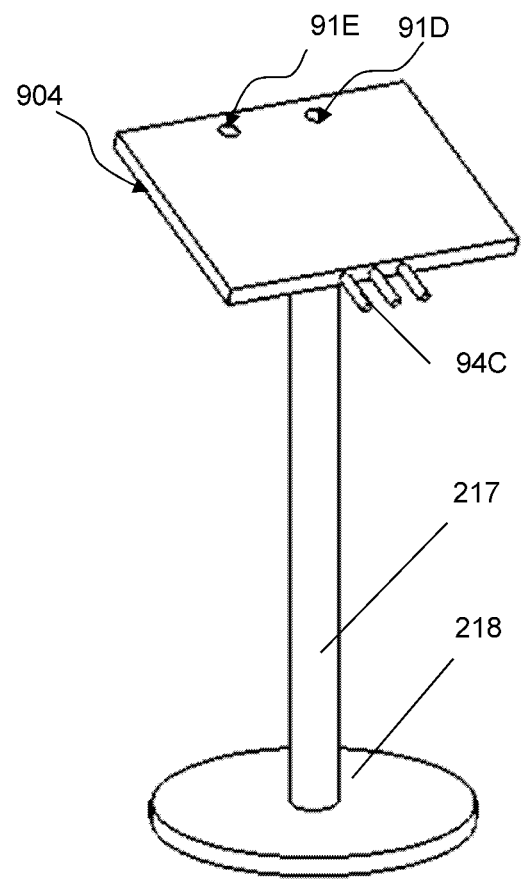
Fig. 21D

| Create and store (in the computer system, same below) a 3-dimensional map of the floors, walls, doors, and fixtures of the restaurant in the first computer 901. 801 |
|---|

↓

| Store the information of the movable furniture in the first computer 901 and second computers 902. 802 |
|---|

↓

| Assign a unique ID to each dining table, and store the information of each table in the first computer 901 and second computers 902. 803 |
|---|

↓

| Store information, including technical information, of all cameras, lidars and radars in the computer system. Measure positions of all cameras, lidars and radars, and store the positions' information in the first computer 901. 804 |
|---|

↓

| Assign a unique ID to each vehicle, and store the information of the marking of each vehicle according to the vehicle's ID. Store other information of the vehicles in the first computer 901 and second computers 902. 805 |
|---|

↓

| Move each vehicle so that the central axis passes through each point of a dense net on the floors of the restaurant, place the vehicle in various orientations by rotating the vehicle by an incremental angle. Then let lidars, radars and cameras capture images of the vehicle, and have the images sent to in the first computer 901. Measure the positions of the three distinguished points of the vehicle. Store the information of the dense net and various orientations, and store the positions which are dependent on the point of the dense net, and dependent on the orientation of the vehicle in the first computer 901. 806 |
|---|

↓

| Assign a unique ID to each employee. Capture images of all employees by cameras, lidars and radars, and store the images in the computer system for each employee according to the employee's ID in the first computer 901. 807 |
|---|

↓

| With no human and no vehicle in the restaurant, let cameras, lidars and radars capture images in their ranges, and store the images in the first computer 901. Do this under various light conditions, by turning on various sets of lights in the restaurant. Do this during different times of the day, and under various weather conditions. 808 |
|---|

↓

| The first computer 901 stores a computational program to use coordinates of the images of the three distinguished points of a marked vehicle in the image frame of a camera to compute the coordinates of the distinguished points. 809 |
|---|

Figure 25

From the moment the restaurant opens its doors to any person (whether customer or employee), until the restaurant closes: dynamically analyze digital images captured by lidars, radars and cameras to classify all movable objects, including vehicles and persons. Continuously analyze the digital images as to continuously determine the positions of all movable objects, and to determine if the movable object is a person, a vehicle or other object. Continuously analyze the digital images to determine if a person is entering the area 207 or if a person is leaving the area 207. Continuously analyze the digital images in combination with ordering, food serving, and payment information if person has placed an order, and if the person has been fully served the ordered food, and if the person has fully paid for an order placed. Do all of the above until the restaurant closes. 811

The computer is configured to store the following lists:"1st list," which lists persons in the area 207 who has not placed an order; "2nd list," which lists persons who placed orders but the orders are not fully serviced or not fully paid; "3rd list," which lists persons in the "2nd list" who are not presently in the area 207; "4th list," which lists of persons in the area 207 whose orders are fully serviced and fully paid. When a person enters or re-enters the area 207, simultaneously perform the procedure described in the next box. 812A

The customers in the 1st list, the 2nd list and 3rd list are dynamically tracked by the computer system. When the food ordered by a customer is cooked, the food will be moved from the kitchen by a vehicle to a location near the location of the customer at time of food delivery . 812B

Figure 27A

Store the positions of the support components 237 and 494 of each cooking station in the first computer 901 and second computers 902. Store the "receiving position" of each vehicle, i.e. the position at which the vehicle may receive food containers from the dish transfer apparatus 420 of each cooking stations, in the first computer 901 and second computers 902. 821

Divide the dining area into parts for furniture area and walkway area, and store the map of the division. The computer system comprises a program to plan possible "major routes" for the vehicles from each receiving position to each part of the dining area. Store the information of the major routes in the first computer 901 and second computers 902. 822

Store the information of the marked plates 138a, 138b, 138c, 138d, ..., in the second computers 902. 823

Measure the positions of the marked plates 138a, 138b, 138c, 138d, ..., and store the information in the second computers 902. 824

Measure the positions of the sensors 91A, 91K and 91X of each vehicle, and store the information in the second computer 902 of the vehicle. 825

Measure the positions of the cameras 91D and 91E of each vehicle, and store the information in the second computer 902 of the vehicle . 826

Figure 28

The first computer 901 schedules a task for a marked vehicle to receive containers of cooked food from specific cooking stations, then transport the containers to a position near the customer who ordered these. In particular, the first computer 901 assigns a container holder on the marked vehicle for each container of cooked food to be transported. 831

↓

The first computer 901 determines a route for the marked vehicle from the current position to the cooking stations, and then to the position near the customer. 832

↓

The first computer 901 informs the second computer 902 of the marked vehicle of the route, and timing for the marked vehicle to stop at the cooking stations in order to receive containers of cooked food. 833

↓

The sensors of the marked vehicle are in operation from this moment until the scheduled task is finished, and continuously send signals to the second computer 902. 834

↓

The second computer 902 determines the next move for the marked vehicle, and then sends signals to the motors 81A and 81B to rotate anti-synchronously for an angle, so that the moving direction agrees with the moving direction of the assigned route at that position. 835

↓

The first computer 901, relying on the image analysis program, determines the length of "safe distance" on the route for the marked vehicle to move from the current position, and sends this information to the second computer 902 of the marked vehicle. 836

↓

The second computer 902 sends signals to the motors 81A and 81B to move synchronously by an angle so that distance traveled by the marked vehicle is less than the "safe distance." 837

↓

Go back to Step 835, until the vehicle completes the scheduled route. 838

Figure 29

A customer goes into the customer-tracking area 207 of the automated restaurant 170. He/she may place an order in the customer-tracking area 207, using a computer 904. The first computer 901 comprises programs to analyze the digital images captured by the tracking system 209 of the automated restaurant 170 as to track the customer, 851

↓

The first computer 901 tracks the dynamical motion of the person, so that the first computer 901 may determine the position of the person, and/or the ID of the table used by the customer. 852

↓

The first computer 901 schedules the cooking of each food ordered at a cooking station 150 and sends signals to the electrical or electronic devices of automated kitchen 160 as to cook the food at the cooking station. 853

↓

The first computer 901 schedules delivery of cooked food from a cooking station to a position near the customer, or near the table used by the customer. 854

↓

The dish transfer apparatus 420 of the cooking station 150 grips the food container 182 on the turntable 566 of the receiving apparatus 507 and transfer it to a container holder 159 of the marked vehicle 103X (or 103Y, 103Z) of the dish transport system 208. 855

↓

The marked vehicle 103X of the dish transport system 208 transfers the food container 182 from the kitchen room to a position near the said table 204 which is used by the customer. 856

↓

A person may remove the container(s) of cooked food(s) from the marked vehicle 103X (or 103Y, 103Z). The vehicle then moves to a storage area, or to work on the next task. 857

Figure 31

The computer 901 is configured to be connected to a local WIFI network. A customer uses a smart phone 906. The smart phone gets connected to the computer 901 by the WIFI network. 861

Each QR code on the displays 219 has a unique specific information identifying the location of the QR code. A customer may start a first program in the smart phone 906 to scan the QR code on a display 219. Said scanning will lead the customer to install and/or open a second program upon the customer's acceptance. Said second program is configured to record both the time of the QR code scanning and the unique information contained in the QR code. At the same time, digital images taken by the cameras of the restaurant of the person and of the surroundings of the QR code are saved in the memories of the computer system 903B. The digital images are indexed by the times of their taking. 862

The second program is configured to allow a customer to make an order of food items and to pay for the order. When the customer places an order using the 2nd program with the smart phone 906, the information of the time of the QR code scanning, as well as the information contained in the QR code are sent to the computer 901. The details of the order placed are also sent to the computer 901. 863

The computer 901 uses the information received from the smart phone 906, to figure out the time and the position of the QR code when the customer scanned the QR code; and thus the position of the customer at the time of scanning the QR code; and thus the identity of the cameras that are directed to the position of the QR code and the customer at the time. . 864

The computer system 903B is configured to identify the customer from various lists of people in the restaurant, and move the customer to the 2nd list; and also in the 3rd list if the customer is temporarily outside of the customer-tracking area 207. 865

As before, the customer is tracked and when the food ordered by the customer is cooked, the food will be sent by a vehicle to a location near the location of the customer at time of food delivery. 866

Figure 32

AUTOMATED RESTAURANT

This application claims the benefit of U.S. Provisional Applications, Ser. No. 62/769,047 filed Nov. 19, 2018. Entire contents of the above application are incorporated herein by reference.

CROSS-REFERENCE TO RELATED APPLICATIONS

U.S patent application:
Ser. No. 15/921,908, Filed Mar. 15, 2018; Inventor: Zhengxu He.
U.S. Provisional Patent Application:
Ser. No. 62/769,047, Filed Nov. 19, 2018, Inventor: Zhengxu He.

BACKGROUND OF THE INVENTION

The present application relates to an automated restaurant comprising a kitchen and a customer-tracking area. The kitchen comprises automated cooking apparatus configured to cook a food. The customer-tracking area comprises a dining area. Controlled vehicles may transport cooked foods from cooking stations of the kitchen to the customer-tracking area. The positions of customers in the customer-tracking area may be computed by a dynamical tracking system comprising lidars, radars, cameras, computers, etc. The position information of customers can be useful for efficiently transporting cooked foods to the customers by controlled vehicles. Our restaurant is fully automated and saves labor cost.

BRIEF SUMMARY OF THE INVENTION

Our automated restaurant comprises a kitchen and a customer-tracking area, located in a building or structure. The customer-tracking area may comprise a dining area where customers may consume cooked foods. Our automated restaurant comprises vehicles configured to move cooked foods from the kitchen to the customer-tracking area.

The kitchen may comprise one or more cooking stations, each comprising one or more of the following: a cooking apparatus comprising a cookware and a stirring motion mechanism which produces a motion in the cookware as to stir, mix or distribute the food or food ingredients contained in the cookware; an ingredient dispensing apparatus configured to dispense food ingredients into the cookware; a cooked food dispensing apparatus configured to dispense a cooked food from the cookware into a food container; a receiving apparatus which may receive a cooked food from the cookware via the cooked food dispensing apparatus; a dish loading apparatus configured to move a food container from the receiving apparatus to a vehicle.

A vehicle may comprise one or more of the following: a pair of universal wheel devices; a pair of drive wheels, and a pair of motors each configured to produce a rotation of one of the drive wheels; one or more container holders each configured to position or hold a food container; an orientation sensor; a proximity sensor. A vehicle may also comprise a (flat or curved) surface with a marking printed on the surface, wherein the marking on the surface may be used to identify the specific vehicle. The vehicle is configured to transfer one or more food containers from the kitchen to the customer-tracking area, wherein the food containers are configured to contain or otherwise hold cooked foods.

Our automated restaurant may also comprise a tracking system comprising one or more of the following: a lidar configured to dynamically scan the customer-tracking area, as to map out the positions and shapes of the fixtures, humans, vehicles; a lidar configured to dynamically scan the outside of the restaurant as to track customers who have made an order and have gone out; a radar configured to dynamically scan the customer-tracking area as well, as to map out the fixtures, humans, vehicles; a plurality of cameras which are fixedly mounted in the restaurant building. Each camera is configured to capture digital images of objects in a range.

Each apparatus or mechanism of the automated restaurant may comprise: (1) electrical or electronic devices including but not limited to: motors, refrigeration mechanisms, shut-off valves; inductive or other types of stoves, vacuum generators, etc.; (2) sensors including but not limited to encoders, pressure sensors, locational sensors, infrared sensors, ultrasonic sensor, temperature sensors or other sensors.

The automated restaurant may also comprise a computer system comprising a first computer (e.g. a server or a workstation) and a plurality of second computers (e.g., microcontrollers or PLCs), wherein the second computer are connected to the first computer as to allow the second computers to communicate with the first computer. A second computer may comprise i/o ports which are connected to some electrical or electronic devices and sensors so that the second computer may send electrical or electronic signals to the electrical or electronic devices and may receive electrical or electronic signals from the sensors.

In another general aspect, the present invention relates to some algorithms which may control the electrical or electronic devices via the computers.

These and other aspects, their implementations and other features are described in detail in the drawings, the description and the claims.

BRIEF DESCRIPTION OF THE SEVERAL VIEWS OF THE DRAWINGS

FIG. 16B is a flow chart showing a process of preparations by the automated kitchen in accordance with the present invention.

FIG. 16C is a flow chart showing a process of cooking a prepared food by the automated kitchen.

FIGS. 20-22 show aerial views of parts of the automated restaurant.

FIG. 25 is a flow chart showing a process of preparations before the automated restaurant opens for business.

FIGS. 27A-27C are flow charts showing a process of tracking persons in the customer-tracking area of the automated restaurant.

FIG. 28 is a flow chart showing a process of preparations before a marked vehicle moving.

FIG. 29 is a flow chart showing a process of transporting cooked foods from cooking stations to a table where a customer who ordered these by a marked vehicle.

FIG. 31 is a flow chart showing a general process of the automated restaurant.

FIG. 32 is a flow chart showing a general process of the automated restaurant.

DETAILED DESCRIPTION OF THE INVENTION

For the present patent application, a motor comprises a powered mechanism configured to produce a relative motion between two members. A motor may be of different type depending on power source, e.g., electric, hydraulic, pneumatic etc. A computer may be configured to control a motor, e.g. to control the timing, direction and speed of the motion.

The location of a wheel is meant to include the information on the position of the axis of the wheel, as well as the information on the location of the space occupied by the wheel. The location of the wheel is considered unchanged if the wheel is rotated around its own axis.

In many applications, a motor comprises a base component (e.g., a frame) which is a stationary member of the motor, and a shaft which is a moving member of the motor, so that the powered mechanism of the motor is configured to produce a rotation of the shaft relative to the base component around the axis of the shaft. However, it is not a requirement that a motor must comprise a shaft.

Similarly, an encoder may comprise a base component, and a shaft which is rotatable relative to the base component, where the encoder can detect the degrees of rotation of the shaft relative to the base component, and then inform a computer of the degree by sending signals to the computer.

For the purpose of present patent application, the information on the position of an object includes the information on the positions of all points of the object. The position of the object is changed if any point of the rigid body is moved.

Our automated restaurant comprises various parts, such as: a computer system comprising a first computer and a plurality of second computers; a kitchen comprising one or more cooking stations, each cooking station comprising a cooking apparatus, an ingredient dispensing apparatus, a cooked food dispensing apparatus, a receiving apparatus, a dish loading apparatus; a dish transport system comprising a plurality of vehicles; a tracking system comprising one or more lidars, one or more radars, a plurality of cameras, etc. These parts and their assemblies will be described in detail in FIGS. 1A-24.

Figure 1A:
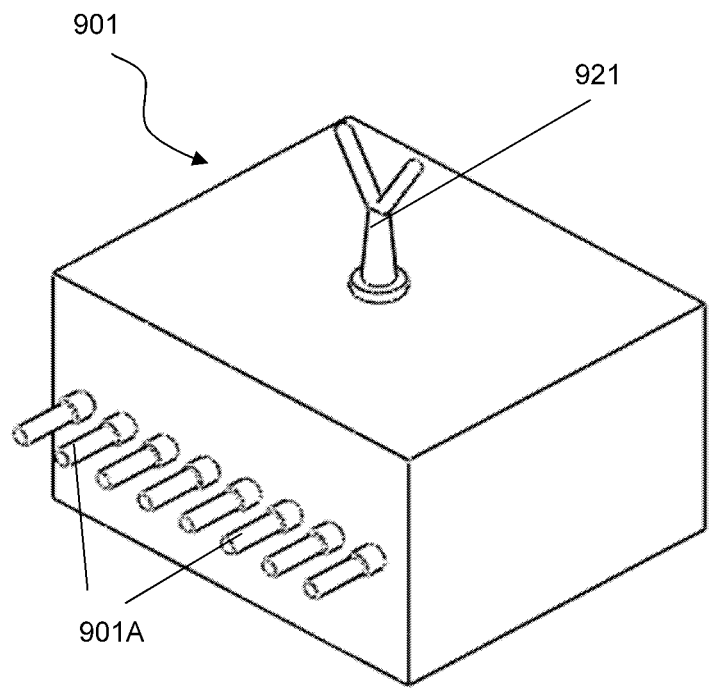
FIG. 1A shows an aerial view of a first computer which comprises a plurality of input/output ports and a wireless communication device.

Referring to FIG. 1A, a first computer 901 comprises a plurality of input/output ports 901A. The input/output ports 901A can be connected via wires or by wireless means to various electronic or electric devices, such as radars, lidars, cameras, encoders, proximity sensors, orientation sensors, infrared sensors, and other types of sensors, etc. The input/output ports 901A also may be connected to electrical or electronic devices, such as motors, stoves, refrigeration mechanisms etc. The first computer 901 further comprises a wireless communication device 921 configured to send and receive wireless signals. The first computer 901 may control the operations of the electrical or electronic devices by sending wired or wireless signals to the electrical or electronic devices. The first computer 901 comprises hardware and software so it can communicate with various electronic or electric devices via wireless communication through the wireless communication device 921. In fact, the first computer 901 may comprise a computer server and a plurality of programmable logic controllers which are connected to the computer server so that the server and the programmable logic controllers may communicate with each other. The first computer 901 further comprises memories configured to store data or information.

For the purpose of present patent application, wireless signals may optionally be electromagnetic signals, optical signals, ultra-sound signals, or other types of wireless signals.

Figure 1B:
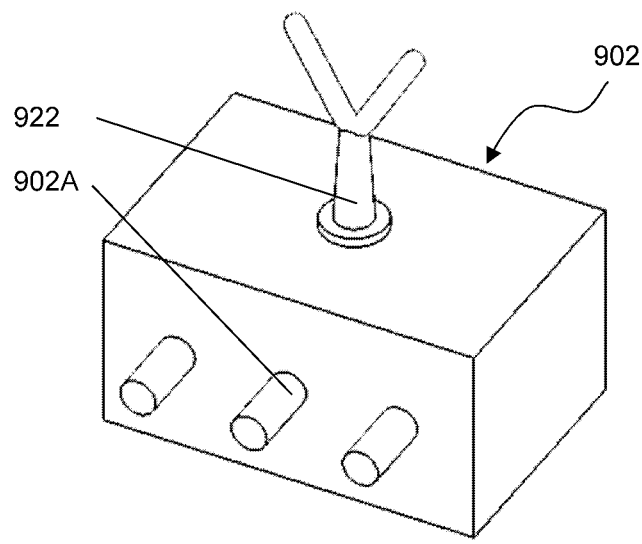
FIG. 1B shows an aerial view of a second computer which comprises a plurality of input/output ports and a wireless communication device.

Referring to FIG. 1B, a second computer 902 comprises a plurality of input/output ports 902A. The input/output ports 902A may be connected via wires or by wireless means to electronic or electric devices, such as radars, lidars, cameras, proximity sensors, orientation sensors, infrared sensors, and other sensors, etc. The input/output ports 902A may also be connected to electrical or electronic devices such as, motors. The second computer 902 may control the operations of the electrical or electronic devices by sending signals to the electrical or electronic devices. The second computer 902 further comprises a wireless communication device 922 configured to receive wireless signals from the first computer 901, and to send wireless signals to the computer 901. The second computer 902 further comprises hardware and software so it can communicate with various electronic or electric devices via wireless communication through the wireless communication device 922. The second computer 902 further comprises memories configured to store data or information.

The second computer 902 may comprise a programmable logic controller, or in short, PLC. Alternatively, the second computer 902 may comprise a microcontroller, a computer with an embedded system, or a circuit board comprising a microcomputer and a plurality of electronic or electric components.

Figure 2A:
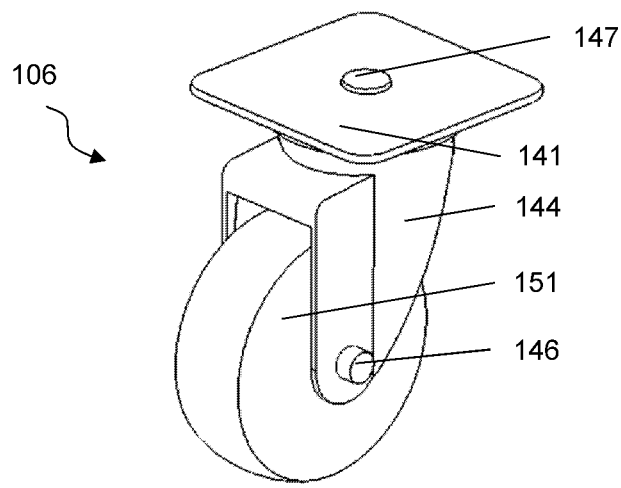
FIG. 2A shows an aerial view of a universal wheel device.

Referring to FIG. 2A, a universal wheel device 106 comprises: shafts 146 and 147, wherein the axis of the shaft 146 is configured to be perpendicular to the axis of the shaft 147, and the axes of the shafts 146 and 147 are not coplanar (or equivalently, the axes of the shafts 146 and 147 do not intersect at a point); a support component 141; a support component 144; a wheel 151. The support component 144 is rigidly connected to the shaft 147. The shaft 147 is constrained to rotate relative to the support component 141 around the axis of the shaft 147. Hence, the support component 144 is constrained to rotate relative to the support component 141 around the axis of the shaft 147. The wheel 151 is configured to be fixedly connected to (and concentric with) the shaft 146. The wheel 151 is constrained to rotate relative to the support component 144 around the axis of the shaft 146.

Figure 2B:
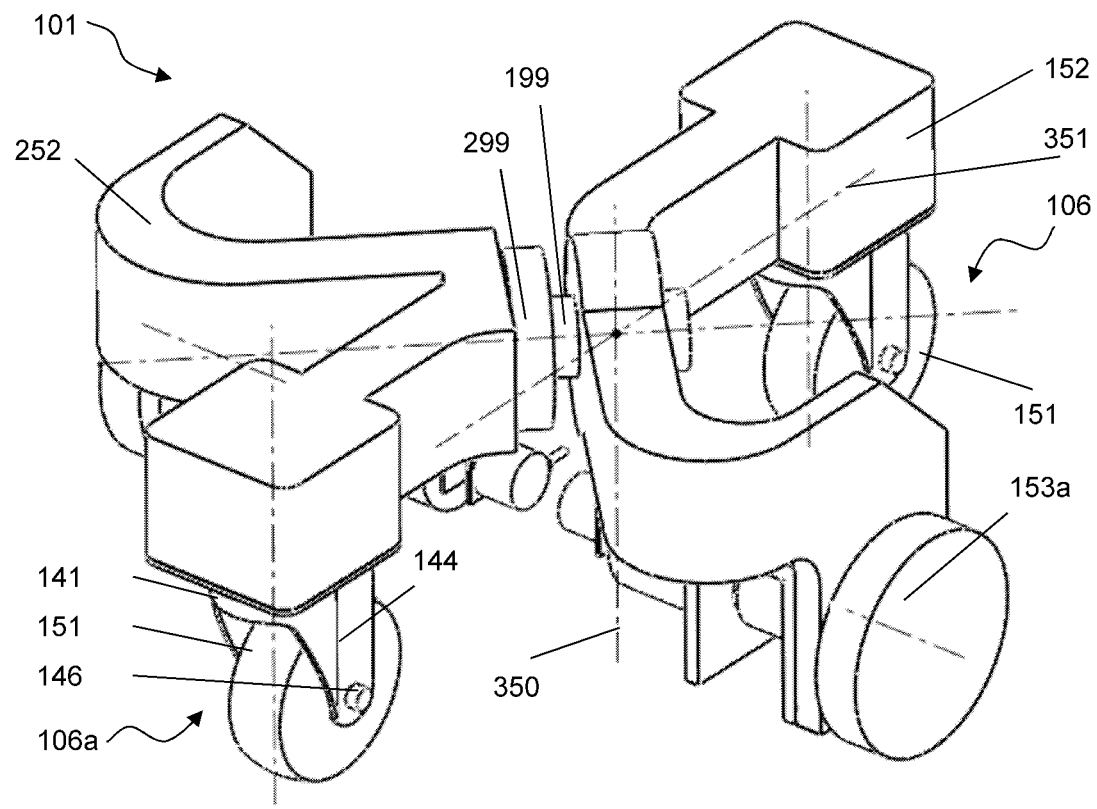
FIG. 2B show an aerial view of a moving apparatus.
Figure 2C:
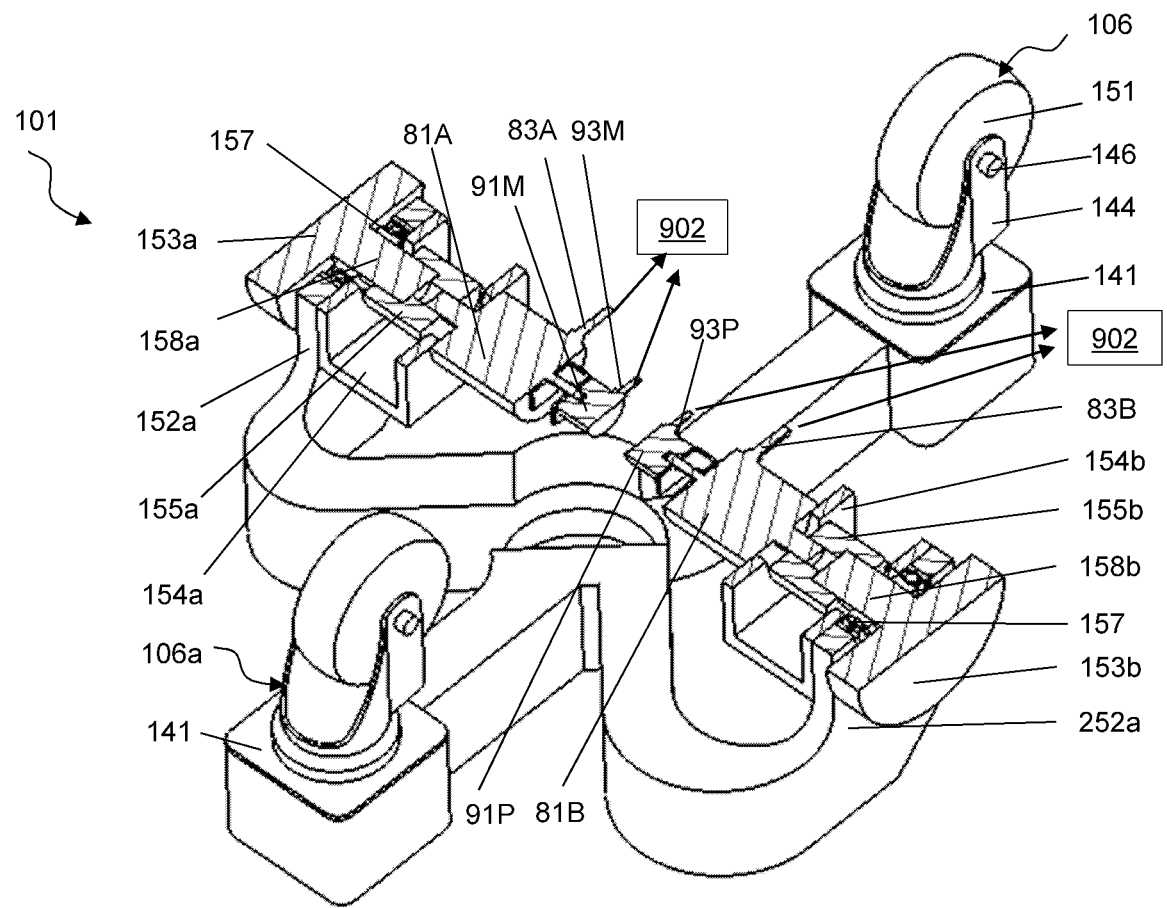
FIG. 2C shows a cut view of the moving apparatus.

Referring to FIGS. 2B-2C, a moving apparatus 101 comprises: a first universal wheel device 106 and a second universal wheel device 106a; a first support component 152 comprising a bearing housing 152a; a second support component 252 comprising a bearing housing 252a; wherein the second universal wheel device 106a is constructed the same way as the first universal wheel device 106. In particular, the second universal wheel device 106a comprises the same components as the universal wheel device 106. The support component 141 of the first universal wheel device 106 is rigidly connected to the first support component 152, so that the support component 144 of the first universal wheel device 106 is constrained to rotate relative to the first support component 152 around the axis of the shaft 147. Similarly, the support component 141 of the second universal wheel device 106a is rigidly connected to the second support component 252, so that the support component 144 of the second universal wheel device 106a is constrained to rotate relative to the second support component 252 around the axis of the shaft 147 of the second universal device 106a.

The first support component 152 further comprises a shaft 199; and a second support component 252 comprises a bearing housing 299. Some bearings (hidden in figures) are configured to connect the shaft 199 and the bearing housing 299 so that the first support component 152 is constrained to rotate relative to the second support component 252 around the axis of the shaft 199.

The moving apparatus 101 further comprises: a first drive wheel 153a and a second drive wheel 153b; two shafts 158a and 158b; two connectors 154a and 154b; two couplings 155a and 155b; a first motor 81A and a second motor 81B, wherein each motor comprises a base component and a shaft. The first drive wheel 153a and the second drive wheel 153b are configured to be identical to each other. In particular, the radius of the first drive wheel 153a is equal to the radius of the second drive wheel 153b. The first drive wheel 153a is rigidly connected to the shaft 158a and the axis of the first drive wheel 153a is configured to coincide with the axis of the shaft 158a. A bearing 157 is configured to connect the shaft 158a to the bearing housing 152a of the first support component 152, so that the shaft 158a is constrained to rotate relative to the first support component 152 around the axis of the shaft 158a. Hence, the first drive wheel 153a is constrained to rotate relative to the first support component 152 around the axis of the shaft 158a. Similarly, the second drive wheel 153b is rigidly connected to the shaft 158b, and the axis of the second drive wheel 153b is configured to coincide with the axis of the shaft 158b. Another bearing 157 is configured to connect the shaft 158b to the bearing housing 252a of the second support component 252, so that the shaft 158b is constrained to rotate relative to the second support component 252 around the axis of the shaft 158b. Hence, the second drive wheel 153b is constrained to rotate relative to the second support component 252 around the axis of the shaft 158b. The base component of the first motor 81A is fixedly connected to the first support component 152 via the connector 154a, and the shaft of the first motor 81A is fixedly connected to the shaft 158a via the coupling 155a. Thus, the first motor 81A may drive a rotation of the shaft 158a and the first drive wheel 153a relative to the first support component 152 around the axis of the shaft 158a. The base component of the second motor 81B is fixedly connected to the second support component 252 via the connector 154b, and the shaft of the second motor 81B is fixedly connected to the shaft 158b via the coupling 155b. Thus, the second motor 81B may drive a rotation of the shaft 158b and the second drive wheel 153b relative to the second support component 252 around the axis of the shaft 158b. The moving apparatus 101 further comprises a first encoder 91M and a second encoder 91P each of which comprises a base component. The base component of the first encoder 91M is fixedly connected to the base component of the first motor 81A, and the first encoder 91M is configured to detect the angle change in the rotation produced by the first motor 81A. The base component of the second encoder 91P is fixedly connected to base component of the second motor 81B and the second encoder 91P is configured to detect the angle change in the rotation produced by the second motor 81B.

When the moving apparatus 101 is placed on a horizontal floor, so that all four wheels 153a, 153b, 151 touch the floor, then: the axis of the first drive wheel 153a and the axis of the second drive wheel 153b are configured to coincide; the axis of the shaft 199 is configured to be horizontal; and the axes of the wheels 153a, 153b, 151 are configured to be horizontal; the axis of the shaft 147 of the first universal wheel device 106 and the axis of the shaft 147 of the second universal wheel device 106*a* are configured to be vertical; the angle between the axis of the shaft 199 and the axis of the first drive wheel 153*a* is configured to be 45 degrees; and the angle between the axis of the shaft 199 and the vertical plane through the axis of the shaft 147 of the first universal wheel device 106 and the axis of the shaft 147 of the second universal wheel device 106*a* is configured to be 45 degrees; the axis of the shaft 147 of the first universal wheel device 106 and the axis of the shaft 147 of the second universal wheel device 106*a* are both on the middle plane between the first drive wheel 153*a* and the second drive wheel 153*b*; and the vertical line which is middle between the axis of the shaft 147 of the first universal wheel device 106 and the axis of the shaft 147 of the second universal wheel device 106*a* is configured to intersect the axis of the first drive wheel 153*a*.

The first support component 152 of the moving apparatus 101 comprises a line 350 which is defined by the following conditions: (1) the line 350 intersects the axis of the shaft 199 in 90 degrees; (2) the line 350 is perpendicular to the axis of the first drive wheel 153*a*; and (3) the line 350 passes the point of intersection between the axis of the shaft 199 and the plane which passes through the axis of the first drive wheel 153*a* and which is parallel to the axis of the shaft 147 of the first universal wheel device 106. See FIG. 2B. The line 350 will be referred to as the central axis of the moving apparatus 101. The central axis of the moving apparatus 101 is moved together with the rigid motion of the first support component 152 of the moving apparatus 101. When the moving apparatus 101 is placed on a horizontal floor, then: the central axis 350 is the middle line between the axis of the shaft 147 of the first universal wheel device 106 and the axis of the shaft 147 of the second universal wheel device 106*a*; and thus, the central axis 350 intersects the axis of the first drive wheel 153*a* and is equidistant from the first drive wheel 153*a* and the second drive wheel 153*b*.

The first support component 152 further comprises a line 351 which intersects the central axis 350 at 90 degrees, which intersects the axis of the shaft 199 at 45 degrees, and which is perpendicular to the axis of the first drive wheel 153*a*. The line 351 will be referred to as the forward moving axis of the moving apparatus 101.

When the first motor 81A and second motor 81B produce synchronous rotations in the first drive wheel 153*a* and the second drive wheel 153*b*, the moving apparatus 101 moves in the direction which is parallel to the forward moving axis 351 on a horizontal floor (if not counting slippage). When the first motor 81A and second motor 81B produce rotations of different speeds in the first drive wheel 153*a* and the second drive wheel 153*b*, the moving apparatus 101 may move along a circular path (if not counting slippage) on the floor. When the first motor 81A and second motor 81B move in opposite directions and by the same speed, the moving apparatus 101 may rotate around the central axis on the floor (if not counting slippage).

The moving apparatus 101 may also move on a floor which is not flat. Then, the first support component 152 may rotate relative to the second support component 252, and the configuration of the vehicle allows all four wheels to touch the floor. Moreover, some weight of the moving apparatus 101 is placed on each wheel.

It should be noted that the first motor 81A and the second motor 81B may be stepper motors, or servo motors; but this is not a strict requirement. The angle of rotation by either motor may be monitored by a sensor which is connected to a computer.

Figure 3A:
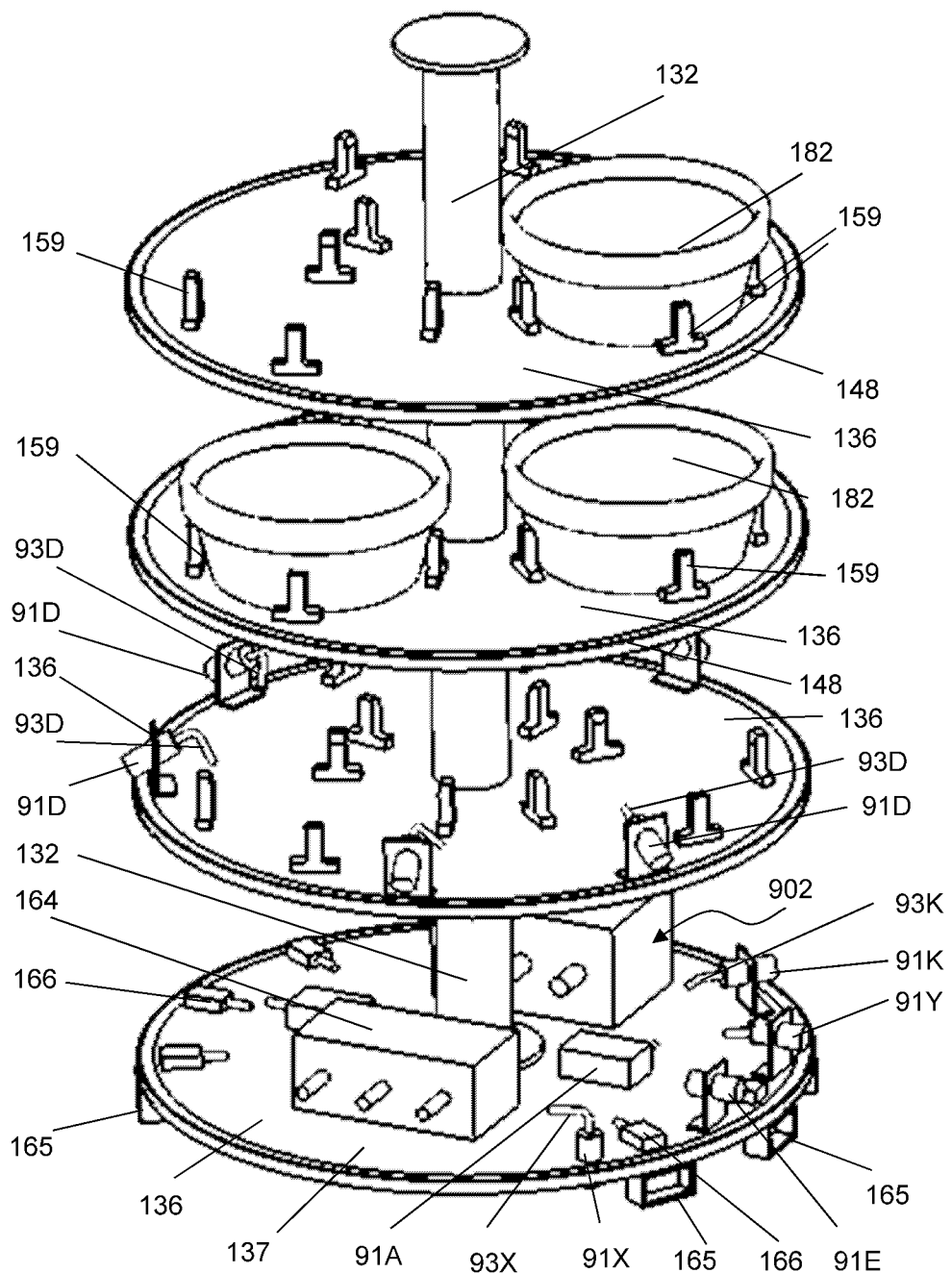
FIG. 3A shows an aerial view of a part of a vehicle body.
Figure 3B:
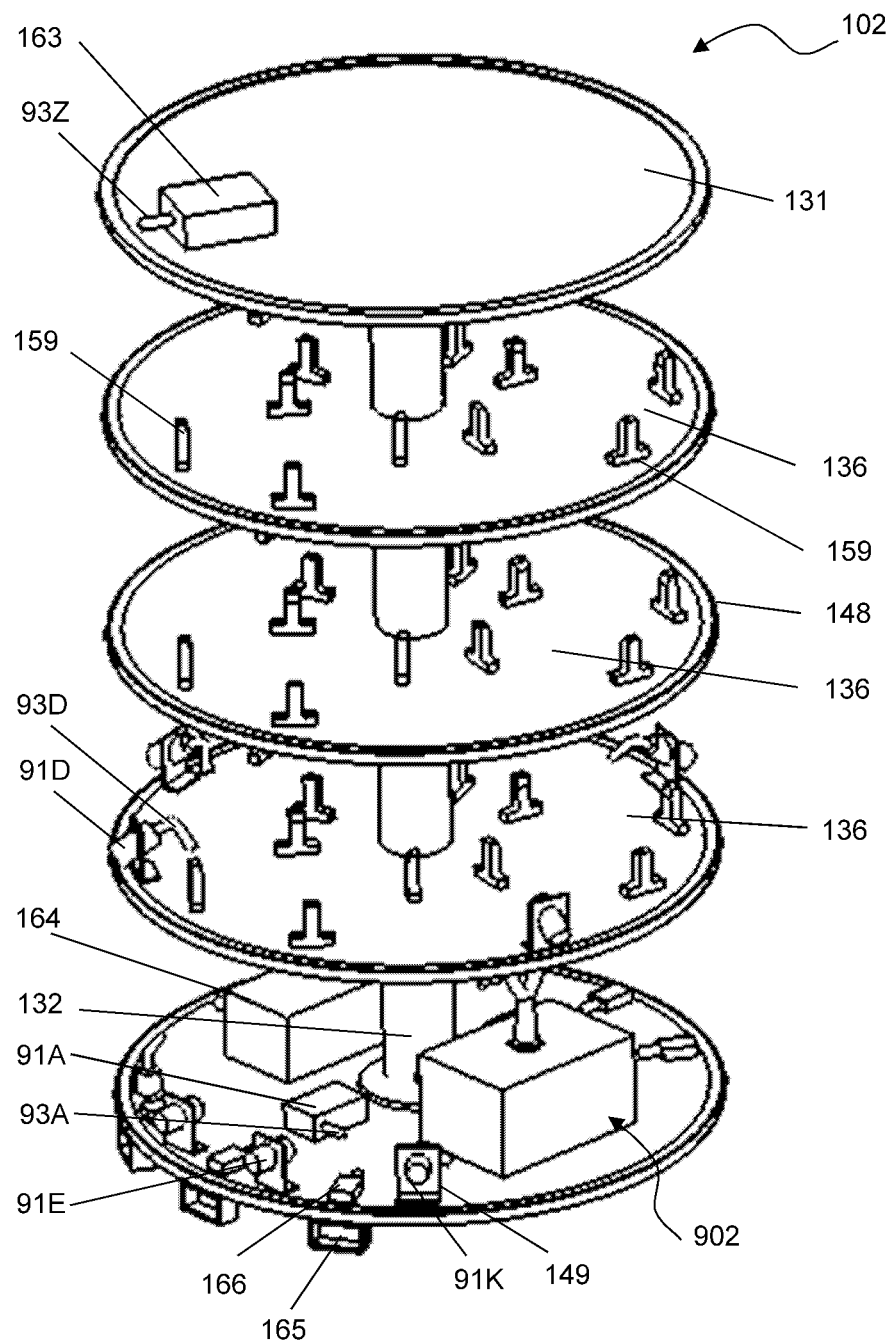
FIG. 3B shows an aerial view of the vehicle body.

Referring to FIGS. 3A-3B, a vehicle body 102 comprises: a support component 137 which is a flat board of round shape; a rigid component 132; flat boards 136 of round shape; an orientation sensor 91A, a second computer 902, a proximity sensor 91K; an infrared sensor 91X; an ultrasonic sensor 91Y; cameras 91E; a rechargeable battery 164; a top board 131; a display 163 on the top board 131. The proximity senor 91K is configured to detect obstacles around the vehicle body 102. The infrared sensor 91X is configured to sense the distance of objects near the sensor; said sensor may be used as a proximity sensor to detect obstacles. The ultrasonic sensor 91Y is configured to sense the distance of objects near the sensor; said sensor may also be used as a proximity sensor to detect obstacles. The support component 137, the flat boards 136 and the top board 131 are configured to be rigidly connected by a rigid component 132. On each flat board 136, there are container holders 159 each configured to position or hold a food container 182. The second computer 902 comprises a wireless communication device 922 which can be used to communicate with the first computer 901. The second computer 902, sensors 91A, 91K, 91X and 91Y, cameras 91E, display 163, rechargeable battery 164 are fixedly mounted on the components 131, 136 or 137. Each of the second computer 902, sensors 91A, 91K, 91X and 91Y, cameras 91E, display 163 comprises electric inlets configured to be connected to the electric outlets of the rechargeable battery 164. The orientation sensor 91A, the proximity sensor 91K, the infrared sensor 91X, the cameras 91E, the display 163 are connected to the second computer 902 via wires 93A, 93K, 93X, 93E and 93Z respectively, as to communicate with the second computer 902 (see FIG. 3C).

The vehicle body 102 further comprises electric light sources 165 which are connected to the rechargeable battery 164 via switches 166, wherein each switch 166 is connected to the second computer 902 so the second computer 902 may control the switch 166 as to switch on or off. The electric light sources 165 are configured to emit beams of light in an area surround the vehicle 103, along the forward moving axis of the moving apparatus 101.

It should be noted that the information received by the second computer 902 from various sensors may be sent to the first computer 901.

It should be noted that the food containers 182 are not part of the vehicle body 102.

Figure 3C:
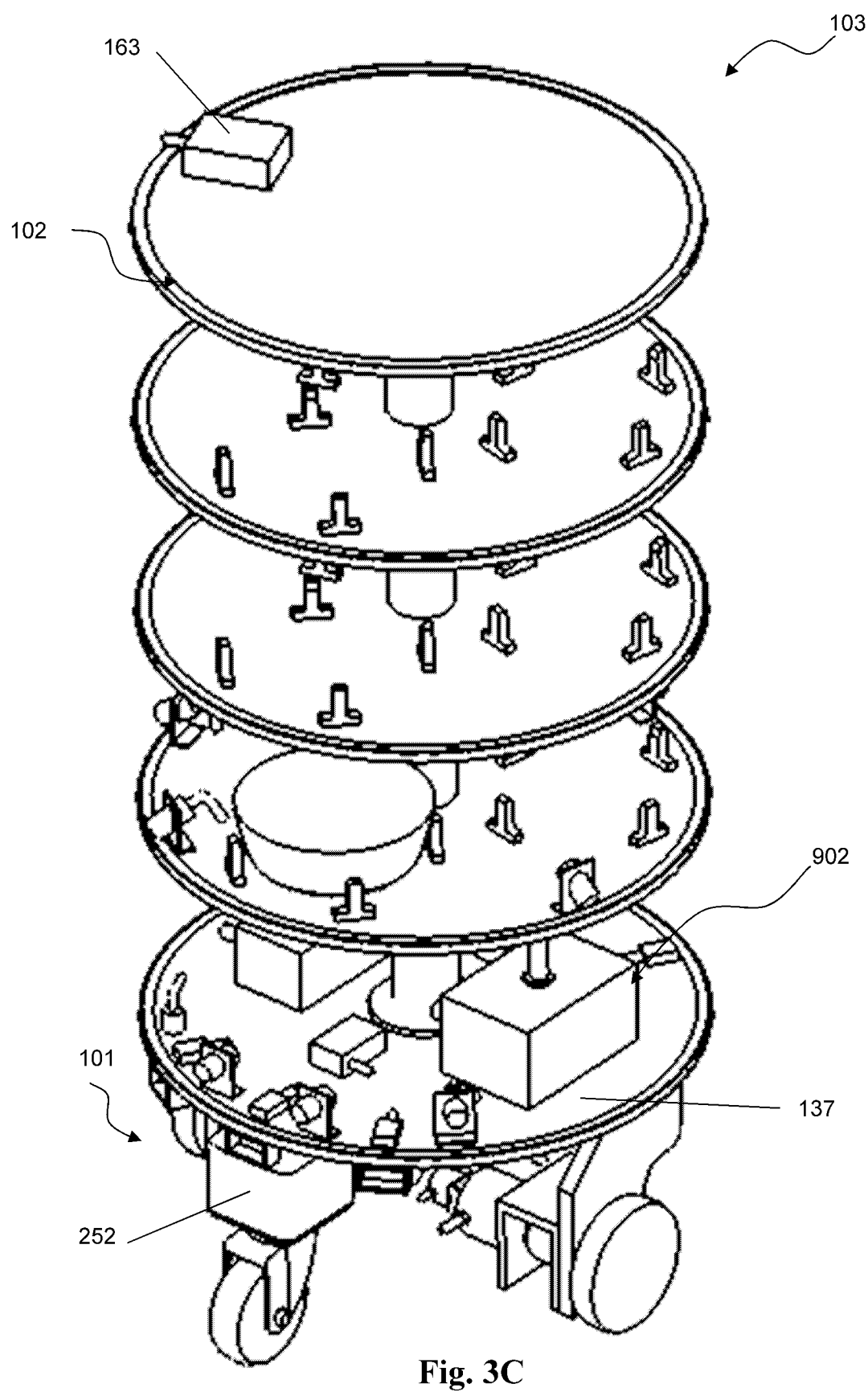
FIG. 3C shows an aerial view of a vehicle comprising the vehicle body.
Figure 3D:
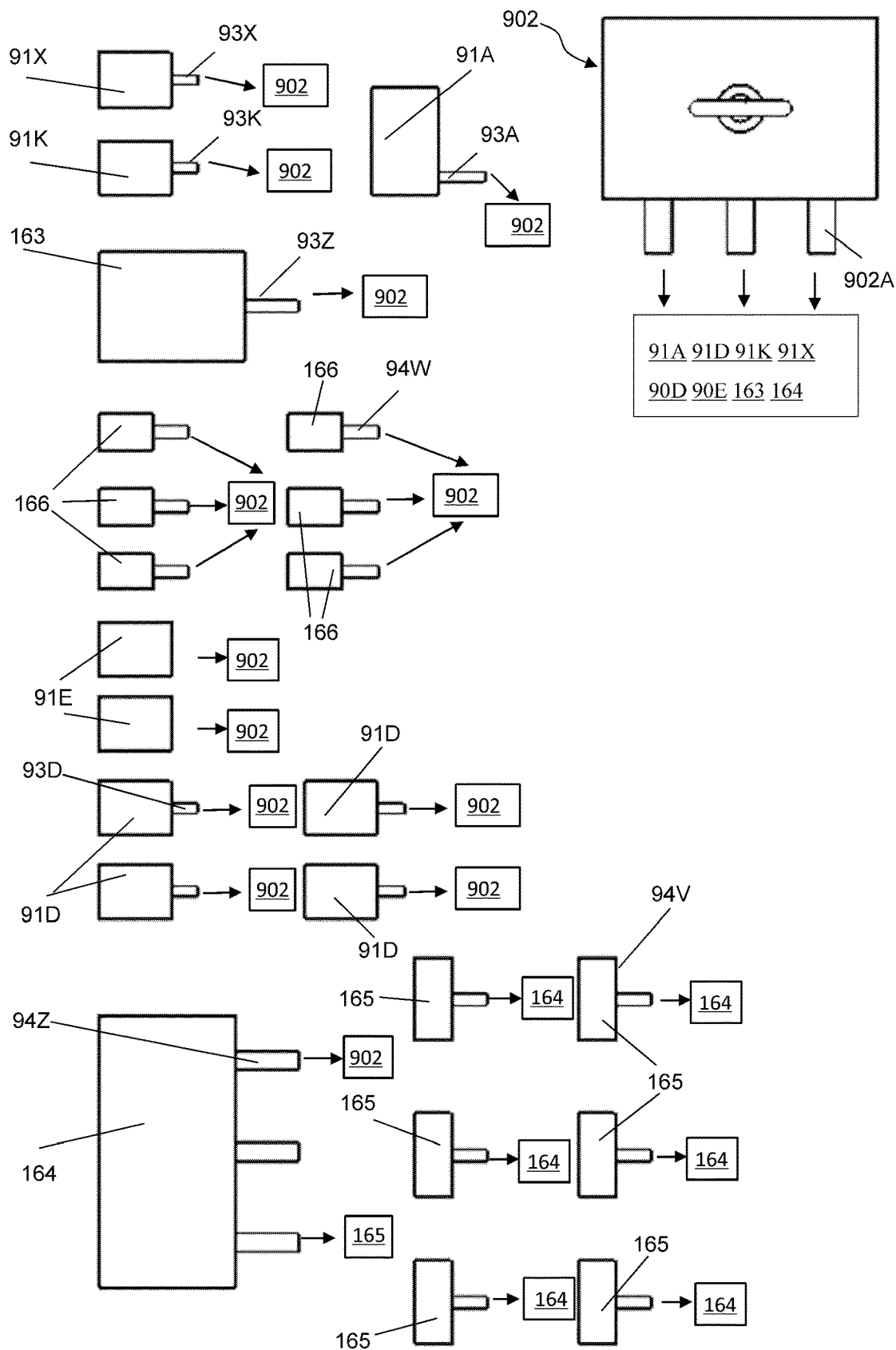
FIG. 3D shows a schematic view of the connections of electric or electronic devices on the vehicle body.

Referring to FIGS. 3C-3D, a vehicle 103 comprise the vehicle body 102 and the moving apparatus 101. The support component 137 of the vehicle body 102 is configured to be rigidly connected to the first support component 152 of the moving apparatus 101. The first motor 81A and the second motor 81B are connected to the second computer 902 via wires 83A and 83B respectively. The second computer 902 may send signals to dynamically control the timing and/or speed of the first motor 81A and second motor 81B. The first encoder 91M and the second encoder 91P of the moving apparatus 101 are connected to the second computer 902 via wires 93M and 93P respectively. The encoders 91M and 91P are configured to send signals to the second computer 902, so the second computer 902 can be informed of the angle change in the rotation produced by the first motor 81A and second 81B via the first encoder 91M and second encoder 91P respectively.

The moving apparatus 101 is configured to move on a floor of a building or structure, and the vehicle body 102 moves with the moving apparatus 101. The second computer 902 may be informed the angle change in the rotation produced by the first motor 81A and second motor 81B via the first encoder 91M and second encoder 91P respectively. The proximity sensor 91K is configured to detect obstacles in the next movement path of the vehicle 103 and then send electric and electronic signals to the second computer 902. The infrared sensor 91X is configured to sense infrared radiation of surrounding objects of the vehicle 103 and then send electric and electronic signals to the second computer 902. The orientation sensor 91A is configured to sense the orientation of the support component 137 as a rigid body relative to some reference system (such as the ground, or a reference system using the magnetic poles of the Earth) and the information are sent to the second computer 902. The second computer 902, is programmed to compute the orientation of the support component 137. In particular, the direction of the central axis of the moving apparatus 101 may be determined by the signals of the orientation sensor 91A.

When the proximity sensor 91K detects some objects in its range, the proximity sensor 91K is configured to send a signal to the second computer 902. The cameras 91E are configured to capture digital range images of the objects around the vehicle 103, as to detect obstacles. The images captured by the cameras 91E are sent to the second computer 902. The second computer 902 comprises an image analysis program configured to analyze the images as to determine if there are obstacles in the moving path of the vehicle 103.

The first support component 152 of the moving apparatus 101 will be referred to as the support component of the vehicle 103. The central axis of the moving apparatus 101 of the vehicle 103 will be referred to as the central axis of the vehicle 103. The forward moving axis of the moving apparatus 101 of the vehicle 103 will be referred to as the forward moving axis of the vehicle 103. The central axis of a vehicle is always vertical when the vehicle is placed on a horizontal floor; and the forward moving axis is always horizontal if the vehicle is placed on a horizontal floor.

The central axis and the forward moving axis of the vehicle 103 are referred to as the central axis and the forward moving axis of the marked vehicle. The forward moving axis has two directions, and one of the directions is chosen to be the positive moving direction of the vehicle 103, and the other direction is the negative moving direction of the vehicle 103. When the vehicle 103 is placed on a flat floor, then as explained earlier, the first and second drive wheels have a same axis, which is perpendicular to the forward moving axis of the vehicle 103. The rotational direction of the first drive wheel of the vehicle 103 is referred to as the positive rotational direction, if the vehicle 103 moves in the positive moving direction of the vehicle 103 under the following assumptions: (1) the vehicle 103 is placed on a flat floor, (2) the first and second drive wheels are both rotating in the positive rotational direction by the same speed; (3) slippage between the wheels and the floor is negligible.

Wired connections among the second computer 902 and the electric or electronic devices in the vehicle 103 are displayed in FIG. 3D.

It should be noted that the orientation sensor 91A of the vehicle 103 may comprise a fusion sensor comprising a combination of some of the following: accelerometer, gyroscope, magnetometer. The orientation sensor 91A may further comprise an inclination sensor configured to measure the direction of the gravitational direction of the Earth relative to a 3-dimensional coordinate system comprising the central axis and the forward moving axis of the vehicle 103 as two of the three orthogonal axes. The orientation sensor 91A may comprise a geomagnetic orientation sensor. The orientation sensor 91A or the second computer 902 may further comprise a filtering program for the computation of the orientation from the signals collected by the devices of the orientation sensor 91A.

Figure 4A:
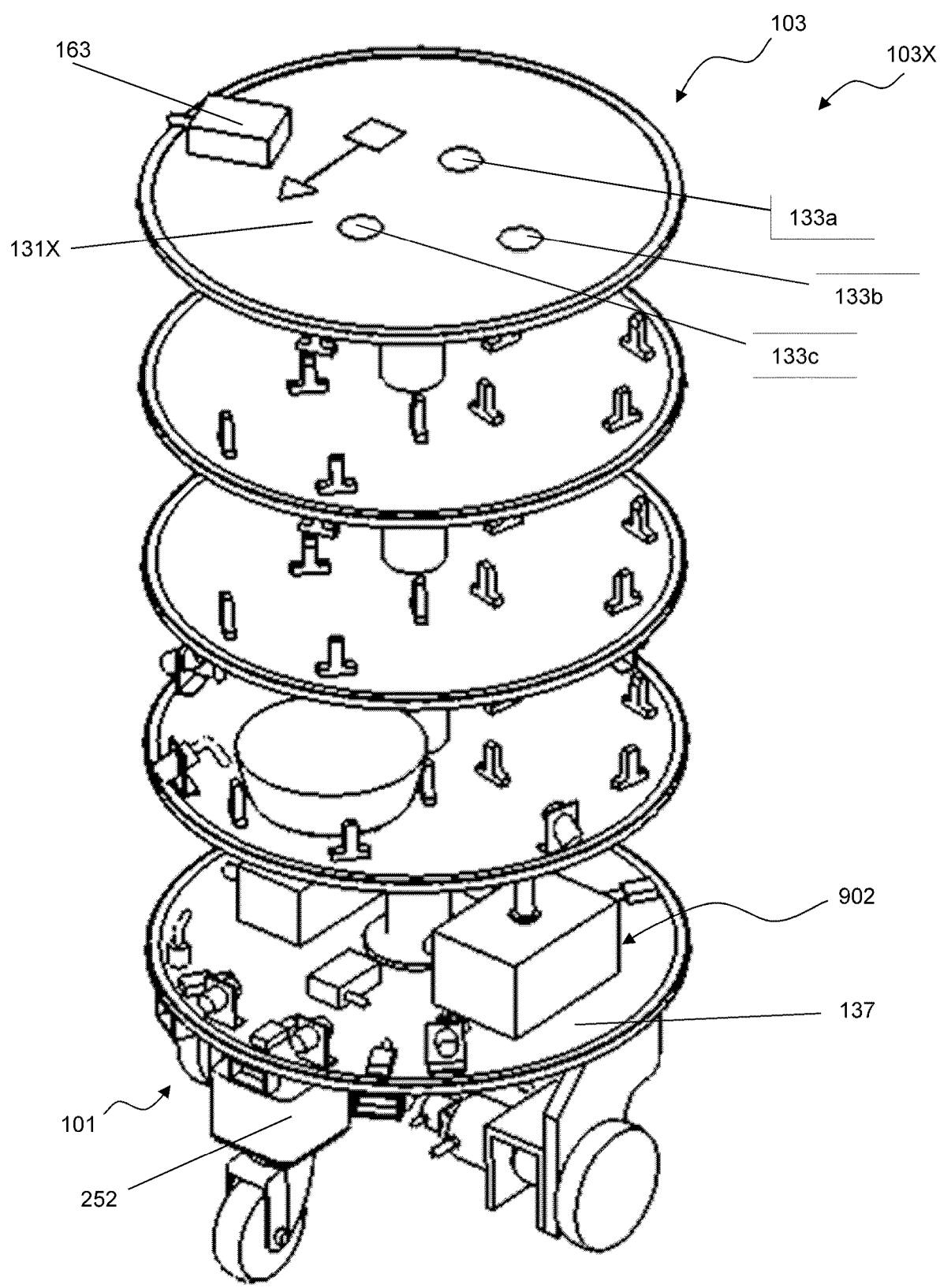
FIG. 4A shows an aerial view of a marked vehicle.

Referring to FIG. 4A, a marked vehicle 103X comprises a vehicle 103 and a marking 131X on the top surface of the flat board 131 of the vehicle body 102 of the vehicle 103. The flat board 131 is configured to be perpendicular to the central axis of the vehicle 103 in our applications. The marking 131X comprises three circles 133a, 133b and 133c which do not overlap with each other, and which do not overlap with other parts of the marking (if any); wherein (the interior of) the circles are each painted in mono-chromatic colors; and the background of the marked surface is configured to be a different monochromatic color. The color of the first circle 133a is referred to as the first color of the marking 131X; the color of the second circle 133b is referred to as the second color of the marking 131X; and the color of the third circle 133c is referred to as the third color of the marking 131X.

Figure 4B:
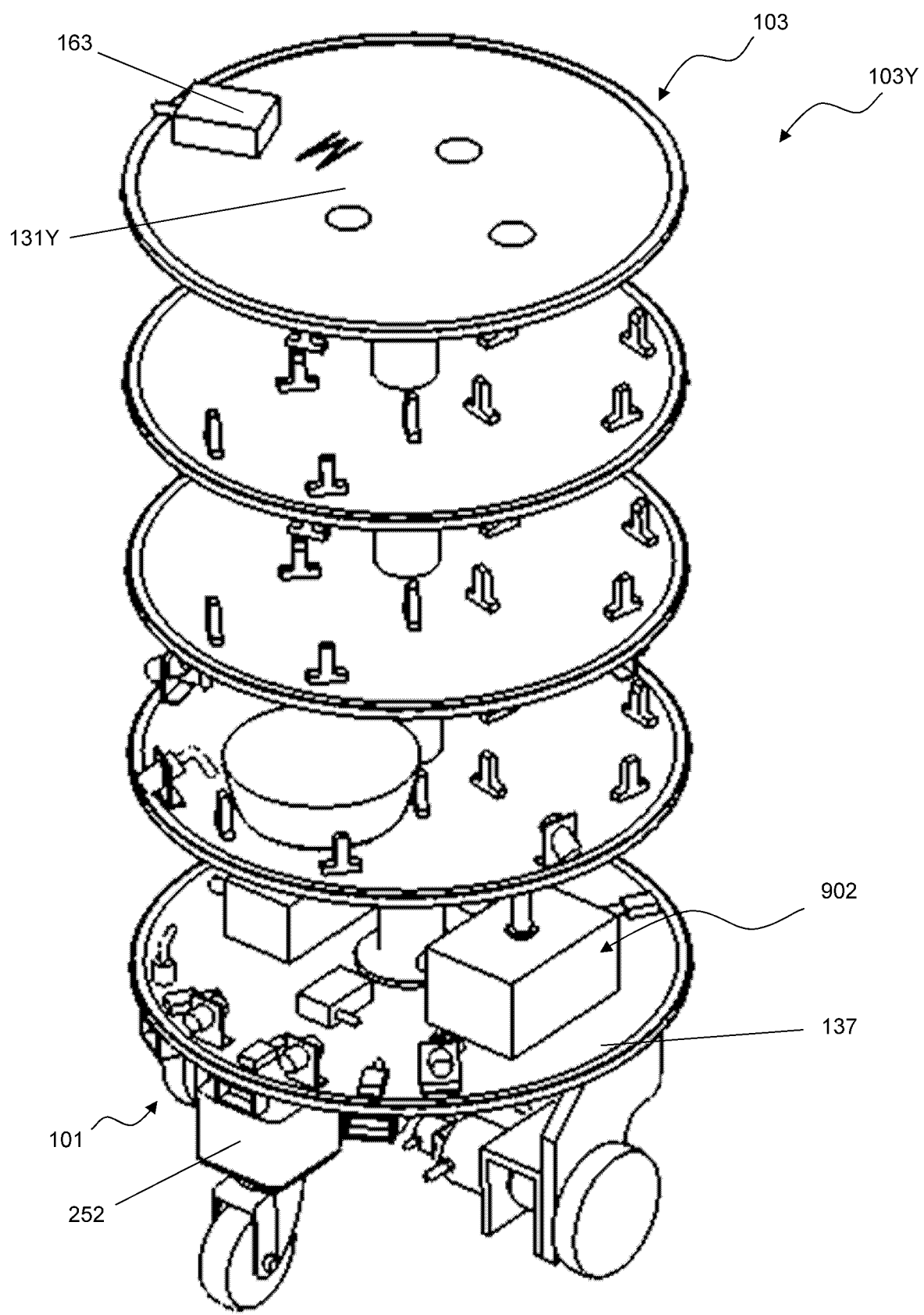
FIG. 4B and FIG. 4C each shows an aerial view of a different marked vehicle.

Referring to FIG. 4B, a marked vehicle 103Y comprises a vehicle 103 and a marking 131Y, wherein the marking 131Y is on the top surface of the flat board 131 of the vehicle 103.

Figure 4C:
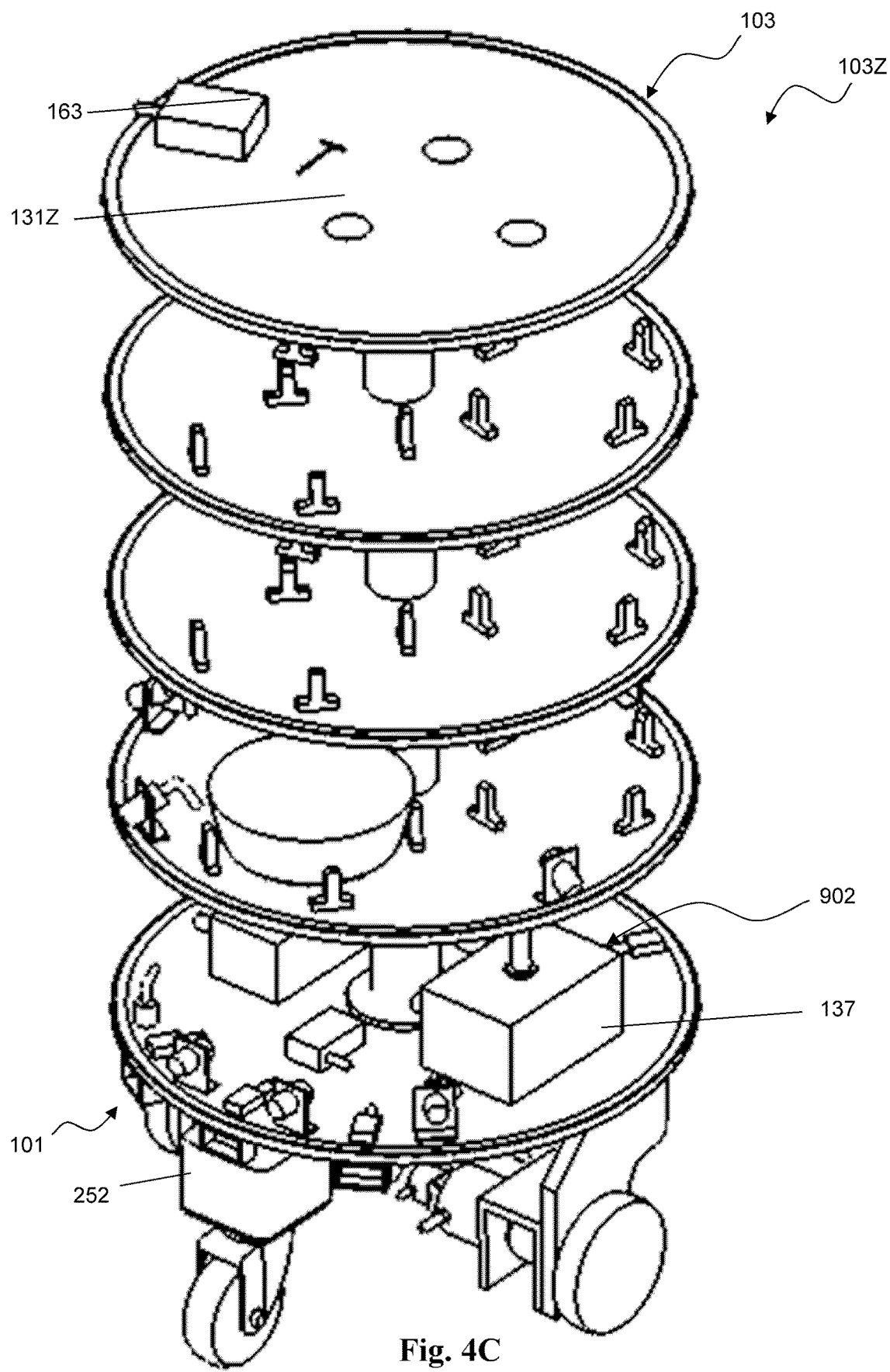

Referring FIG. 4C, a marked vehicle 103Z comprises a vehicle 103 and a marking 131Z, wherein the marking 131Z is on the top surface of the flat board 131 of the vehicle 103.

As in the case of the marking 131X, the marking 131Y (or 131Z) also comprises three mono-chromatic circles in similar locations as the circles 133a, 133b and 133c in the marking 131X. The color of the first circle is referred to as the first color of the marking; the color of the second circle is referred to as the second color of the marking; and the color of the third circle is referred to as the third color of the marking.

For each marked vehicle in our applications, the first color, the second color, the third color of the marked vehicle and the color of the background on the top surface of the flat board 131 of the marked vehicle are configured to be different from each other.

The marking 131X (or 131Y, 131Z) may further comprise a picture or a drawing or a character printed on the surface. The marking may or may not be visible by human eyes. The marking should not have any rotational symmetry. In other words, a rotated image of the marking (by a rotation of an angular degree strictly between 0 and 360 degrees) does not coincide with the marking.

It should be noted that the flat board 131 of a marked vehicle may be substituted by rigid components with a curved surface on the top, and the marking may be printed on the curved surface.

The diameters of the first circle in all markings may be configured to be the same for all marked vehicles; and the position of the first circle on the flat board 131 may be configured to be the same for all vehicles. Same applies to the second circle, or to the third circle of the marked vehicles.

A kitchen system of our restaurant are described in FIGS. 5A-16. The first computer 901 is a part of the kitchen system. The mechanisms or apparatuses or systems of the kitchen system are connected to the first computer 901, as described below.

Figure 5A:
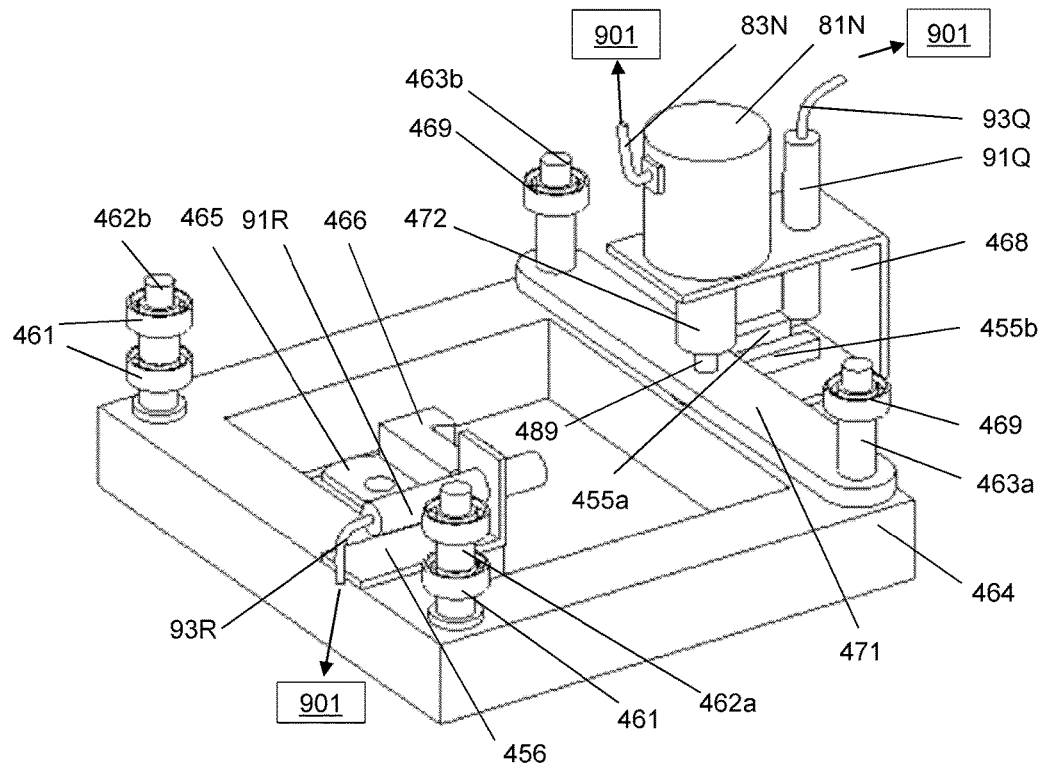
FIG. 5A shows an aerial view of parts of a gripping mechanism.
Figure 5B:
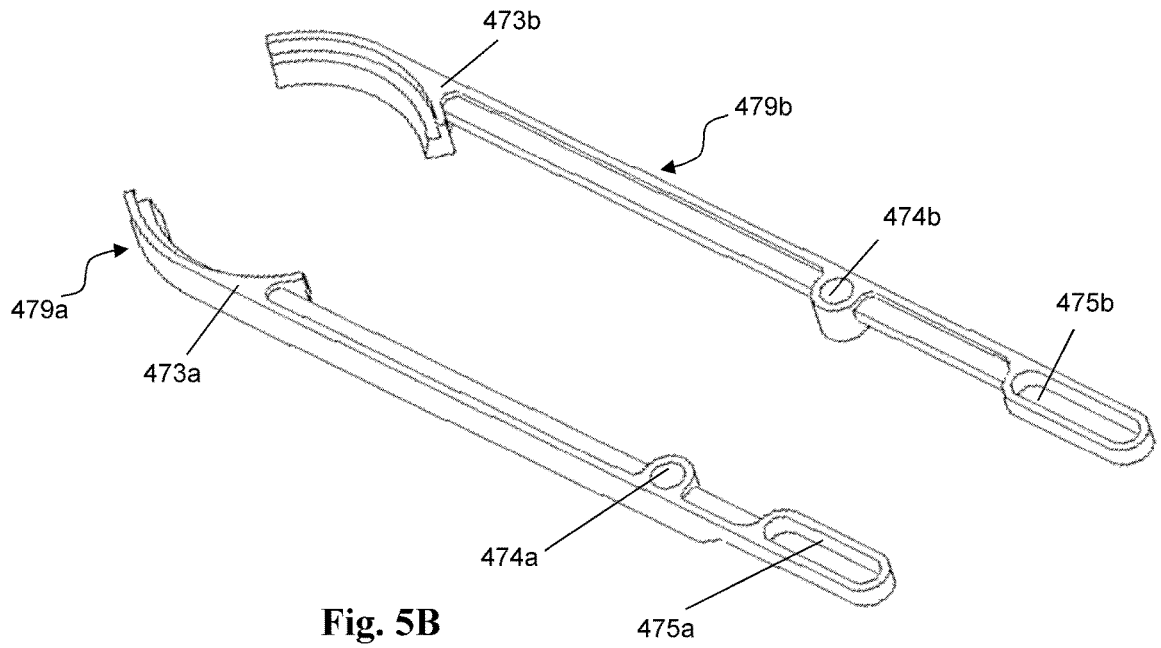
FIG. 5B shows an aerial view of a pair of gripping devices.
Figure 5C:
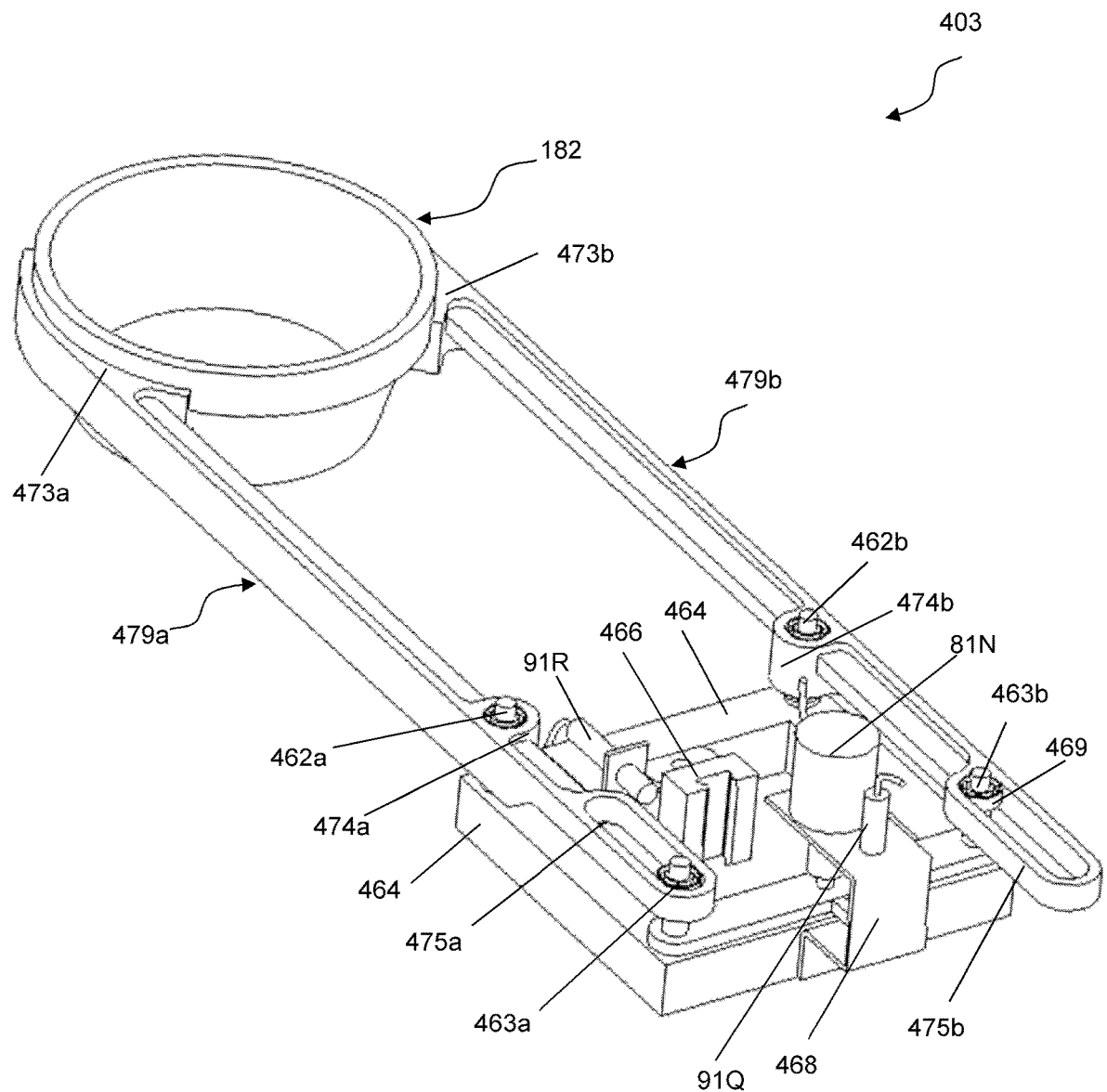
FIG. 5C shows an aerial view of the gripping mechanism comprising the pair of gripping devices.

Referring to FIGS. 5A-5C, a gripping mechanism 403 comprises a rigid component 464; a pair of shafts 462a and 462b both of which are rigidly connected to the rigid component 464; a pair of shafts 463a and 463b; a rigid component 471 in the shape of a plate; a shaft 489 which is rigidly connected to the rigid component 471 and positioned in the middle of the rigid component 471; a motor 81N comprising a shaft and a base component; and a connecting component 468. The rigid component 464 may be referred to as the support component of the gripping mechanism 403. Both the shafts 463a and 463b are configured to be rigidly connected to the rigid component 471 and separately positioned at the ends of the rigid component 471. A wheel 469 is mounted on the shaft 463a and is concentric with the shaft 463a, such that the wheel is constrained to rotate freely relative to the shaft 463a, around the axis of the shaft 463a. Another wheel 469 is mounted on the shaft 463b and is concentric with the shaft 463b, such that the wheel is constrained to rotate freely relative to the shaft 463b around the axis of the shaft 463b. The base component of the motor 81N is fixedly connected to the rigid component 464 by the connecting component 468, and the shaft of the motor 81N is fixedly connected to the shaft 489 by a coupling 472. Thus, the motor 81N may drive a rotation of the rigid component 471 relative to the rigid component 464 around the axis of the shaft 489. The gripping mechanism 403 further comprises a screw nut 465 and a linear slider 466, wherein the screw nut 465 is rigidly connected to the rigid component 464, and the linear slider 466 is fixedly mounted on the rigid component 464. The axes of the shafts 462a, 462b, 489, 463a and 463b, the axis of the screw nut 465 and the linear direction of the linear slider 466 are configured to be vertical.

As shown in FIG. 5B, the gripping mechanism 403 further comprises gripping devices 479a and 479b, wherein the gripping device 479a or 479b is a rigid component comprising a slotted hole 475a or respectively 475b, a bearing housing 474a or respectively 474b, a gripper 473a or respectively 473b. The surface of the gripper 473a or 473b on one side is configured to match the part of surfaces of a food container 182. As shown in FIG. 5C, two bearings 461 and accessories are configured to connect the bearing housing 474a of the gripping device 479a and the shaft 462a, so that the bearing housing 474a (or equivalently, the gripping device 479a) is constrained to rotate relative to the shaft 462a, or equivalent relative to the rigid component 464, around the axis of the shaft 462a. Similarly, another two bearings 461 and accessories are configured to connect the bearing housing 474b of the gripping device 479b and the shaft 462b, so that the bearing housing 474b (or equivalently, the gripping device 479b) is constrained to rotate relative to the shaft 462b, or equivalently relative to the rigid component 464, around the axis of the shaft 462b. Furthermore, the wheel 469 mounted on the shaft 463a (or 463b) is configured to be inserted in the slotted hole 475a (or respectively 475b) of the gripping device 479a (or respectively 479b), so that a movement of the shaft 463a (or 463b) may induce a rotation in the gripping device 479a (or respectively 479b) around the axis of the shaft 462a (or respectively 462b). When the motor 81N drives a rotation of the rigid component 471 around the axis of the shaft 489, the gripping devices 479a and 479b may simultaneous rotate around the corresponding axes as to grip or release a food container 182. When the food container 182 is gripped by the gripping devices 479a and 479b of the gripping mechanism 403, as shown in FIG. 5C, the food container 182 is configured to be positioned upright as to be able to contain or otherwise hold a cooked food.

It should be noted that the rotations of the gripping devices 479a and 479b are configured to be in an opposite direction. It also should be noted that a rubber or silica gel or other elastic material may be attached to the grippers 473a and 473b of the gripping devices 479a and respectively 479b.

The gripping mechanism 403 further comprises proximity sensors 91Q and 91R, targets 455a and 455b. The targets 455a and 455b are rigidly connected to the rigid component 471. The proximity sensor 91Q is fixedly mounted on the connecting component 468 and the proximity sensor 91R is fixedly connected to the rigid component 464 via a connector. As shown in FIG. 5A, the motor 81N is connected to the first computer 901 via wires 83N. The first computer 901 may be configured to dynamically control the timing and/or speed of the motor 81N. The proximity sensor 91Q is also connected to the first computer 901 via wires 93Q, so the first computer 901 may receive signals from the proximity sensor 91Q. The proximity sensor 91Q monitors the targets 455a and 455b when the targets are rotated with the rigid component 471. When the rigid component 471 is rotated by the motor 81N to a first position where the proximity sensor 91Q senses the target 455a, the pair of gripping devices 479a and 479b are gripping a food container 182. Similarly, when the rigid component 471 is rotated by the motor 81N to a second position where the proximity sensor 91Q senses the target 455b, the pair of gripping devices 479a and 479b are releasing the food container 182. Each time the rigid component 471 is rotated to the first or second end position, the first computer 901 can figure out the position of the target 455a (or 455b) and then send signals to the motor 81N as to control the rotation of the motor 81N.

Figure 6:
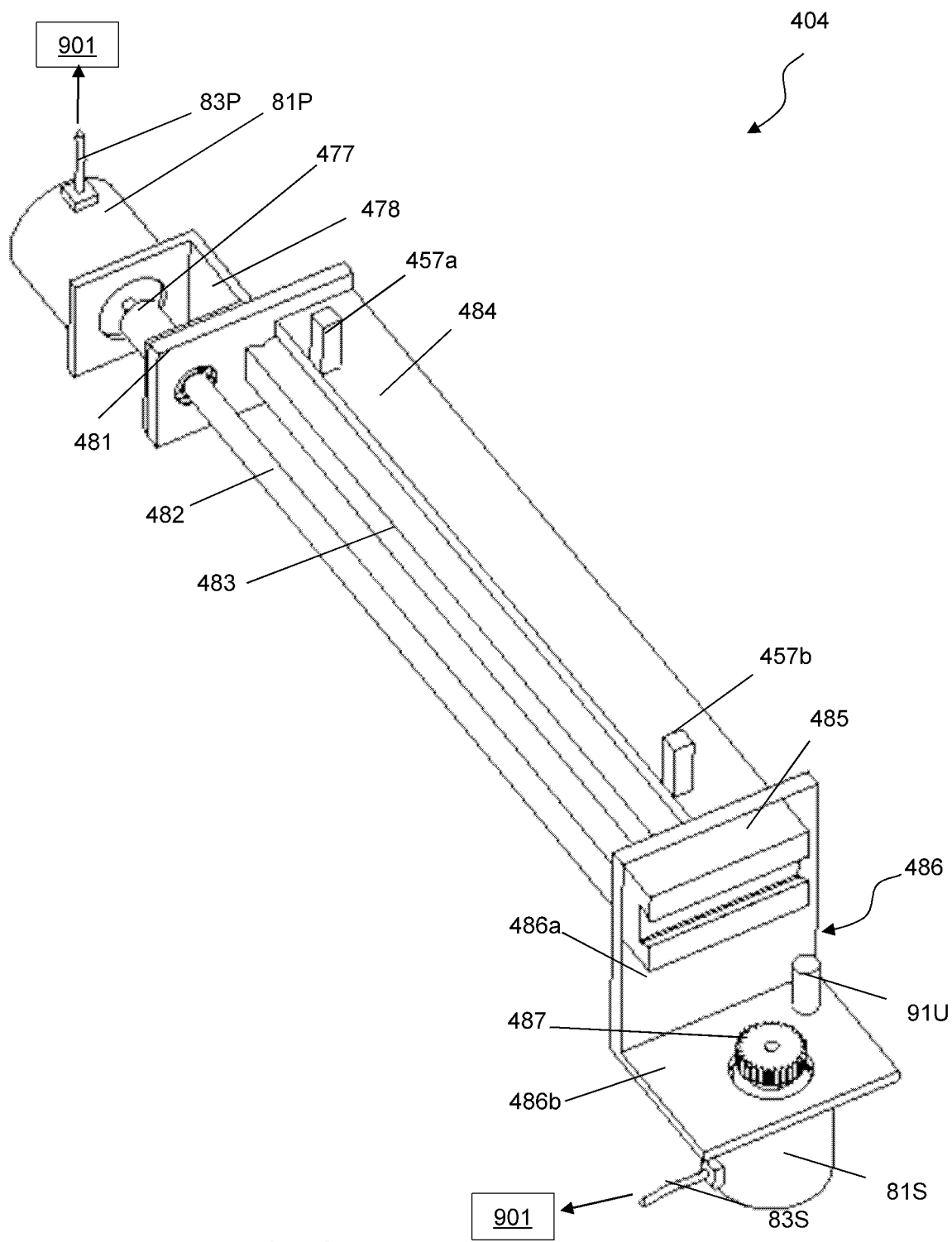
FIG. 6 shows an aerial view of a transfer sub-apparatus.

Referring to FIG. 6, a transfer sub-apparatus 404 comprises: a plate 481 comprising a bearing housing; an L-shaped rigid component 486 comprising a horizontal plate 486a and a vertical plate 486b, wherein the horizontal plate 486a comprises a bearing housing; a rigid component 484 configured to rigidly connect the horizontal plate 481 and the horizontal plate 486a of the L-shaped rigid component 486; a screw shaft 482 comprising a vertical axis and a linear sliding track 483. The axes of the bearing housing of the horizontal plate 481 and the bearing housing of the horizontal plate 486a are configured to be concentric. A bearing and accessories (hidden in figure) are configured to connect the bearing housing of the horizontal plate 481 with a round section of the screw shaft 482, and another bearing and accessories (hidden in figure) are configured to connect the bearing housing of the horizontal plate 486a with another round sections of the screw shaft 482, so that the screw shaft 482 is constrained to rotate relative to the horizontal plate 481 and the L-shaped rigid component 486 (or equivalently, relative to the rigid component 484), around the axis of the screw shaft 482. The linear sliding track 483 is attached on one side of the rigid component 484. The axis of the screw shaft 482 and the sliding direction of the linear sliding track 483 are configured to be vertical.

The transfer sub-apparatus 404 further comprises: a connecting component 478; a motor 81P comprising a shaft and a base component; and a coupling 477. The connecting component 478 is configured to connect the base component of the motor 81P to the horizontal plate 481 and the coupling 477 is configured to join the shaft of the motor 81P with the screw shaft 482. Thus, the motor 81P may drive a rotation of the screw shaft 482 relative to the rigid component 484, around the axis of the screw shaft 482. The transfer sub-apparatus 404 further comprises: a motor 81S comprising a base component and a shaft; a gear 487 which is rotatable relative to the vertical plate 486b. The base component of the motor 81S is fixedly connected to the vertical plate 486b of the L-shaped rigid component 486 and the shaft of the motor 81S is fixedly connected to the gear 487. Thus, the motor 81S may drive a rotation of the gear 487 relative to the L-shaped rigid component 486. The transfer sub-apparatus 404 further comprises a linear slider 485, which is fixedly connected to the horizontal plate 486a. The axis of the gear 487 and the direction of the linear slider 485 are configured to be horizontal, and perpendicular to each other. The transfer sub-apparatus 404 further comprises two targets 457a and 457b, a proximity sensor 91U. The targets 457a and 457b are attached to a side of the rigid component 484. The proximity sensor 91U is fixedly connected to the vertical plate 486b of the L-shaped rigid component 486.

It should be noted that the vertical plate 486b may comprise a bearing housing. and the gear 487 may be rigidly connected to a shaft; wherein the shaft of the gear 487 may be connected to the bearing housing of the vertical plate 486b by one or more bearings and accessories, so that the shaft is constrained to rotate relative to the vertical plate 486b around the axis of the shaft, wherein the axis of the shaft is configured to coincide with the axis of the gear 487, wherein the shaft is connected to the shaft of the motor 81S via a coupling so that the motor 81S may drive a rotation of the shaft.

Figure 7A:
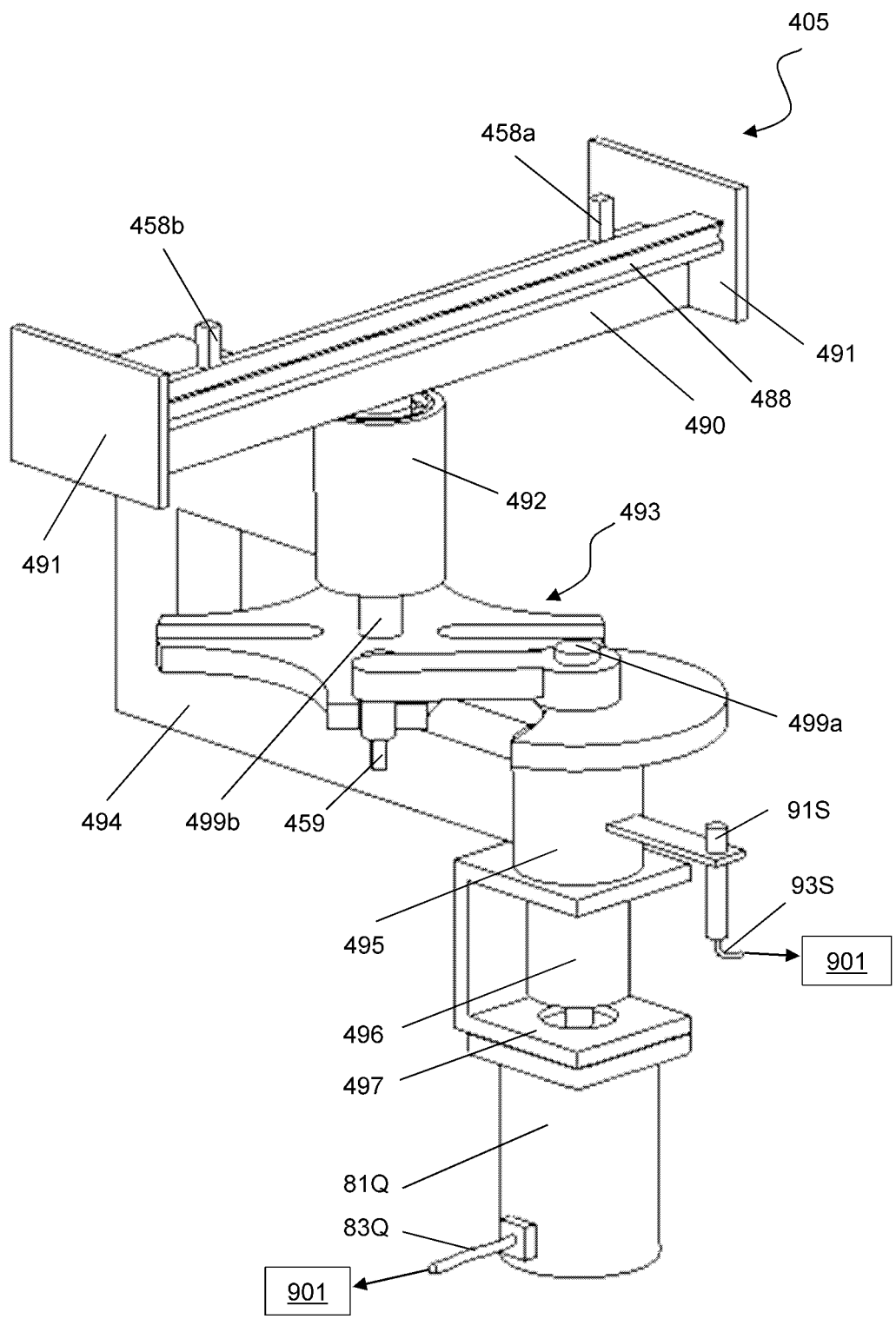
FIGS. 7A-7B show aerial views of a rotational motion mechanism.
Figure 7B:
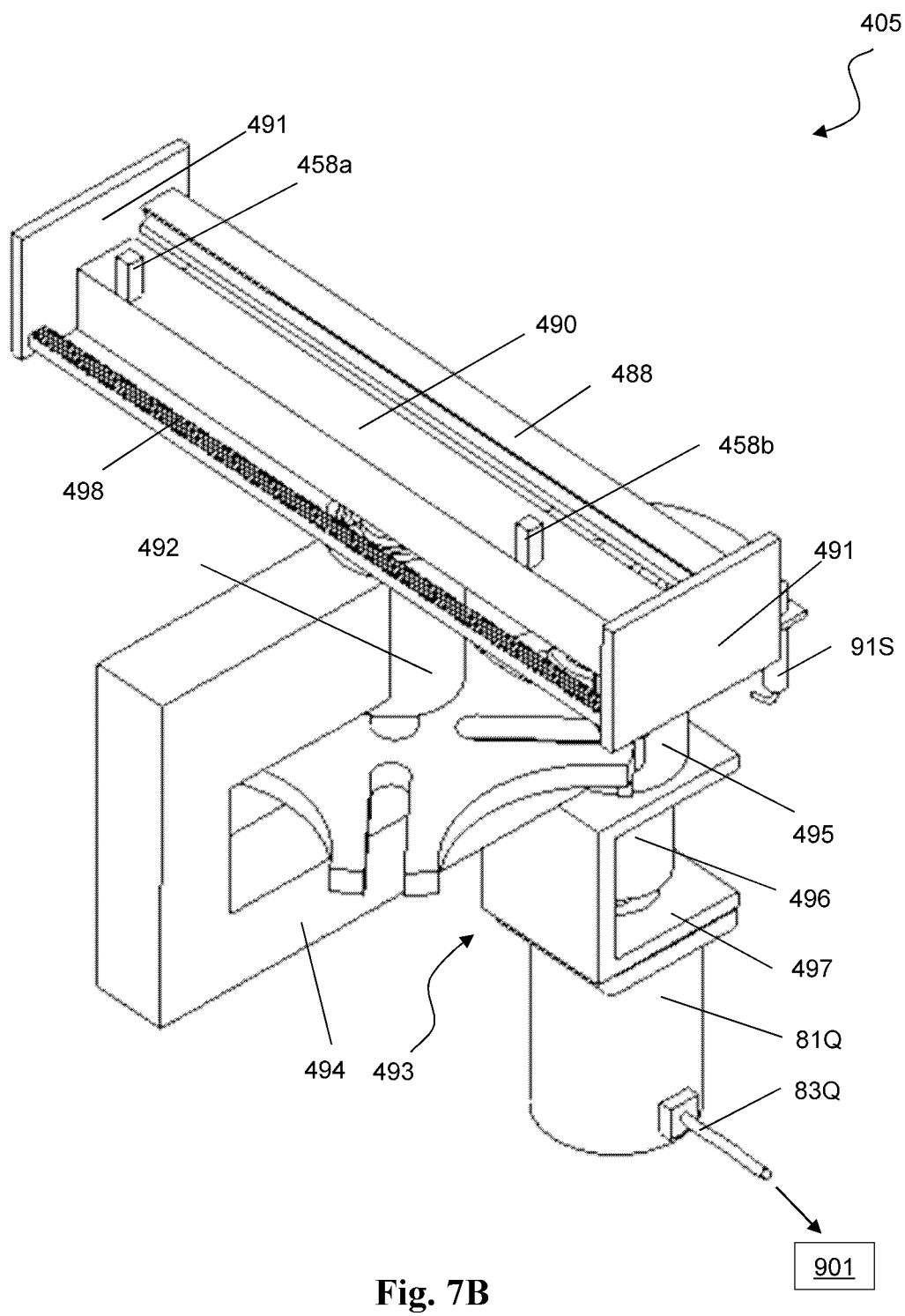

Referring to FIGS. 7A-7B, a rotational motion mechanism 405 comprises: two bearing housings 492 and 495 each comprising a vertical axis; a support component 494 configured to rigidly connect the bearing housings 492 and 495; a rigid component 490; a rack 498; a linear sliding track 488; and two vertical plates 491; wherein the rack 498 and the linear sliding track 488 are rigidly connected to the rigid component 490. The directions of the rack 498 and the linear sliding track 488 are configured to be horizontal and parallel to each other. The two vertical plates 491 are separately attached to the ends of the rack 498, the ends of the rigid component 490, and the ends of the linear sliding track 488, as to enhance the rigidity.

The rotational motion mechanism 405 further comprises: a Geneva mechanism 493 comprising: an input shaft 499a configured to be rotatable relative to the support component 494 around the axis of the input shaft 499a; an output shaft 499b configured to be rotatable relative to the support component 494 around the axis of the output shaft 499b; a motor 81Q comprising a shaft and a base component; a coupling 496; and a connecting component 497; wherein a continuous rotations of the input shaft 499a relative to the support component 494 is configured to produce an intermittent rotation of the output shaft 499b relative to the support component 494. (It should be noted that one or more bearings may be configured to connect the input shaft 499a and the bearing housing 495, so that the input shaft 499a is constrained to rotate relative to the bearing housing 495, or equivalently, relative to the support component 494, around the axis of the input shaft 499a. Similarly, one or more bearings may be configured to connect the output shaft 499b and the bearing housing 492, so that the output shaft 499b is constrained to rotate relative to the bearing housing 492 (or equivalently, relative to the support component 494) around the axis of the output shaft 499b. The shaft of the motor 81Q is fixedly connected to the input shaft 499a and the base component of the motor 81Q is fixedly connected to the bearing housing 495 (or equivalently the support component 494) via the connecting component 497.

Thus, the motor 81Q may drive a rotation of the input shaft 499a of the Geneva mechanism 493 relative to the support component 494 and produce an intermittent rotation of the output shaft 499b relative to the support component 494. Since the rigid component 490 is rigidly connected to the output shaft 499b, the rigid component 490 may intermittently rotate as well as the output shaft 499b.

The rotational motion mechanism 405 further comprises a proximity sensor 91S fixedly connected to the bearing housing 495 via a connector; a target 459 rigidly connected to a crank of the Geneva mechanism 493; and two targets 458a and 458b both of which are attached on the rigid component 490. As shown in FIG. 7A, the motor 81Q is connected to the first computer 901 via wires 83Q. The first computer 901 may be configured to dynamically control the timing and/or speed of the motor 81Q. The proximity sensor 91S is also connected to the first computer 901 via wires 93S, so the first computer 901 may receive signals from the proximity sensor 91S. Each time the crank of the Geneva mechanism 493 is rotated to a position where the proximity sensor 91S senses the target 459 and the signals of the proximity sensor 91S are sent to the first computer 901, the first computer 901 can figure out the position of the target 459. The first computer 901 then sends signals to the motor 81Q as to stop the rotation of the motor 81Q for a time period during which a dish loading apparatus 420 (shown follow) may complete a corresponding process. After this time period, the motor 81Q, under the control of the first computer 901, may restart and make a rotation.

Figure 8:
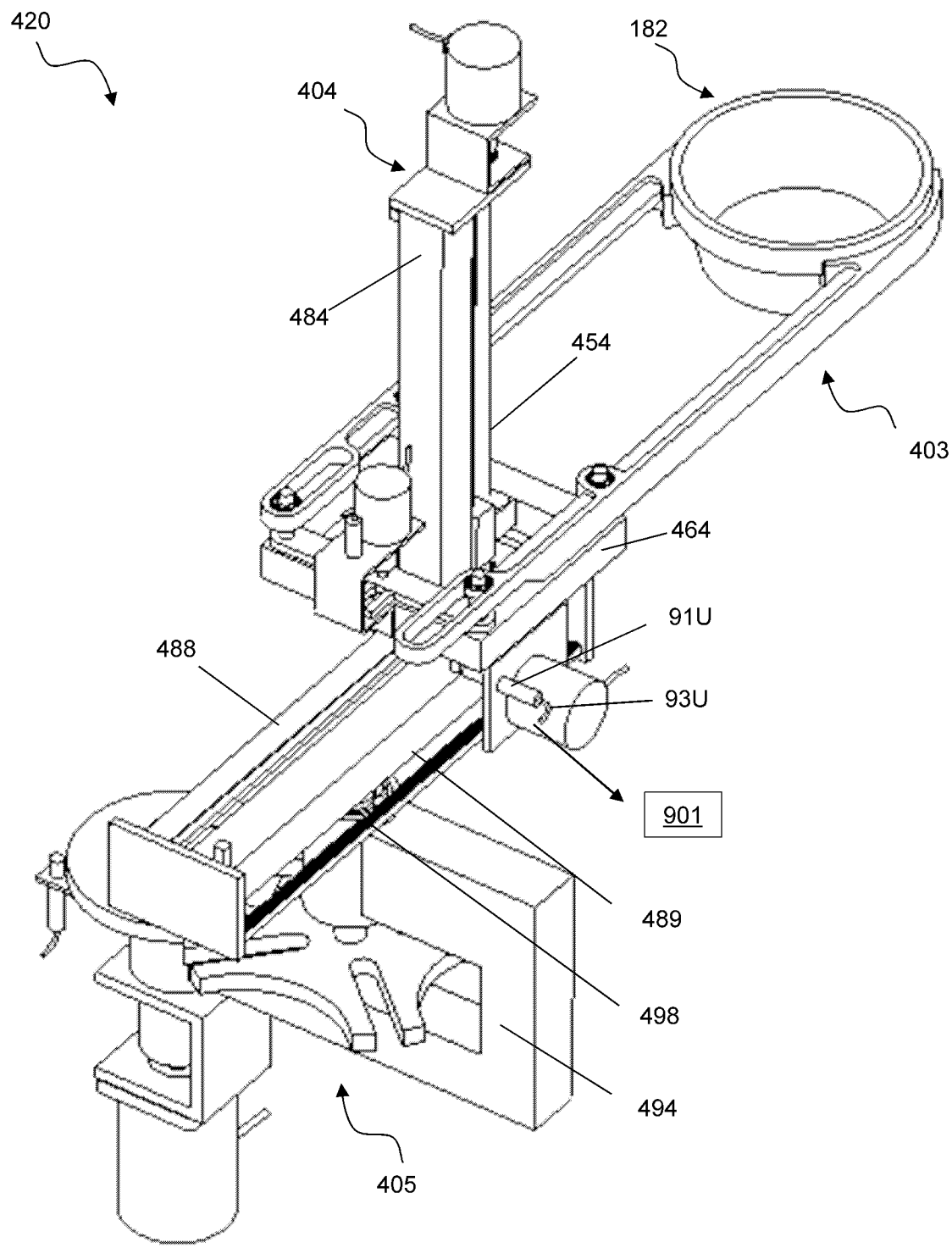
FIG. 8 shows an aerial view of a dish loading apparatus comprising the gripping mechanism, the transfer sub-apparatus and the rotational motion mechanism.

Referring to FIG. 8, a dish loading apparatus 420 comprising the gripping mechanism 403, the transfer sub-apparatus 404 and the rotational motion mechanism 405. The screw shaft 482 of the transfer sub-apparatus 404 is configured to be engaged with the screw nut 465 of the gripping mechanism 403 and the linear slider 466 of the gripping mechanism 403 is configured to be engaged with the linear sliding track 483 of the transfer sub-apparatus 404, so that when the motor 81P of the transfer sub-apparatus 404 produces a rotation of the screw shaft 482, the rigid component 464 of the gripping mechanism 403 is configured to slide vertically along the linear sliding track 483 relative to the rigid component 484 of the transfer sub-apparatus 404. The gear 487 of the transfer sub-apparatus 404 is engaged with the rack 498 of the rotational motion mechanism 405 and the linear slider 485 of the transfer sub-apparatus 404 is configured to be engaged with the linear sliding track 488 of the rotational motion mechanism 405, so that when the motor 81S of the transfer sub-apparatus 404 drives the rotation of the gear 487, the rigid component 484 is configured to slide horizontally along the linear sliding track 488 relative to the rigid component 490 of the rotational motion mechanism 405.

As shown in FIG. 6, the motors 81P and 81S are connected to the first computer 901 via wires 83P and 83S. The first computer 901 may be configured to dynamically control the timing and/or speed of the motors 81P and 81S. As shown in FIGS. 5A-8, the proximity sensors 91R and 91U are also connected to the first computer 901 via wires 93R and 93U, so the first computer 901 may receive signals from the proximity sensors 91R and 91U. The proximity sensor 91R of the gripping mechanism 403 monitors the targets 457a and 457b when the gripping mechanism 403 is slid along the axis of the screw shaft 482 by the motor 81P. Each time the proximity sensor 91R senses the target 457a or 457b, the first computer 901 may send signals to the motor 81P as to stop the rotation of the motor 81P for a time period. During this period, the gripping mechanism 403 of the dish loading apparatus 420 may complete a progress of gripping or releasing a food container 182. Similarly, the proximity sensor 91U of the transfer sub-apparatus 404 monitors the targets 458a and 458b when the proximity sensor 91U is slid with the transfer sub-apparatus 404 by the motor 81S. Each time the proximity sensor 91U senses the targets 458a or 458b, the first computer 901 can figure out the position of the proximity sensor 91U, and then send signals to the motor 81S as to stop the rotation of the motor 81S for time period during which the gripping mechanism 403 and/or the transfer sub-apparatus 404 may complete a corresponding progress. As explained before, the first computer 901 may control the rotation of the motor 81Q according to the signals of the proximity sensor 91S. Thus, the dish loading apparatus 420 may be controlled by the first computer 901 to grip a food container 182 and move it linearly in vertical direction of the axis of the screw shaft 482, or linearly in horizontal direction, or horizontally by an intermittently rotation around the axis of the output shaft 499b, or by a combination of them, and then it may release the food container 182 at a position which is different from the previous position.

The rigid component 464 of the gripping mechanism 403 may also be referred to as a first support component of the dish loading apparatus 420. The rigid component 484 of the transfer sub-apparatus 404 will be referred to as a second support component of the dish loading apparatus 420. The rigid component 490 of rotational motion mechanism 405 will be referred to as a third support component of the dish loading apparatus 420. The support component 494 will be referred to as a fourth support component of the dish loading apparatus 420.

It should be noted that the dish loading apparatus 420 comprises the followings:

(1) the gripping mechanism 403 configured to grip or release a food container 182, wherein the gripping mechanism 403 comprises the first support component 464 (of the dish loading apparatus 420, same below);

(2) a vertical motion mechanism referred to as a first motion mechanism, configured to produce a vertical linear motion in the first support component 464 relative to the second support component 484, wherein the first motion mechanism comprises the second support component 484, motor 81P, coupling 477, screw shaft 482, linear sliding track 483, linear slider 466, horizontal plate 481, L-shaped rigid component 486, screw nut 465 etc.; and their connections to each other if any, and their connections to the other components of the dish loading apparatus 420 if any;

(3) a horizontal motion mechanism referred to as a second motion mechanism, configured to produce a horizontal linear motion in the second support component 484 relative to the third support component 490, wherein the second motion mechanism comprises the third support component 490, motor 81S, gear 487, linear slider 485, rack 498, linear sliding track 488 etc., and their connections to each other if any, and their connections to other components of the dish loading apparatus 420 if any;

(4) a rotational motion mechanism referred to as a third motion mechanism, configured to produce an intermittent rotation of the third support component 490 relative to the fourth support component 494, wherein the third motion mechanism comprises the fourth support component 494, motor 81Q, coupling 496, connecting component 497, Geneva mechanism 493, bearing housings 492 and 495 etc., and their connections to each other if any, and their connections to other components of the dish loading apparatus 420 if any. It should be noted that the axis of intermittent rotation of the third support component 490 relative to the fourth support component 494 is vertical.

The dish loading apparatus 420 may be used to grip a food container 182 which is positioned upright and move the food container 182 linearly in vertical direction, or linearly in horizontally, or horizontally rotation around the axis of the output shaft 499b, or by a combination of these, and then it may release the food container 182 at a position which is different from a previous position.

It should be noted that the first computer 901 be configured to dynamically control the rotations and/or speed of the motors in the dish loading apparatus 420 according to the signals of the proximity sensors 91Q, 91R, 91U, 91S in the dish loading apparatus 420.

Figure 9A:
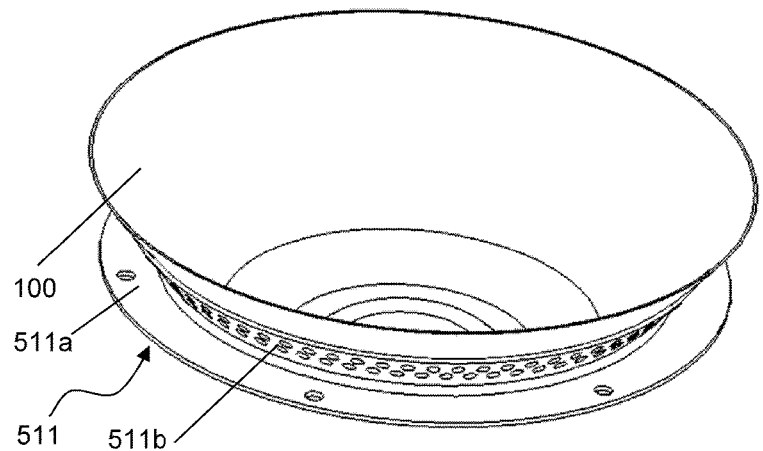
FIG. 9A shows an aerial view of parts of a cooking apparatus.
Figure 9B:
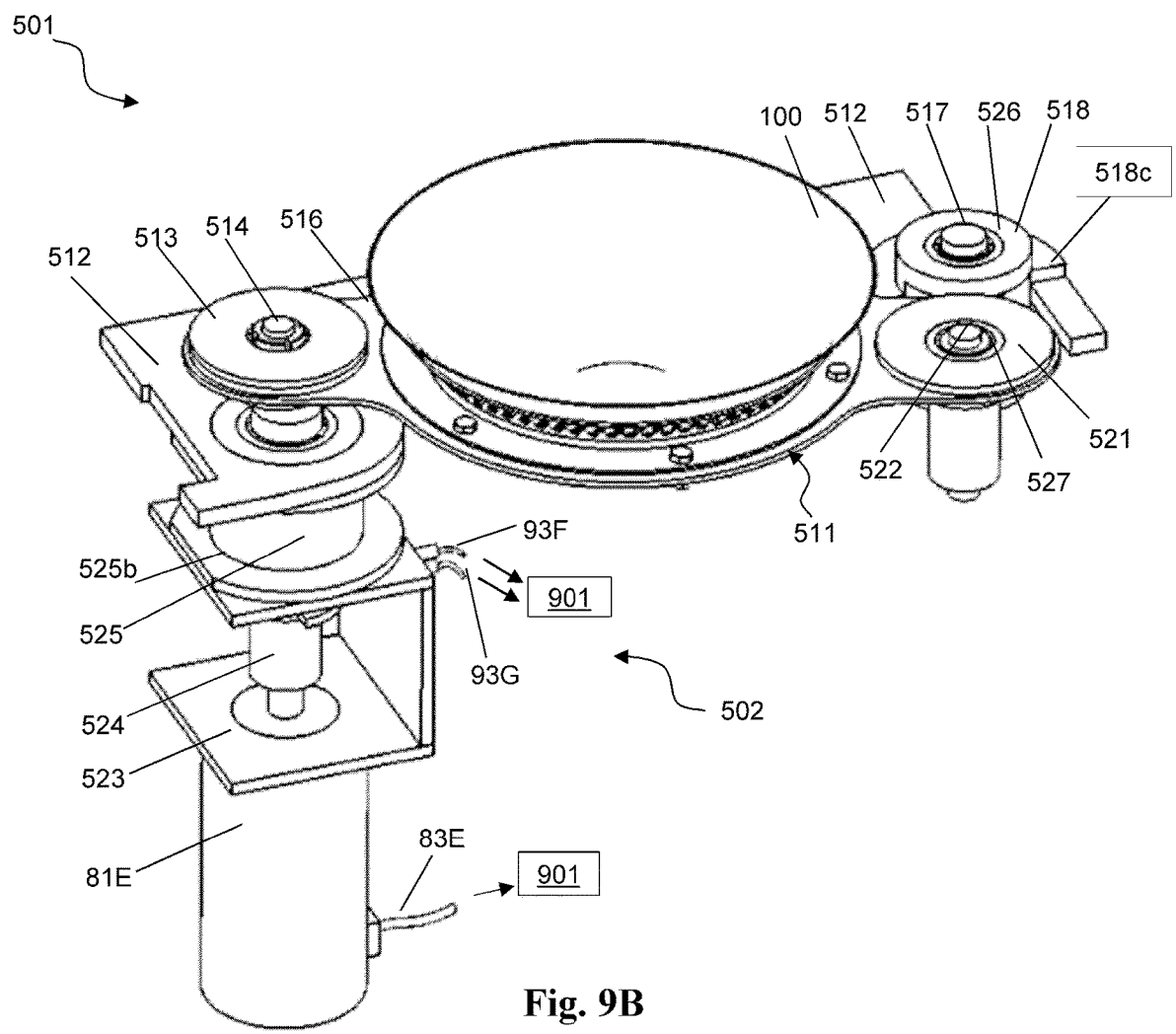
FIG. 9B shows an aerial view of the cooking apparatus.
Figure 9C:
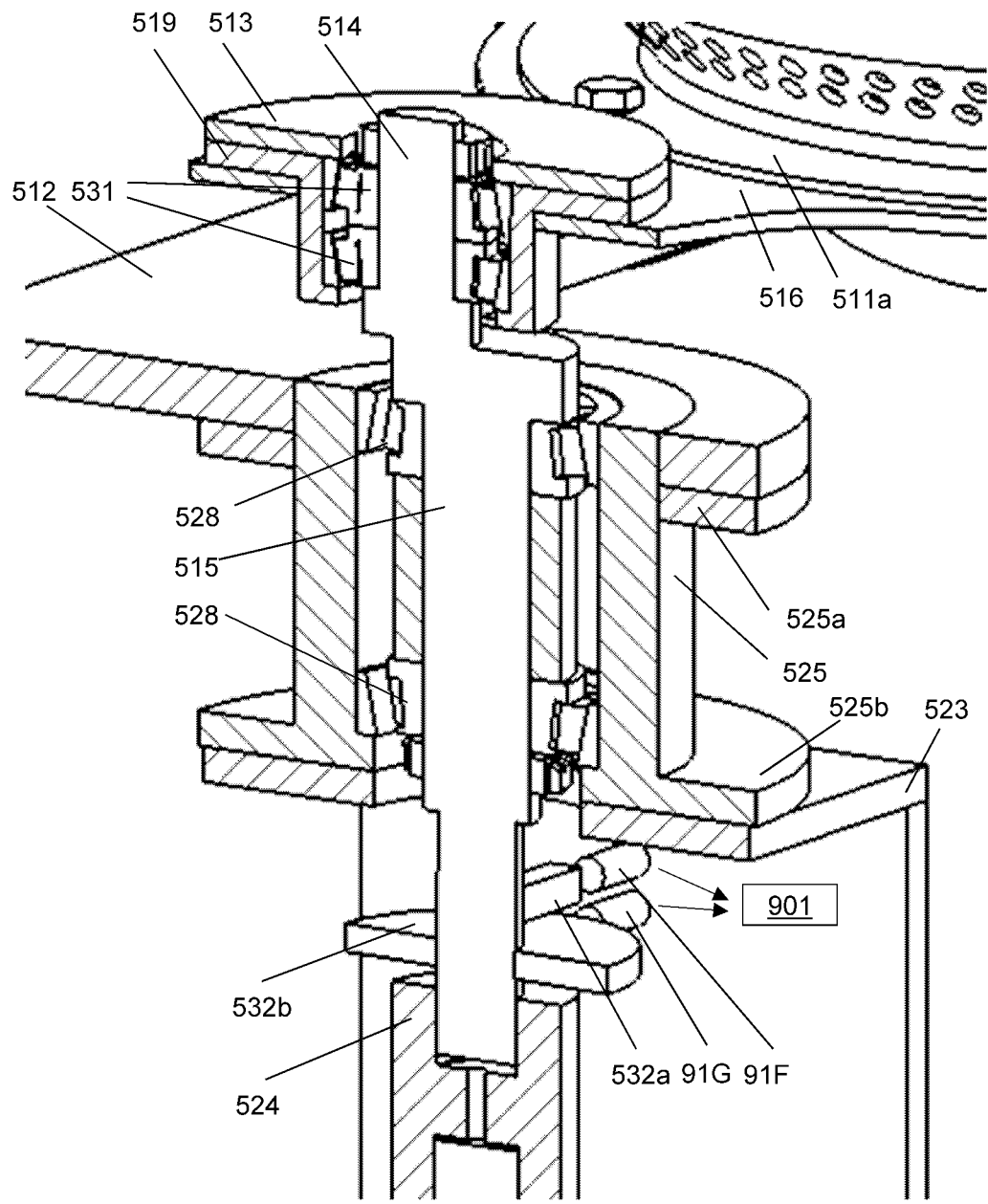
FIG. 9C shows a cut view of parts of the cooking apparatus.

In some embodiments, referring to FIGS. 9A-9C, a cooking apparatus 501 comprises a stirring motion mechanism 502 and a cookware 100, wherein the cookware 100 is configured to contain or otherwise hold food or food ingredients, wherein the stirring motion mechanism 502 comprises: a flat plate 516; two bearing housings 513 and 521; a connecting component 511 comprising a deformed metal sheet, including a flat part 511a, and a curved part 511b. The curved part 511b has some oval shaped holes removed. The flat part 511a and the curved part 511b may be both ring-shaped, although this is not a requirement. The flat part 511a of the connecting component 511 is configured to be rigidly connected with a ring-shaped area of the flat plate 516 and the curved part 511b of the connecting component 511 is configured to be rigidly connected with the cookware 100. Thus, the cookware 100 is configured to be rigidly connected to the flat plate 516 of the stirring motion mechanism 502. The bearing housings 513 and 521 are rigidly connected to the flat plate 516 wherein the axes of the bearing housings 513 and 521 and the axis of the cookware 100 are configured to be mutually parallel.

The stirring motion mechanism 502 of the cooking apparatus 501 further comprises: a support component 512 in the shape of a plate; two shafts 522 and 517 which are rigidly connected to a connector (hidden in figures); a bearing housing 518 comprising a half-circular plate 518c which is rigidly connected to the support component 512. A pair of bearings 526 are configured to connect the shaft 517 to the bearing housing 518, so that the shaft 517 is constrained to rotate relative to the bearing housing 518 (or equivalently relative to the support component 512) around the axis of the shaft 517. Hence, the shaft 522 is constrained to rotate relative to the support component 512 around the axis of the shaft 517.

The stirring motion mechanism 502 of the cooking apparatus 501 further comprises: a bearing housing 525; two flanges 525a and 525b which are rigidly extended from the bearing housing 525; a shaft 515, referred to as a main shaft; and a shaft 514, referred to as an eccentric shaft (see FIG. 9C). The main shaft 515 and the eccentric shaft 514 are rigidly connected to each other. The flange 525a is configured to be rigidly connected with the support component 512; and hence the bearing housing 525 is rigidly connected with the support component 512. A pair of bearings 528 (and accessories) are configured to connect the shaft 515 and the bearing housing 525, so that the shaft 515 is constrained to rotate relative to the bearing housing 525 around the axis of the shaft 515. Thus, the eccentric shaft 514 is constrained to rotate around the axis of the main shaft 515, relative to the bearing housing 525, and hence relative to the support component 512. In other words, the eccentric shaft 514 is constrained to make an eccentric rotation, where the axis of the rotation is not identical to the axis of the eccentric shaft.

The axes of the shafts 517, 522, 515 and 514 are configured to be parallel to each other, and the distance between the axis of the main shaft 515 and the axis of the eccentric shaft 514 is configured to be strictly less than the distance between the axis of the shaft 522 and the axis of the shaft 517. The distance between the axes of the shafts 515 and 514 is relatively small, usually not exceeding tens of millimeters, although this is not a strict requirement.

The stirring motion mechanism 502 of the cooking apparatus 501 further comprises: a motor 81E comprising a shaft and a base component; a connecting component 523; a coupling 524. The base component of the motor 81E is fixedly connected to the support component 512 via the connecting component 523. The shaft of the motor 81E is fixedly connected to the shaft 515 by the coupling 524. Thus, the motor 81E may drive the rotation of the main shaft 515 and the eccentric shaft 514, around the axis of the main shaft 515. The stirring motion mechanism 502 further comprises: a pair of bearings 531 (and accessories) configured to connect the shaft 514 and the bearing housing 513, so that the shaft 514 is constrained to rotate relative to the bearing housing 513 around the axis of the shaft 514; another pair of bearings 527 (and accessories) configured to connect the shaft 522 and the bearing housing 521, so that the shaft 522 is constrained to rotate relative to bearing housing 521 around the axis of the shaft 522 (see FIG. 9B). When the shaft 515 is rotated around the axis of the shaft 515 by the motor 81E, the shaft 514 makes an eccentric rotation around the axis of the shaft 515. This produces a cyclic, planar movement in the flat plate 516 and in the cookware 100, if ignoring elastic and other deformations. The movement in the cookware 100 can stir, mix and distribute the food or food ingredients contained in the cookware 100.

The cooking apparatus 501 further comprises two proximity sensors 91F and 91G both of which are fixedly connected to the connecting component 523, a target 532a with a rectangular cross section, and a target 532b in the shape of a hemi-discoidal. The targets 532a and 532b are fixedly connected to the shaft 515. The proximity sensor 91F senses the target 532a when the target is rotated with the shaft 515. The proximity sensor 91G senses the target 532b when the target is rotated with the shaft 515. As shown in FIGS. 9B-9C, the motor 81E is connected to the first computer 901 via wires 83E. The first computer 901 may send signals to the motor 81E as to dynamically control the timing and/or speed of the motor 81E; where the speed of the motor 81E may be different in different times, per recipe. The proximity sensors 91F and 91G are also connected to the first computer 901 via wires 93F and 93G, so the first computer 901 may receive signals from the proximity sensors 91F and 91G.

It should be noted that the cooking apparatus 501 may further comprises a heating device which is configured to heat the cookware 100 to cook food.

Figure 10A:
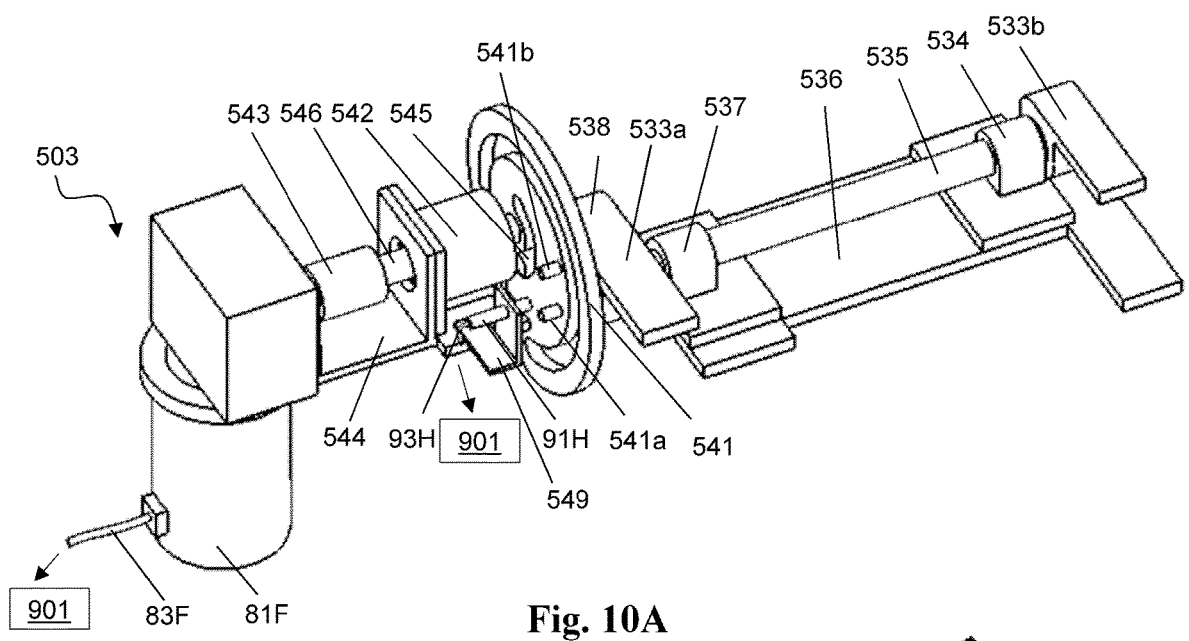
FIGS. 10A-10B show aerial views of parts of a cooked food unloading mechanism.
Figure 10B:
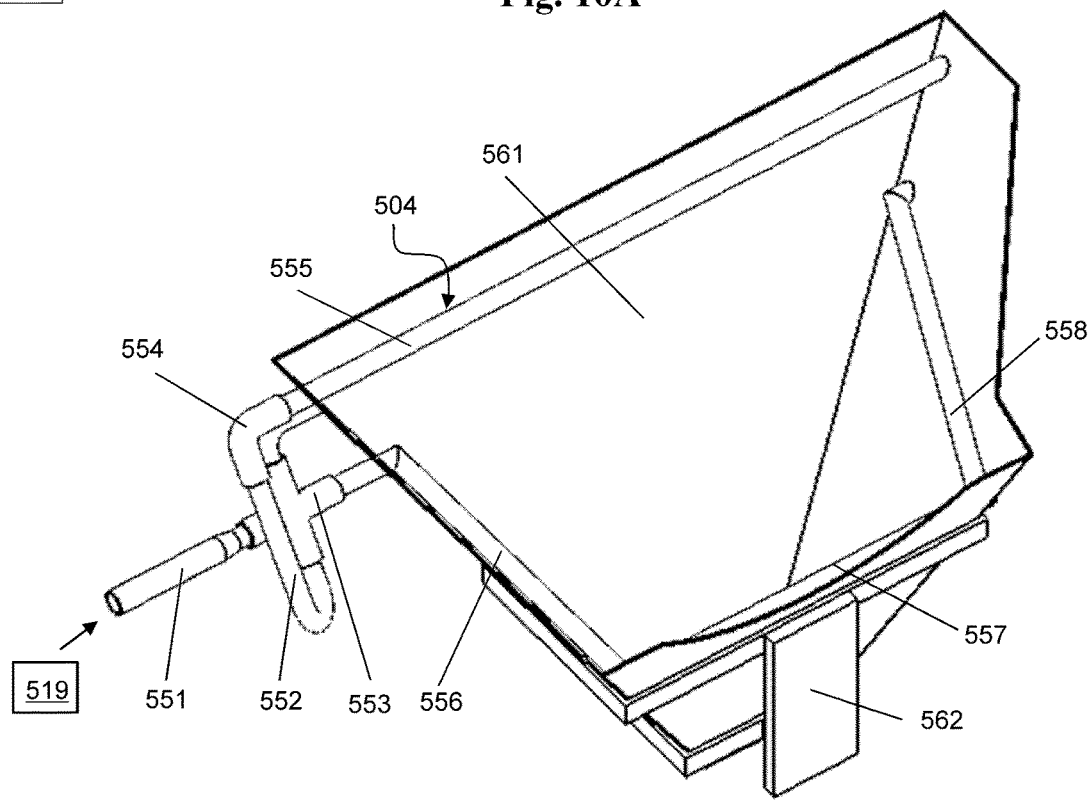
Figure 10C:
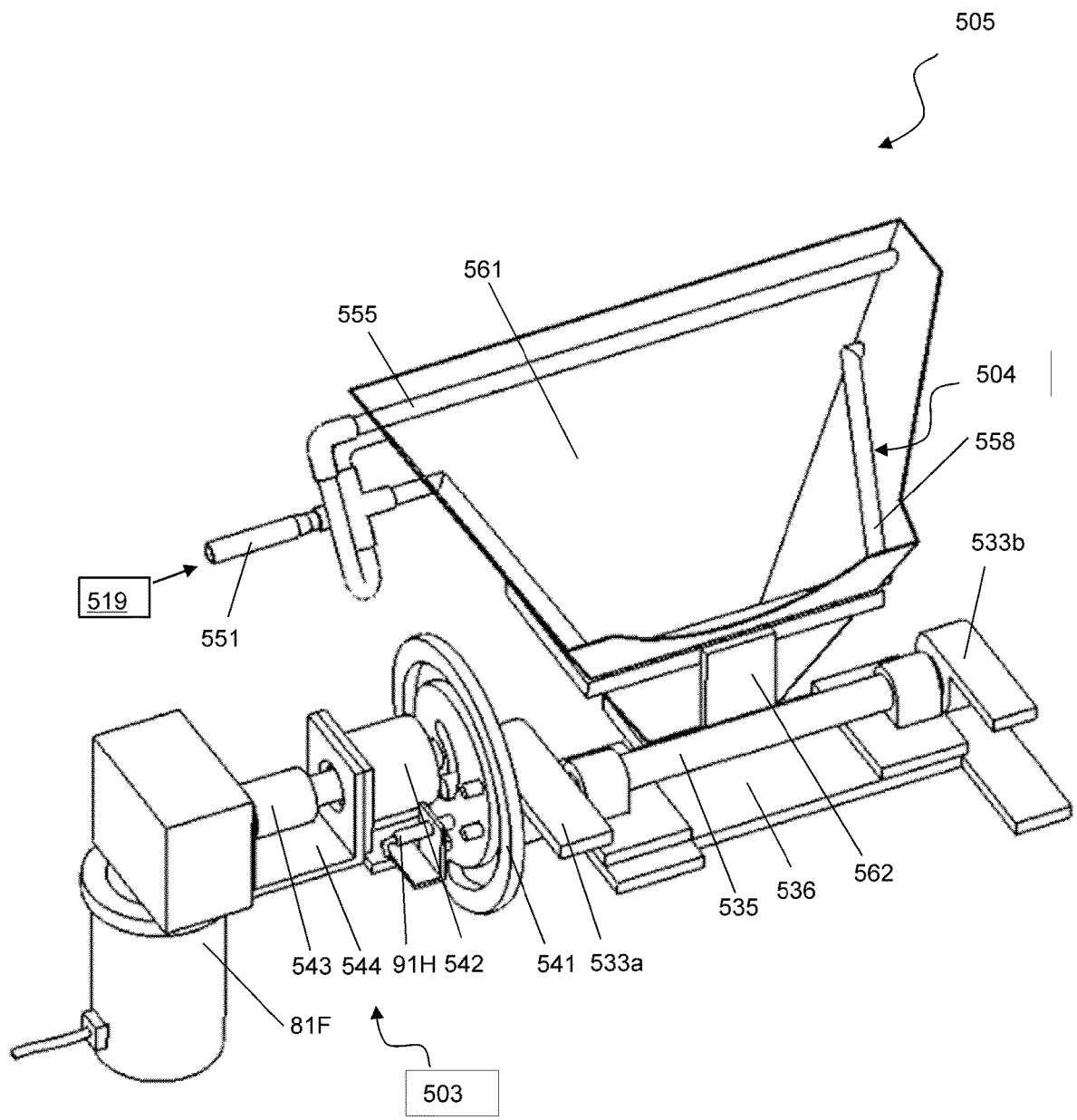
FIG. 10C shows an aerial view of the cooked food unloading mechanism.

In some embodiments, referring to FIGS. 10A-10C, a cooked food unloading mechanism 505 comprises a motion mechanism 503, wherein the motion mechanism 503 comprises: a bearing housing 542 (with a flange and a base rigidly attached to it); a cam 541; a shaft 546; a connecting component 544; a coupling 543; and a motor 81F comprising a shaft and a base component. The cam 541 is rigidly connected to the shaft 546. A pair of bearings and accessories (hidden in figure) are configured to connect the shaft 546 and the bearing housing 542, so that the shaft 546 is constrained to rotate relative to the bearing housing 542, around the axis of the shaft 546. The connecting component 544 is configured to fixedly connect the bearing housing 542 and the base component of the motor 81F and the shaft of the motor 81F is connected to the shaft 546 by the coupling 543. Thus, the motor 81F may drive the rotation of the shaft 546, and hence the rotation of the cam 541, around the axis of the shaft 546. The curved track of the cam 541 has a curved profile comprising a circular arc at either end of the curved profile; wherein each circular arc is a part of a circle centered at the axis of the shaft 546. The edge of the curved track of the cam 541 comprises equidistant curve to the curved profile.

The motion mechanism 503 further comprises a proximity sensor 91H; a connecting component 549 configured to fixedly connect the proximity sensor 91H to the bearing housing 542; and two targets 541a and 541b both of which are fixedly joined with the cam 541. As shown in FIG. 10A, the motor 81F is connected to the first computer 901 via wires 83F. The first computer 901 is configured to dynamically control the timing and/or speed of the motor 81F. The proximity sensor 91H is also connected to the first computer 901 via wires 93H, so the first computer 901 may receive signals from the proximity sensor 91H. The proximity sensor 91H senses the targets 541a and 541b when the targets are rotated with the cam 541. When the cam 541 is rotated to a first position (or a second position) where the proximity sensor 91H senses the target 541a (or respectively 541b), the signals are sent to the first computer 901. The first computer 901 can figure out the position of the target, and the position of the cam 541. Then the first computer 901 can send signals to the motor 81F as to control the rotation of the motor 81F to stop for a time period during which the cooked food unloading mechanism 505 can complete a corresponding process. After this time period, the motor 81F, under the control of the first computer 901, may restart again and make a reverse rotation to rotate the cam 541 to the second position or respectively the first position.

The cooked food unloading mechanism 505 further comprises: a support component 536 in the shape of a plate; a pair of shaft seats 537 and 534; shafts 535 and 545; and bearing housings 538, 533a and 533b, wherein the shaft seats 537 and 534 are configured to rigidly connect the shaft 535 to the support component 536. A pair of bearings (and accessories) configured to connect the shaft 545 and the bearing housing 538, so that the shaft 545 is constrained to rotate relative to the bearing housing 538, around the axis of the shaft 545 (see FIG. 10A). The axes of the bearing housings 533a and 533b are configured to be coincide, and the axes of the bearing housings 538, 533a and 533b are configured to be parallel to a same horizontal direction. Some bearings (hidden in figures) configured to connect the shaft 535 and the bearing housings 533a and 533b respectively, so that the shaft 535 is constrained to rotate relative to the bearing housings 533a and 533b, around the axis of the shaft 535. The base of the bearing housing 542 of the motion mechanism 503 is configured to rigidly connected to the support component 536 (the connection is not shown in figures), wherein the axis of the shaft 545 is configured to be parallel but not identical to the axis of the shaft 535; wherein the axis of the shaft 546 is configured to be parallel but not identical to the axis of the shaft 535. The axes of the shafts 545, 535 and 546 are configured to be never co-planar. In fact, the distance between the axes of the shafts 535 and 545 is usually smaller than the distance between the axes of the shafts 535 and 546; and the distance between the shafts 545 and 546 is variable. The shaft 545 is configured to be inserted into (and be constrained by) the curved track of the cam 541 of the motion mechanism 503. The motor 81F of the motion mechanism 503 may produce a rotation of the cam 541 around the axis of the shaft 546, and hence may move the axis of the shaft 545, and hence may produce a rotation of the bearing housing 533a relative to the support component 536.

The cooked food unloading mechanism 505 further comprises a cleaning apparatus 504; a funnel 561; a connecting component 562. The connecting component 562 is configured to reinforce the rigidity of the funnel 561. The connecting component 562 is configured to rigidly connect the funnel 561 to the support component 536, so that the positions of the funnel 561 and the support component 536 are fixedly respect to each other. The cleaning apparatus 504 comprises water pipes 551, 552, 555, 556, 557 and 558. The water pipes 555, 556, 557 and 558 are configured to be fixedly attached on the inner surface of the funnel 561. All water pipes are configured to be connected to each other by a plurality of pipe connectors 553 and 554, so that water may flow from one pipe to another. The cleaning apparatus 504 further comprises a water source 519 configured to flow water to the water pipe 551. Each of the water pipes 555, 556, 558 and 557 comprises a plurality of small holes or spray devices (not shown in figures) so that water may be sprayed out from the small holes or spray devices, as to clean the inner surface of the funnel 561.

Figure 11:
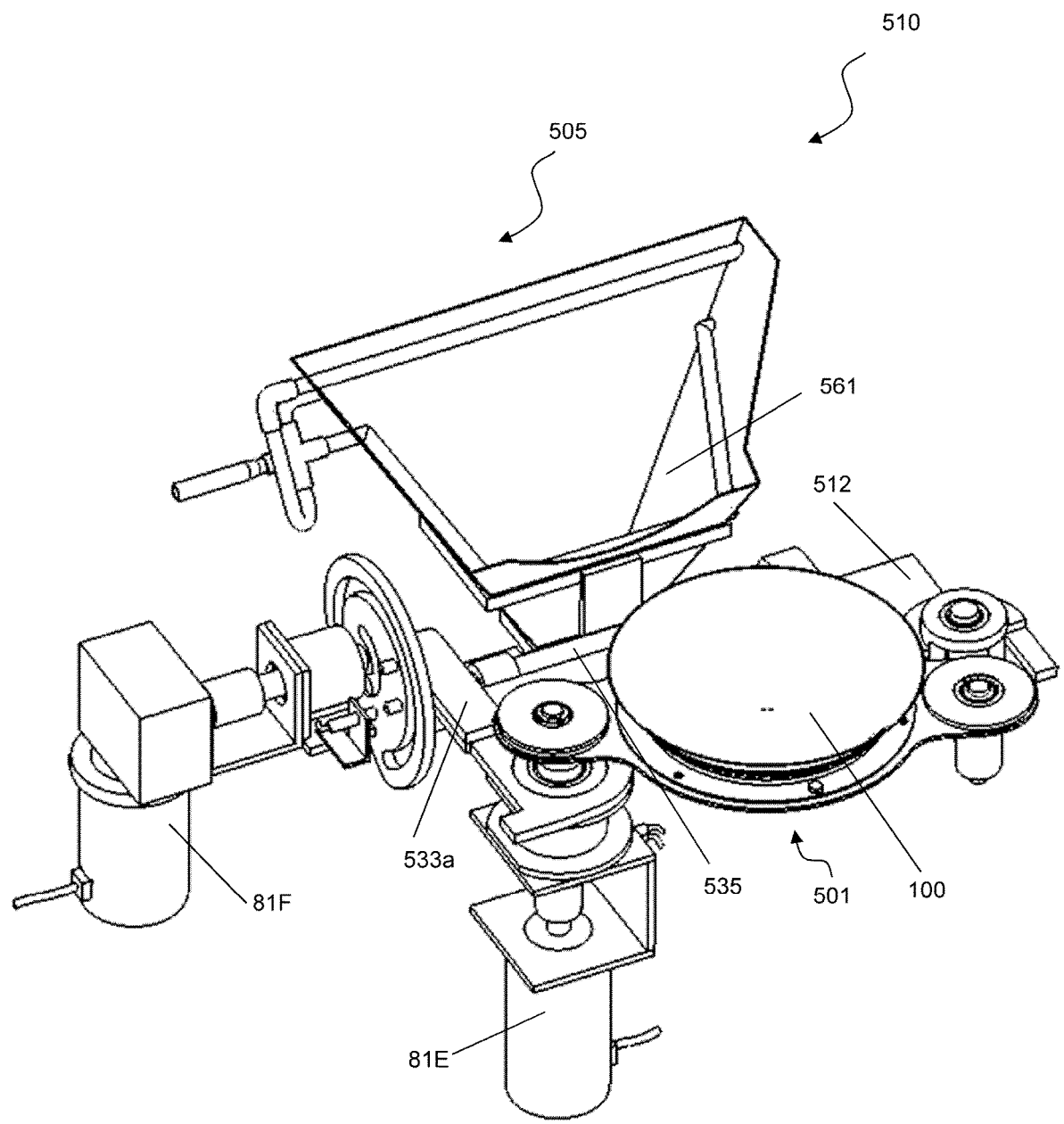
FIG. 11 shows an aerial view of a cooking sub-system.

Referring to FIG. 11, a cooking sub-system 510 comprises the cooking apparatus 501 and the cooked food unloading mechanism 505. The support component 512 of the cooking apparatus 501 is configured to be rigidly connected to the bearing housings 533a and 533b respectively of the cooked food unloading mechanism 505. Thus, when the motor 81F drives a rotation of the cam 541, the support component 512 of the cooking apparatus 501 would be rotated relative to the support component 536 around the axis of the shaft 535. Under the control of the first computer 901, when the cooked food unloading mechanism 505 drives the support component 512 of the cooking apparatus 501 around the axis of the shaft 535 to a first position that the proximity sensor 91H monitoring the target 541a, the cookware 100 is configured to be positioned upright, and the stirring motion mechanism 502 then produces a cyclic planar motion in the cookware 100 relative to the support component 512, as to stir, mix or distribute the food or food ingredients contained in the cookware 100. When the cooked food unloading mechanism 505 drives the support component 512 of the cooking apparatus 501 around the axis of the shaft 535 to the second position that the proximity sensor 91H monitoring the target 541b, the cookware 100 is rotated to the second end position as to be able to dispense cooked food or waste water into the funnel 561.

Figure 12A:
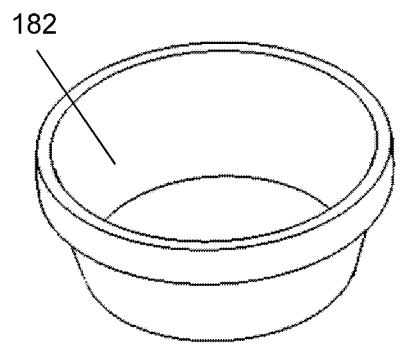
FIG. 12A shows an aerial view of a food container.
Figure 12B:
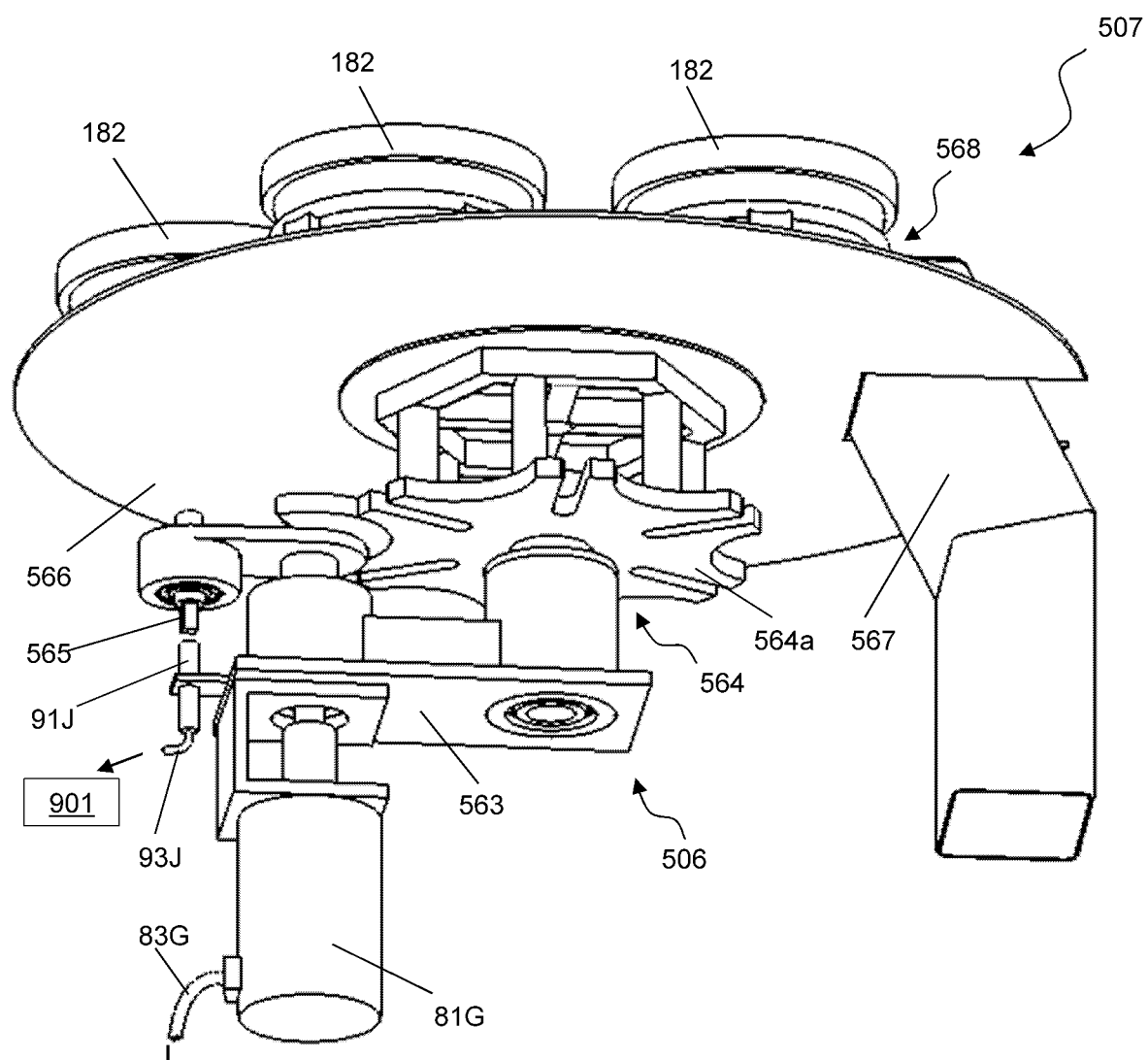
FIG. 12B shows an aerial view of a receiving apparatus.

Referring to FIGS. 12A-12B, a receiving apparatus 507 comprises a transfer mechanism 506, wherein the transfer mechanism 506 comprises: a turntable 566; a support component 563;

a motor 81G comprising a shaft and a base component; a Geneva drive mechanism 564 comprising a Geneva 564a, wherein the Geneva 564a is configured to be rigidly connected to the turntable 566, wherein the Geneva 564a is constrained to rotate relative to the support component 563 around a vertical axis. The base component of the motor 81G is fixedly connected to the support component 563 and the shaft of the motor 81G is fixedly connected to an input shaft of the Geneva drive mechanism 564. As the motor 81G rotates the input shaft of Geneva drive mechanism 564 one round (360 degrees), the Geneva 564a and the turntable 566 are rotated synchronously by a fixed angle. This may be called a period of the intermittent motion.

The receiving apparatus 507 further comprises: a waste water passage 567 configured to pass waste water; a plurality of food container 182; a plurality of container holders 568. The waste water passage 567 is configured to be rigidly connected to the turntable 566. Each of the container holders 568 comprises: a horizontal plate in the shape of a circle; a ring with a vertical axis; and a plurality of connectors configured to rigidly connect the ring and the horizontal plate. The container holders 568 are configured to be rigidly attached to the top of the turntable 566. When a food container 182 in the upright position is placed on a container holder 568, the bottom of the food container 182 may touch the horizontal plate, and the exterior surface of the food container 182 may be (touched and/or) restrained by the ring of the container holder 568. The waste water passage 567 and the container holders 568 and the food containers 182 held by the container holders 568 may be cyclically moved in an intermittent rotation with the turntable 566 by the transfer mechanism 506.

The receiving apparatus 507 further comprises a proximity sensor 91J which is fixedly connected to the support component 563 via a connector, and a target 565 which is rigidly connected to a crank of the Geneva mechanism 564 of the transfer mechanism 506. As shown in FIG. 12B, the motor 81G of the transfer mechanism 506 is connected to the first computer 901 via wires 83G. The first computer 901 may be configured to dynamically control the timing and/or speed of the motor 81G. The proximity sensors 91J are also connected to the first computer 901 via wires 93J, so the first computer 901 may receive signals from the proximity sensor 91J. The proximity sensor 91J senses the target 565 when the target is rotated with the crank of the Geneva mechanism 564. Each time the proximity sensor 91J senses the target 565 and the signals of the proximity sensor 91J are sent to the first computer 901, the first computer 901 can figure out the position of the target, and the position of the support component 563. Then the first computer 901 would send signals to the motor 81G as to control the rotation of the motor 81G to stop for a time period. At each stop of the intermittent rotation, either a food container 182 or the water passage 184 may be rotated to certain position (i.e. the position right below the funnel 561 of the cooked food unloading mechanism 505).

Figure 13A:
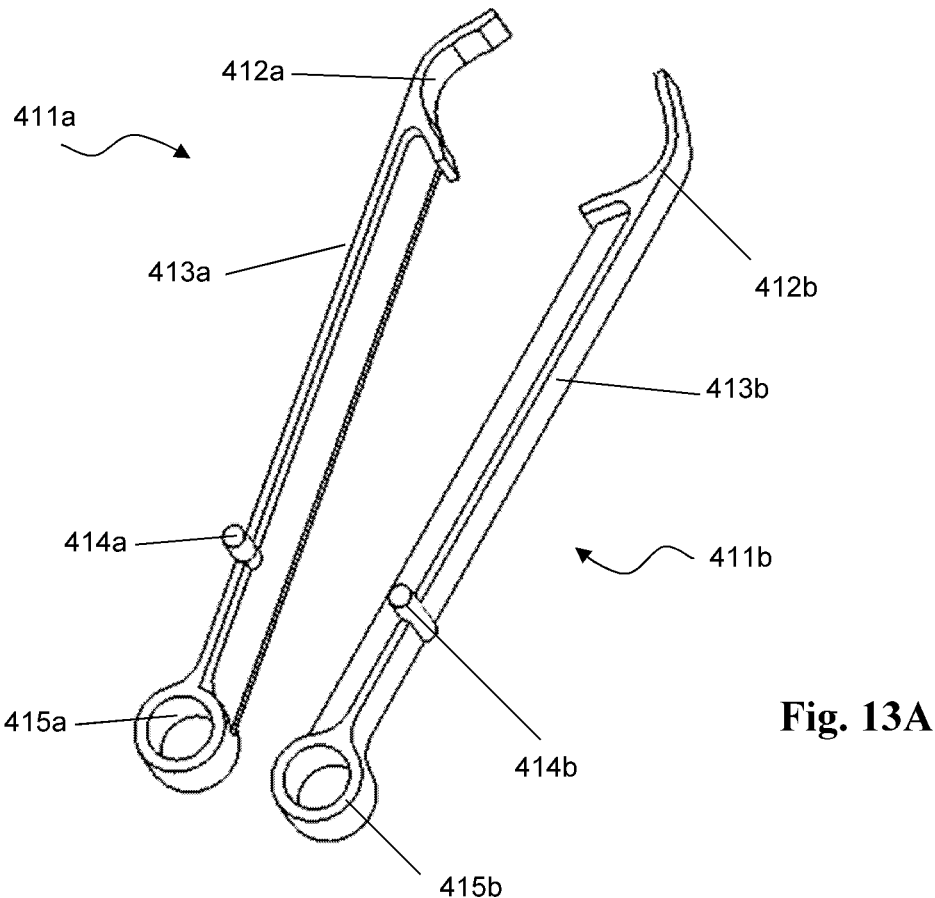
FIGS. 13A-13C show aerial views of parts of a gripping mechanism.
Figure 13B:
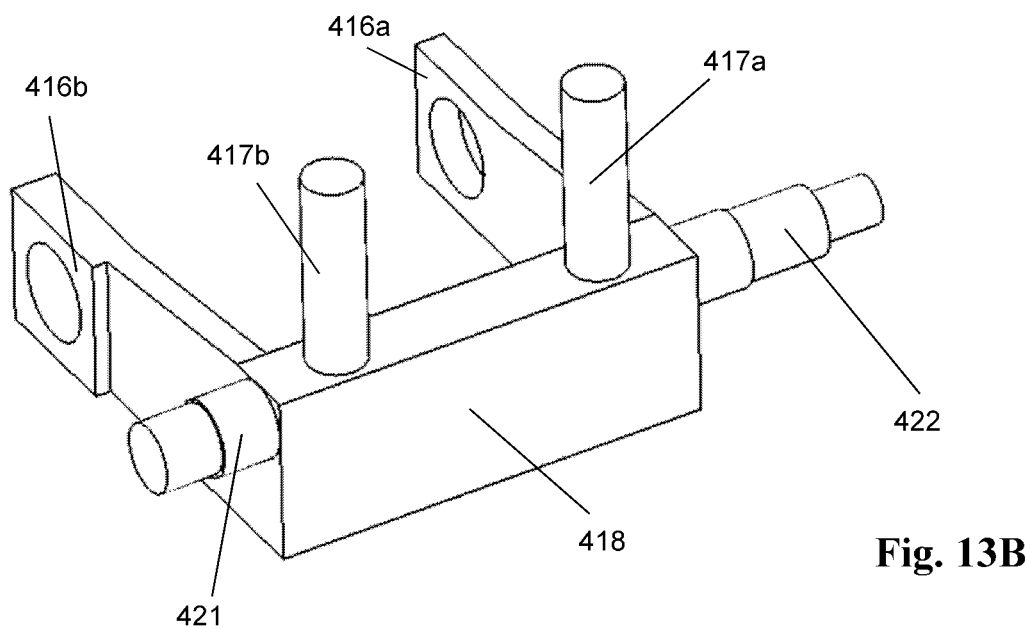

Referring to FIGS. 13A-13D, a gripping mechanism 401 comprises a pair of gripping devices 411a and 411b; a support component 418 referred to as the support component of the gripping mechanism 401; a pair of shafts 417a and 417b; two rigid components 416a and 416b each comprising a bearing housing (corresponding to a round hole shown in FIG. 13B); and shafts 421 and 422. As shown in FIG. 13A, the gripping device 411a (or 411b) comprises a bearing housing 415a (or respectively 415b); a gripper 412a (or respectively 412b) comprising a part of a cylindrical surface; an arm 413a (or respectively 413b); a shaft 414a (or respectively 414b); wherein the axis of the bearing housing 415a (or respectively 415b) and the axis of the shaft 414a (or respectively 414b) are configured to be parallel to each other. The arm 413a (or 413b) may comprise stiffeners. As shown in FIG. 13B, the shafts 421 and 422 are both rigidly connected to the support component 418 wherein the axes of the two shafts are concentric. The pair of shafts 417a and 417b are both rigidly connected to the support component 418 wherein the axes of the shafts 417a and 417b are configured to be parallel to each other, and perpendicular to the axes of the shafts 421 and 422. The two rigid components 416a and 416b are both rigidly connected to the support component 418. The axes of the bearing housings of the rigid components 416a and 416b are configured to be the same, and parallel to the axes of the shafts 421 and 422.

A pair of bearings 424a (and accessories) are configured to connect the shaft 417a and the bearing housing 415a of the gripping device 411a, so that the gripping device 411a is constrained to rotate relative to the shaft 417a (or equivalently, relative to the support component 418) around the axis of the shaft 417a. Similarly, another pair of bearings 424b (and accessories) are configured to connect the shaft 417b and the bearing housing 415b of the gripping device 411b, so that the gripping device 411b is constrained to rotate relative to the shaft 417b (or equivalently, relative to the support component 418) around the axis of the shaft 417b.

Figure 13C:
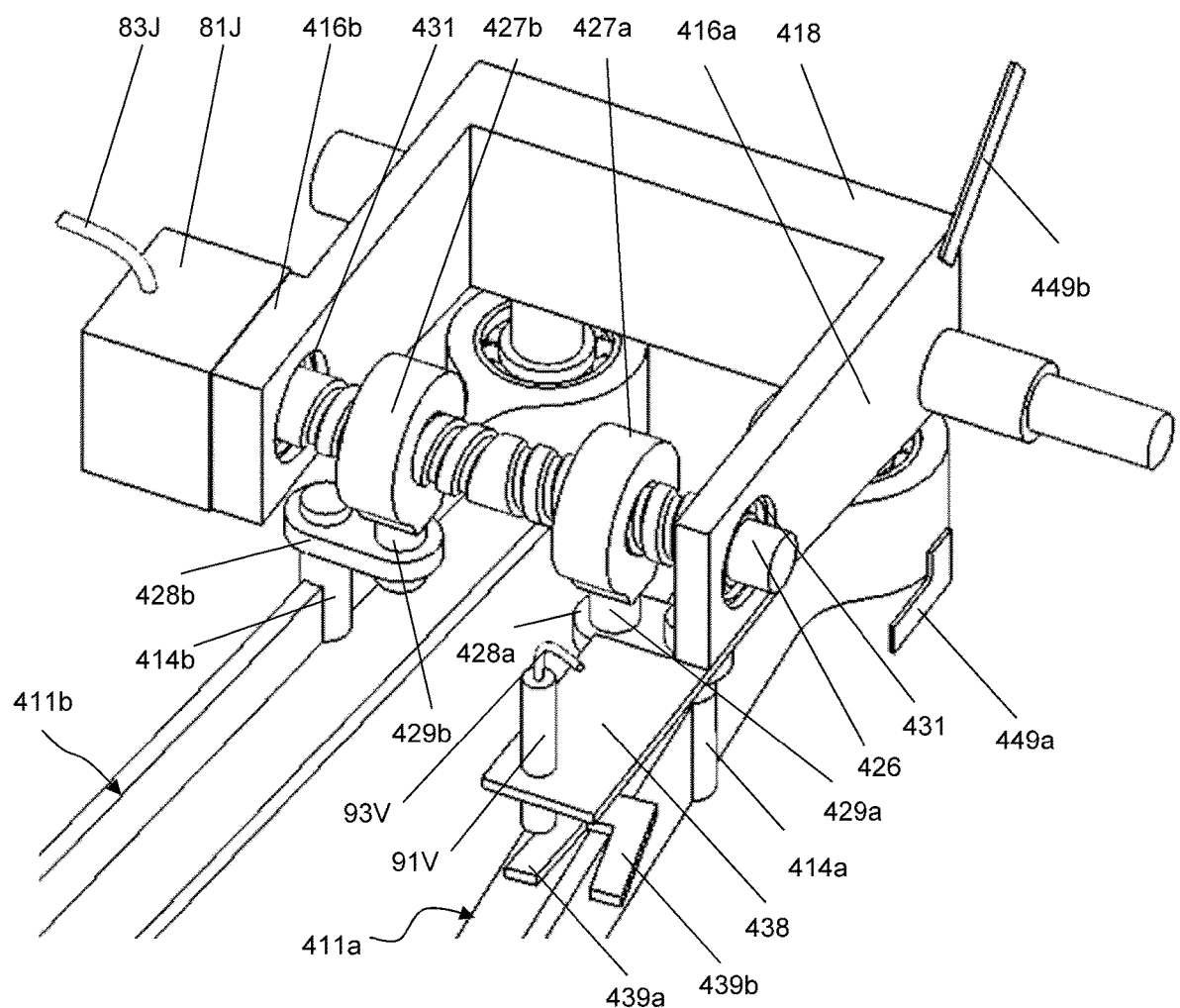
Figure 13D:
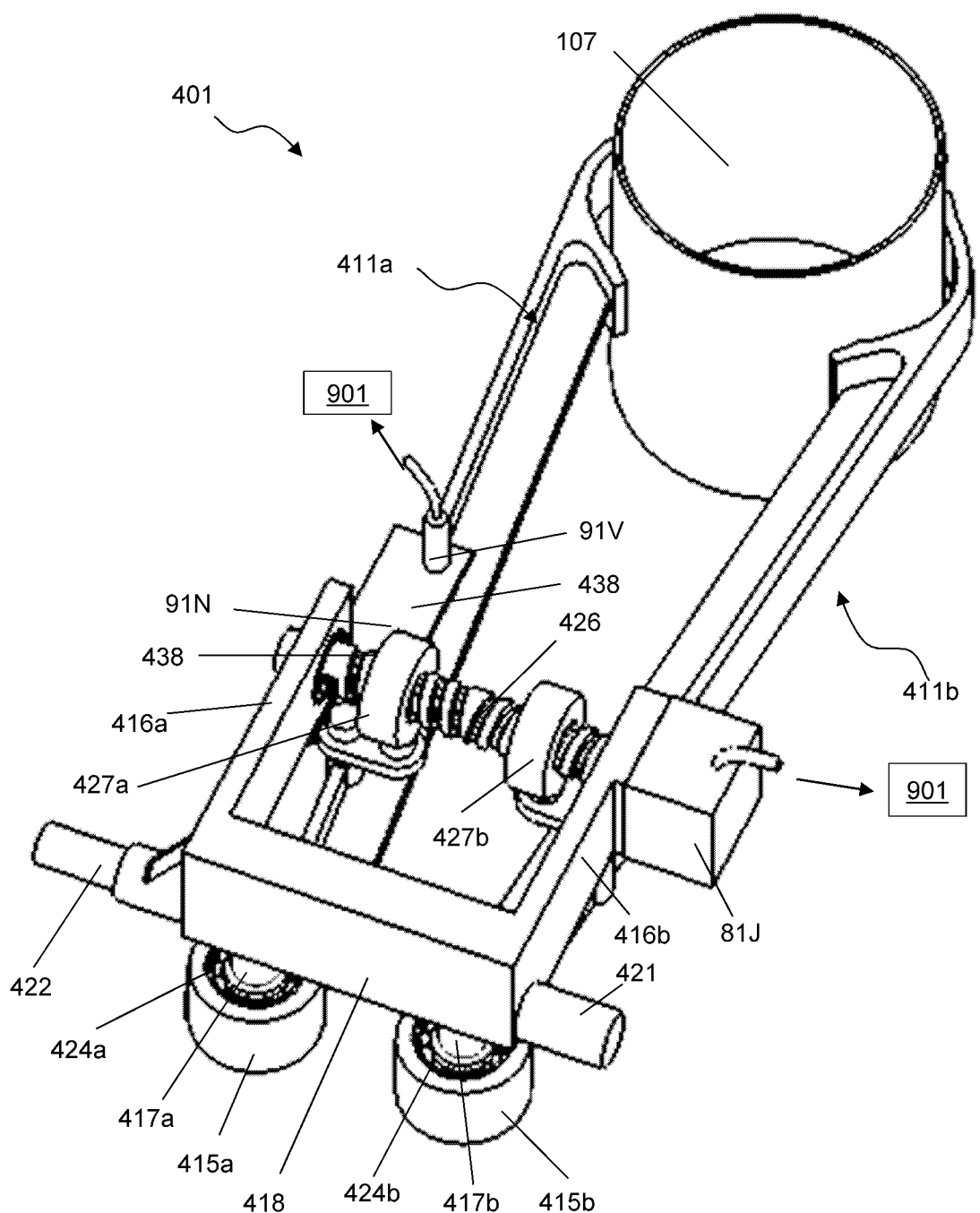
FIG. 13D shows an aerial view of the gripping mechanism.

As shown in FIGS. 13C-13D, the gripping mechanism 401 further comprises: a pair of screw nuts 427a and 427b; a pair of shafts 429a and 429b; a pair of links 428a and 428b; a screw shaft 426; and a motor 81J comprising a base component and a shaft. The shaft 429a (or 429b) is rigidly joined with the screw nut 427a (or respectively 427b), and the axis of the shaft 429a (or 429b) is configured to be perpendicular to the axis of the screw nuts 427a (or respectively 427b). The shaft 429a (or 429b) is constrained to rotate relative to the link 428a (or respectively 428b) around the axis of the shaft 429a (or respectively 429b). The shaft 414a (or 414b) is constrained to rotate relative to the link 428a (or respectively 428b) around the axis of the shaft 414a (or respectively 414b). The axis of the shaft 414a (or 414b) is configured to be parallel to the axis of the shaft 429a (or respectively 429b). The screw shaft 426 is configured to be engaged with the screw nuts 427a and 427b. When the screw shaft 426 rotates, the screw nuts 427a and 427b are configured to simultaneously move in opposite directions, by the same speed. A pair of bearings 431 are configured to connect the above discussed bearing housing of the rigid component 416a with a smooth round section of the screw shaft 426, and another pair of bearings 431 are configured to connect the above discussed bearing housing of the rigid component 416b with another smooth round section of the screw shaft 426, so that the screw shaft 426 is constrained to rotate relative to the rigid components 416a and 416b (or equivalently, relative to the support component 418) around the axis of the screw shaft 426. A rotation of the screw shaft 426 may induce translations of the screw nuts 427a and 427b relative to the screw shaft 426, hence the shafts 429a, 429b, 414a and 414b are moved relative to the support component 418. The motion of the shaft 414a (or 414b) induces a rotation of the gripping device 411a (or respectively 411b) relative to the support component 418, around the axis of the shaft 417a (or respectively 417b). It should be noted that the gripping devices 411a and 411b are rotated simultaneously in opposite directions. Since the gripping devices 411a and 411b are rotated, the grippers may grip or release an ingredient container 107 which may contain or otherwise hold food or food ingredients. The base component of the motor 81J is configured to be rigidly or fixedly connected to the rigid component 416b, and the shaft of the motor 81J is configured to fixedly connected to and concentric with the screw shaft 426, so that the motor 81J may drive a rotation of the screw shaft 426 around the axis of the screw shaft 426. Thus, the rotation produced by the motor 81J on the screw shaft 426 may induce simultaneous rotations of the gripping devices 411a and 411b in opposite directions as to grip or release an ingredient container 107.

The gripping mechanism 401 further comprises: a proximity sensor 91V; a connector 438 configured to fixedly connect the proximity sensor 91V to the rigid component 416a; targets 439a and 439b; targets 449a and 449b. The targets 439a and 439b are both fixedly connected to arm 413a of the gripping device 411a. The target 449a is fixedly connected to the bearing housing 415a of the gripping device 411a and the target 449b is fixedly connected to the support component 418. As shown in FIG. 13C, the motor 81J is connected to the first computer 901 via wires 83J. The first computer 901 may be configured to dynamically control the timing and/or speed of the motor 81J. The proximity sensor 91V is also connected to the first computer 901 via wires 93V, so the first computer 901 may receive signals from the proximity sensor 91V. The proximity sensor 91V monitors the targets 439a and 439b when the targets are rotated with the pair of gripping devices 411a and 411b. When the proximity sensor 91V senses the target 439a, the gripping devices 411a and 411b are rotated by the motor 81J to a first position as to grip an uncapped ingredient container 107. When the proximity sensor 91V senses the target 439b, the gripping devices 411a and 411b are rotated by the motor 81J to a second position as to release the uncapped ingredient container 107.

It should be noted that the screw threads of the screw nuts 427a and 427b may be configured to be of opposite helical directions, while the screw shaft 426 is configured to comprise two corresponding screw threads with opposite helical directions.

Figure 13E:
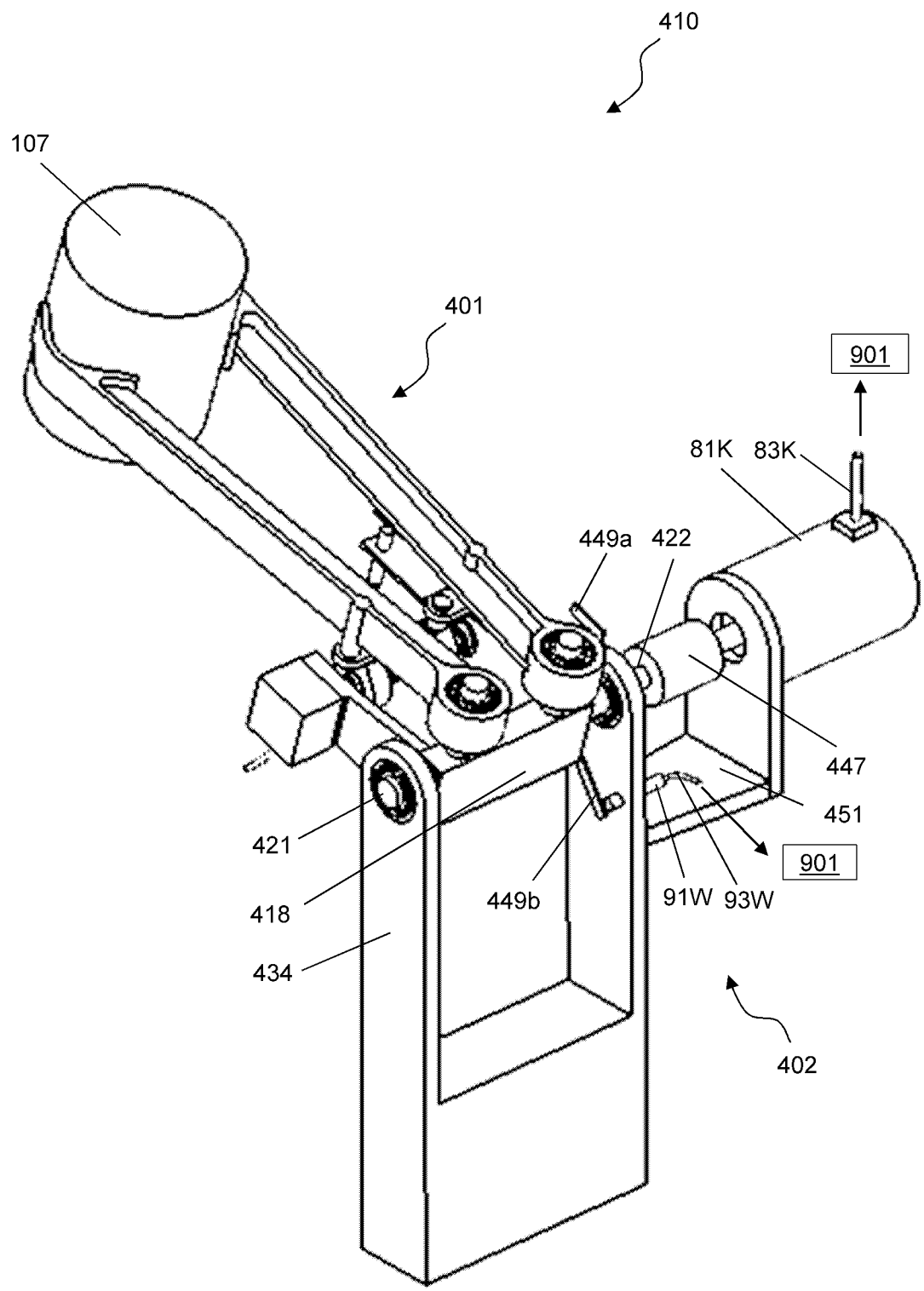
FIG. 13E shows an aerial view of an ingredient dispensing apparatus which comprising the gripping mechanism.

Referring to FIG. 13E, an ingredient dispensing apparatus 410 comprises the gripping mechanism 401 and a motion mechanism 402, wherein the motion mechanism 402 comprises: a support component 434; a motor 81K comprising a base component and a shaft; a connector 451; a coupling 447. The support component 434 comprises two bearing housing wherein the axes of the two bearing housings are concentric. A pair of bearings are configured to connect the shafts 421 and 422 to the two bearing housings respectively, so that the support component 418 of the gripping mechanism 401 is constrained to rotate relative to the support component 434 around the axis of the shaft 422. The base component of motor 81K is fixedly connected to the support component 434 via the connector 451 and the shaft of the motor 81K is connected to the shaft 422 of the gripping mechanism 401 via the coupling 447. Thus, the motor 81K may drive a rotation of the support component 418, together with a gripped ingredient container if any, e.g., relative to the support component 434 around the axis of the shaft 422.

The motion mechanism 402 of the ingredient dispensing apparatus 410 further comprises a proximity sensor 91W fixedly connected to support component 434. As shown in FIG. 13E, the motor 81K of the motion mechanism 402 is connected to the first computer 901 via wires 83K. The first computer 901 may be configured to dynamically control the timing and/or speed of the motor 81K. The proximity sensor 91W is also connected to the first computer 901 via wires 93W, so the first computer 901 may receive signals from the proximity sensor 91W. The proximity sensor 91W monitors the targets 449a and 449b when the targets are rotated with the gripping mechanism 401 by the motor 81K. When the proximity sensor 91W senses the target 449a, the support component 418 of the gripping mechanism 401 is rotated by the motor 81K to a first position. The axis of a gripped ingredient container (e.g., ingredient container 107), if any, is configured to be vertical and the gripped ingredient container is positioned upright. When the proximity sensor 91W senses the target 449b, the support component 418 of the gripping mechanism 401 is rotated by the motor 81K to a second position. When the support component 418 of the gripping mechanism 401 is rotated from the first position to the second position, the gripped ingredient container 107, if any, is configured to rotate by a certain degree as to dispense the food or food ingredients from the ingredient container 107 into a cookware 100, as shown in FIG. 13E (where the ingredient container 107 is positioned with bottom on the up side). It should be noted that the angular range of rotation of the support component 418 between the two positions, may be configured to be a constant chosen between 120 to 180 degrees, or in a more restrictive application, between 135 to 170 degrees. Each time the support component 418 of the gripping mechanism 401 is rotated to the first or second position, the first computer 901 can figure out the position of the targets, and the position of the support component 418. As a result, the ingredient dispensing apparatus 410 is configured to grip an ingredient container 107 holding food of food ingredients and rotate it a certain angle to dispense the food or food ingredients in the ingredient container 107 into a cookware 100.

Figure 14:
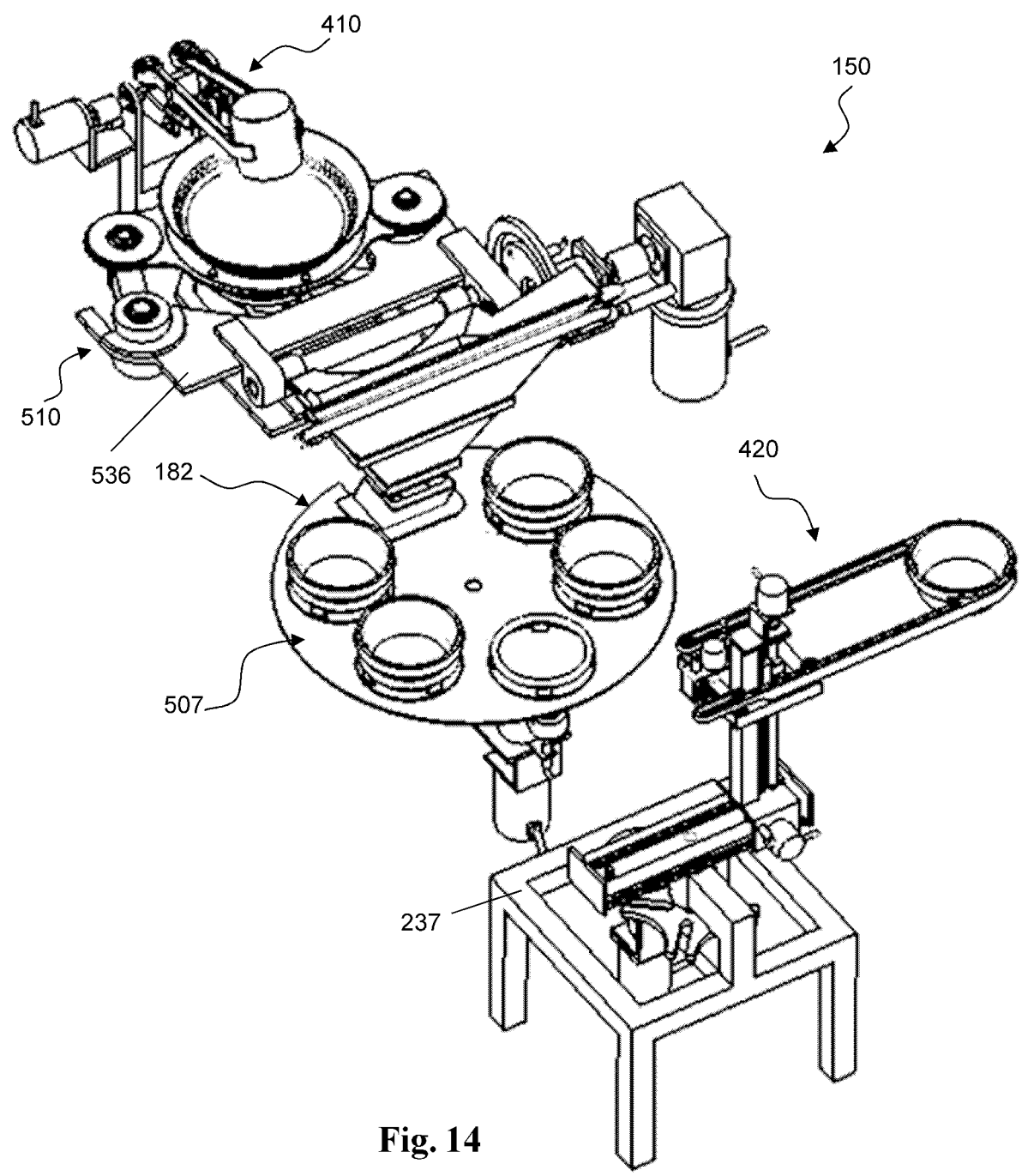
FIG. 14 shows an aerial view of a cooking station.

Referring to FIG. 14, a cooking station 150 comprises: the dish loading apparatus 420; the receiving apparatus 507; the cooking sub-system 510 and the ingredient dispensing apparatus 410. The support component 434 of the ingredient dispensing apparatus 410, the support component 536 of the cooking sub-system 510 and the support component 563 of the receiving apparatus 507 are configured to be properly fixed, so that, the ingredient dispensing apparatus 410 is configured to grip and then rotate an ingredient container 107 from the first end position to the second position to dispense the food or food ingredients into the cookware 100 of the cooking sub-system 510; so that when the motor 81G of the receiving apparatus 507 can rotate the turntable 566, the food containers 182 and the waste water passage 567 of the receiving apparatus 507 to be right below the funnel 561 of the cooking sub-system 510. The cooking station 150 further comprises a support frame 237. The support component 494 of the dish loading apparatus 420 is fixedly connected to the support frame 237. The support frame 237 and the support component 563 of the receiving apparatus 507 are configured to properly fixed, so that the dish loading apparatus 420 is configured to grip a food container 182 which is holding a cooked food, and then transfer it to a container holder (i.e. the container holder 159 of a marked vehicle when the marked vehicle is moved to a proper position relative to the support component 494 of the dish loading apparatus 420; see, e.g., FIG. 20 below).

Figure 15A:
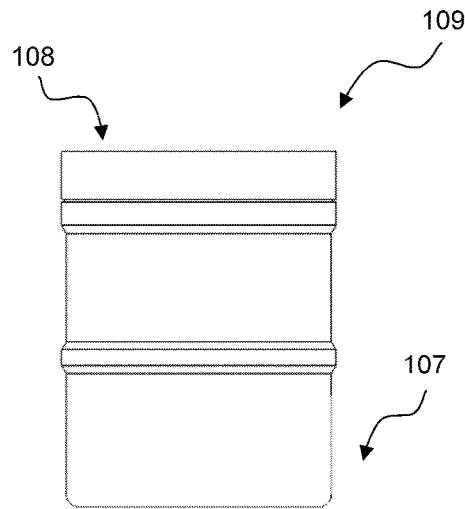
FIG. 15A shows an aerial view of a capped ingredient container.

Referring to FIG. 15A, a capped container 109 comprises a cap 108 and a container 107. Both the cap 108 and the container 107 are round around a central axis. The cap 108 may be removed from the container by a force that moves the cap linearly along the central axis (away from the container 107) relative to the container 107; and the cap 108, if removed from the container, may be put on the container 107 by a force that moves the cap in the opposite direction.

Figure 15B:
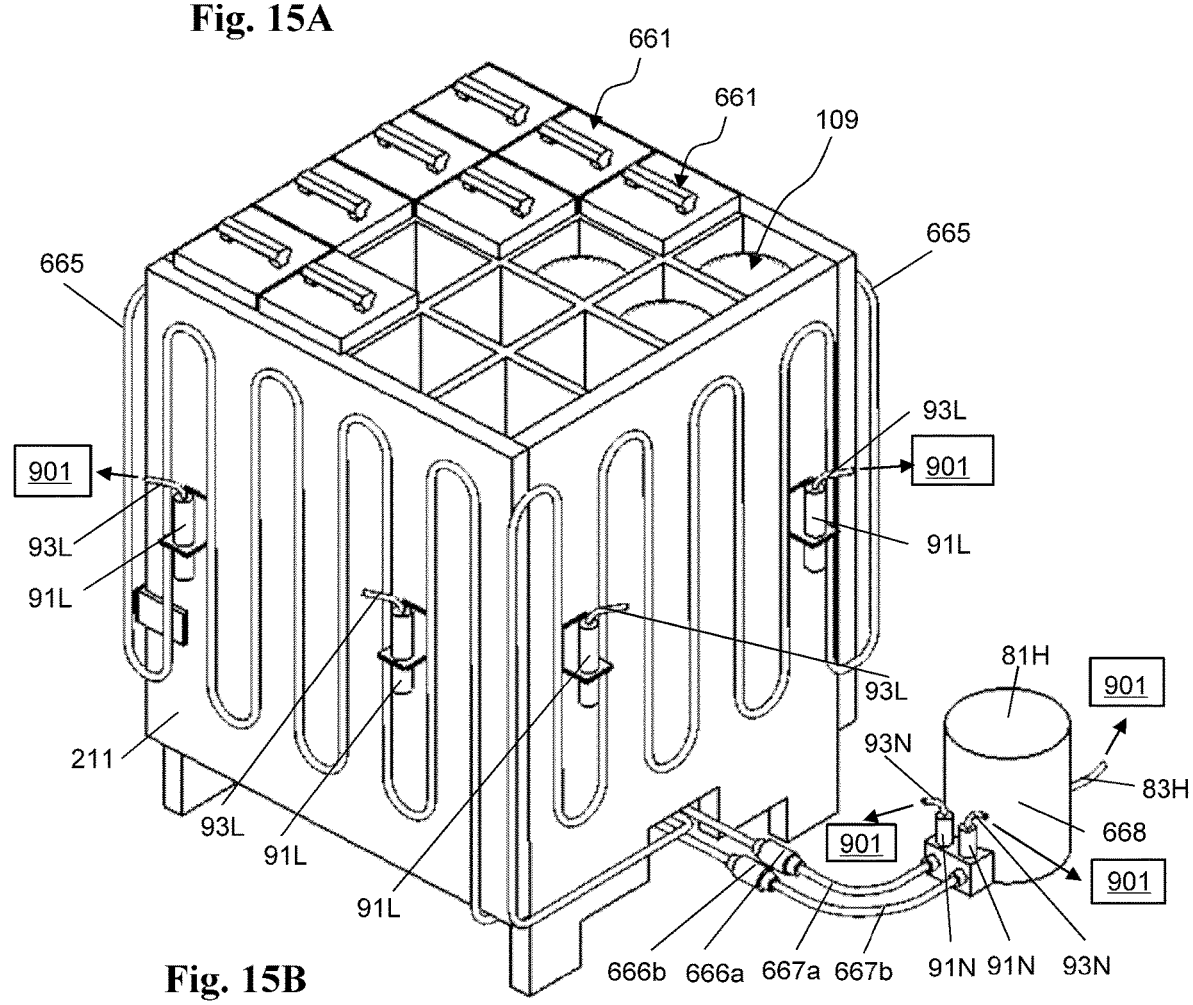
FIG. 15B shows an aerial view of parts a storage apparatus.
Figure 15C:
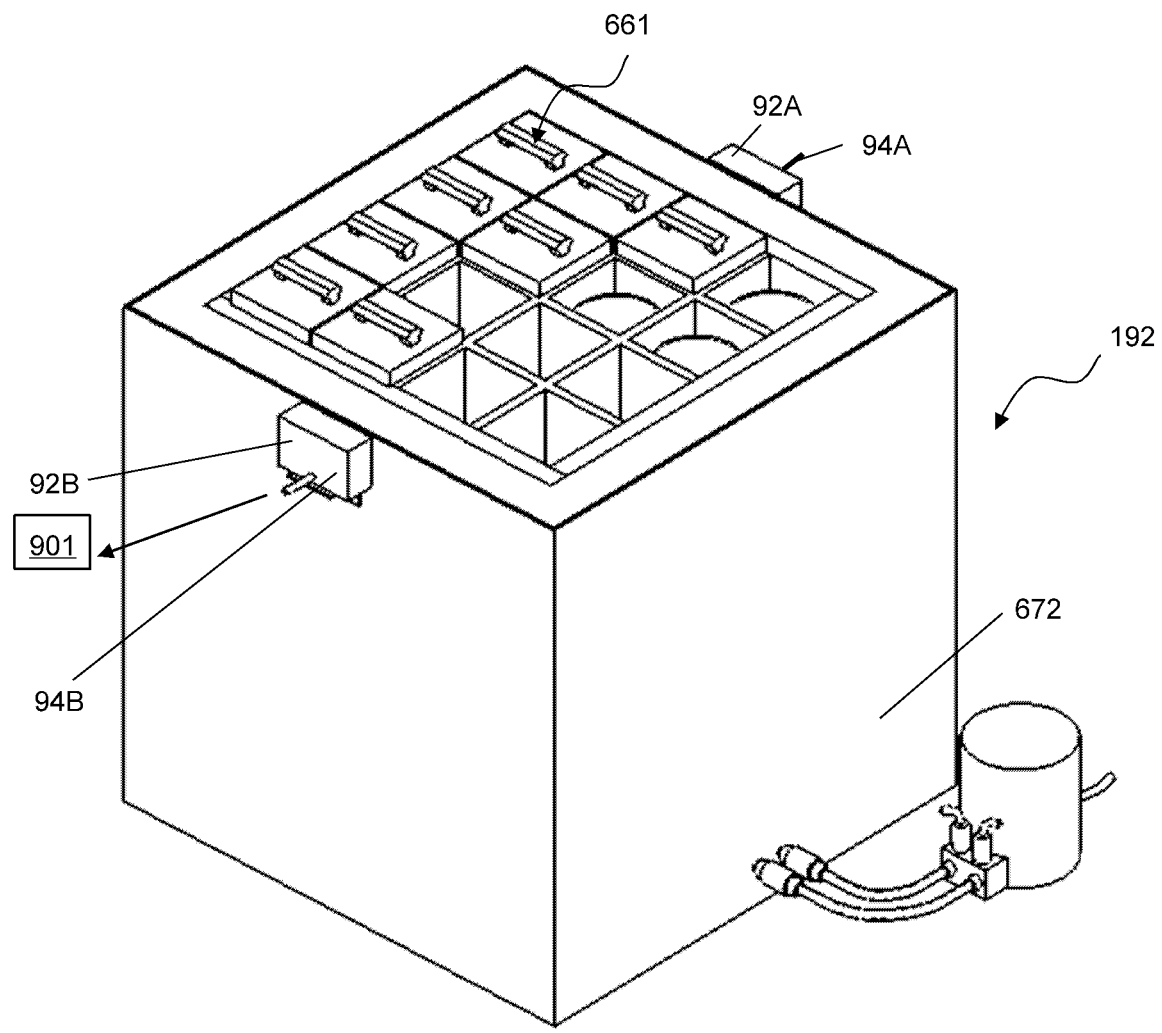
FIG. 15C shows an aerial view of the storage apparatus.

Referring to FIGS. 15B-15C, a storage apparatus 192 comprises a plurality of insulation covers 661 and storage box 211. The storage box 211 comprising a plurality of compartments arranged in a rectangular or squared grid, wherein each compartment is configured to store a plurality of capped ingredient containers 109 wherein the capped ingredient containers 109 are stacked vertically in the compartment. Each insulation cover 661 is configured to cover or seal the opening (at the top) of a compartment in the storage box 211. Each insulation cover 661 is configured to help limit heat flow between the inside of the corresponding compartment and the outside. It should be noted that each capped ingredient container 109 comprises: an ingredient container 107 configured to contain or otherwise hold food and food ingredients; a cap 108 configured to cap and seal the ingredient container 107.

The storage apparatus 192 further comprises a refrigeration mechanism comprising: a coil pipe 665; pipe connectors 666a and 666b; and a sub-mechanism 81H. The coil pipe 665 is fixedly attached to the surface of the storage box 211 by a plurality of accessories (not shown in figure). The sub-mechanism 81H comprises a pair of pipes 667a and 667b, i.e. one outlet and one inlet. The pipe connector 666a is configured to connect one of the end of the coil pipe 665 to the pipe 667a; and the pipe connector 666b is configured to connect the other end of the coil pipe 665 to the pipe 667b. The sub-mechanism 81H may pump in refrigerating fluid into the coil pipe 665 through the pipe connector 666a and the pipe 667a, and then the refrigerating fluid may flow from the coil pipe 665 through the pipe connector 666b and the pipe 667b. The refrigerating fluid is configured to flow in the cyclic and airtight system to refrigerate the areas around the storage box 211. The sub-mechanism 81H is configured to cool the fluid as the fluid flows into the sub-mechanism 81H. The sub-mechanism 81H may be water cooled or air cooled. The sub-mechanism 81H may comprise a compressor, a pipe, a motor, a cooling panel or cooling plate, a fan, etc., as in a home or commercial refrigerator.

The storage apparatus 192 further comprises a plurality of temperature sensors 91L which are fixedly attached to the exterior or respectively the bottom of the storage box 221 to detect the temperature at a plurality of locations of the storage apparatus 192. As shown in FIG. 15C, the sub-mechanism 81H is connected to the first computer 901 via a wire 83H. The first computer 901 is configured to dynamically control the timing and/or power of the sub-mechanism 81H. The temperature sensors 91L are also connected to the first computer 901 by wires 93L, so the first computer 901 may receive signals from the temperature sensors 91L. When the first computer 901 receives the signals of the temperature sensors 91L and them show that the temperature of the storage box 211 is beyond (or below) the designed temperature range, the first computer 901 may control the sub-mechanism 81H to increase (or respectively reduce) the power (or working time) to keep the temperature in the designed range. Thus, under the control of the first computer 901, the temperature of the storage box 211 and the capped ingredient containers 109 in it can be kept in a certain range as to keep the food ingredients of the ingredient containers 107 stored in the storage apparatus 192 fresh.

The sub-mechanism 81H of the refrigeration mechanism also comprise one or more temperature sensors 91N and a heat insulation member 668, wherein the temperature sensors 91N are configured to detect the temperature of the refrigerating fluid in the sub-mechanism 81H; wherein the temperature sensors 91N are connected to the first computer 901 by wires 93N; wherein the heat insulation member 668 is configured to help limit heat flow between the sub-mechanism 81H and the outside.

The storage apparatus 192 further comprises a heat insulation member 672 configured to help limit heat flow between the storage box 211 and the outside. The heat insulation member 672 is also in the shape of a box.

The storage apparatus 192 further comprises scanners 92A and 92B both of which are fixedly connected to a side of the heat insulation member 672 via accessories. As shown in FIG. 15C, the scanners 92A and 92B are connected to the first computer 901 by wires 94A and 94B respectively, so the first computer 901 may receive signals from the scanners 92A and 92B. When a capped ingredient container 109 is being moved into the storage box 211 of the storage apparatus 192, it passes through a position right above the scanner 92B so that the scanner 92B may read QR code or barcode (not shown in figures) on the bottom surface of the capped ingredient container 109, and then send signals to the first computer 901 as to inform the first computer 901 of the codes and the first computer 901 may record the codes. When a capped ingredient container 109 is being moved away from the storage box 211, the capped ingredient container 109 passes through a position right above the scanner 92A, so that the scanners 92A may read the QR code or barcode of the capped ingredient container 109, and then send the signals to the first computer 901 to inform the first computer 901 of the codes. Then the first computer 901 would record the codes. The information of the barcode or QR code of the capped ingredient container 109 which is either moved in or moved out from the storage apparatus 192 is thus recorded by the first computer 901. The barcode or QR code on each container is configured to be unique. So, the identities of the containers can be recorded by the first computer 901.

Figure 15D:
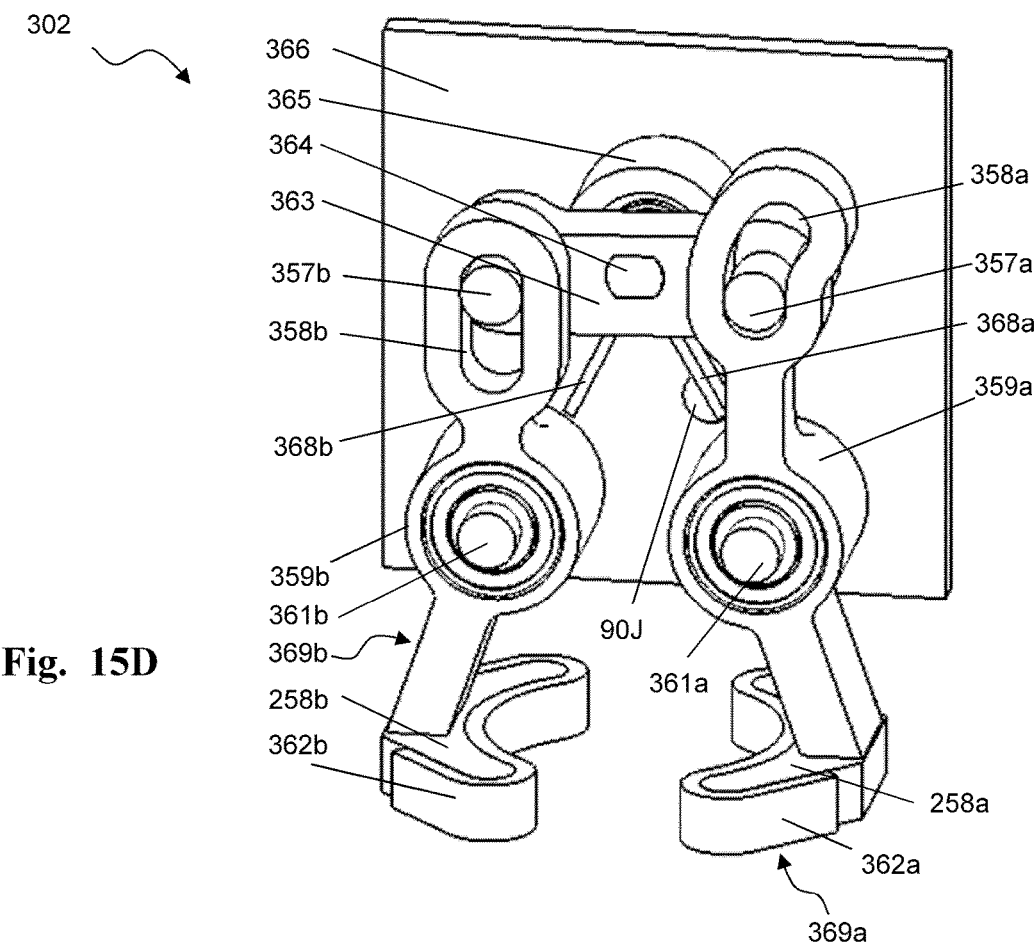
FIGS. 15D-15E show aerial views of a cap gripping mechanism.
Figure 15E:
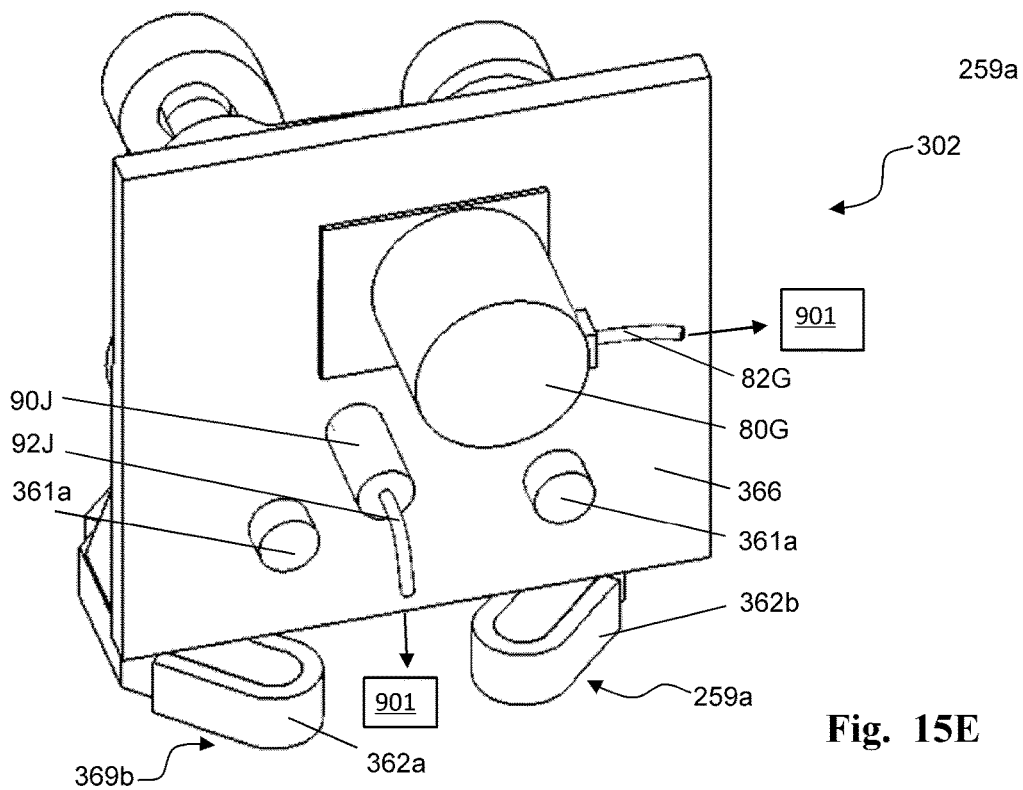

Referring to FIGS. 15D-15E, a cap gripping mechanism 302 comprises: a support component 366; gripping devices 369a and 369b; shafts 361a and 361b each of which comprises a horizontal axis. The gripping device 369a (or 369b) comprises a curved hole 358a (or respectively 358b), a bearing housing 359a (or respectively 359b), a gripper 258a (or respectively 258b). A part of the surface of the gripper 258a (or 258b) is in the shape of a part of a cylindrical surface. The gripping device 369a (or 369b) also comprises a rubber (or silica gel, or other similar elastic material) 362a (or respectively 362b) which is attached to the gripper 258a (or respectively, 258b). Both shafts 361a and 361b are rigidly connected to the support component 366. The bearing housing 359a of the gripping device 369a is constrained to rotate relative to the shaft 361a (or equivalently, relative to the support component 366) around the axis of the shaft 361a. Similarly, the bearing housing 359b of the gripping device 369b is constrained to rotate relative to the shaft 361b (or equivalently, relative to the support component 366) around the axis of the shaft 361b. The gripping device 369a (or 369b) is configured to be a rigid component.

The cap gripping mechanism 302 also comprises: shafts 357a, 357b and 364; a bearing housing 365; and a connector 363 configured to rigidly connect the shafts 357a, 357b and 364, wherein the axes of the shafts 357a, 357b and 364 are configured to be horizontal and parallel to each other; wherein the bearing housing 365 is rigidly connected to the support component 366. A pair of bearings are configured to connect the shaft 364 and the bearing housing 365, so that the shaft 364 is constrained to rotate relative to the bearing housing 365 (or equivalently relative to the support component 366) around the axis of the shaft 364, hence that the connector 363, the shaft 357a and 357b are constrained to rotate relative to the bearing housing 365 (or equivalently relative to the support component 366) around the axis of the shaft 364. The shaft 357a is configured to be inserted in the curved hole 358a of the gripping device 369a, so that a movement of the shaft 357a may induce a rotation in the gripping device 369a around the axis of the shaft 361a. Similarly, the shaft 357b is configured to be inserted in the curved hole 358b of the gripping device 369b, so that a movement of the shaft 357b may induce a rotation in the gripping device 369b around the axis of the shaft 361b.

The cap gripping mechanism 302 also comprises a motor 80G comprising a shaft and a base component, targets 368a and 368b, and a proximity switch 90J. The base component of the motor 80G is fixedly connected to the support component 366 and the shaft of the motor 80G is fixedly connected with the shaft 364. When the motor 80G drives a rotation of the shaft 364, the shafts 357a and 357b are rotated around the axis of the shaft 364. The movements of the shafts 357a and 357b induce the gripping devices 369a and 369b simultaneously rotated toward or away from a vertical axis (referred to as the central axis of the cap gripping mechanism 302) as to grip or release a cap of a capped container 109. The targets 368a and 368b are configured rigidly attached on the connector 363. The proximity switch 90J is configured to fixedly connect to the support component 366. The proximity switch 90J is configured to monitor the targets 368a and 368b when the targets are rotated with the connector 363. The motor 80G is connected to the computer 901 via wires 82G. The computer 901 is configured to dynamically control the timing and/or speed of the motor 80G. The proximity switch 90J is also connected to the computer 901 via wires 92J, so the computer 901 may receive signals from the proximity switch 90J. The computer 901 may also send signals to the motor 80G as to control the degree of rotation of the motor 80G. When the gripping devices 369a and 369b are rotated toward said central axis to a first position where the proximity switch 90J senses the target 368a, the gripping devices 369a and 369b are configured to grip a cap 108. At the same time, the signals of the proximity switch 90J are sent to the computer 901, the computer 901 can figure out the position of the target 368a, and the position of the gripping devices 369a and 369b. Similarly, when the gripping devices 369a and 369b are rotated away from said central axis to a second position where the proximity switch 90J senses the targets 368b, the gripping devices 369a and 369b are configured to release the cap 108. At the same time, the signals of the proximity switch 90J are sent to the computer 901. The computer 901 can figure out the position of the target 368b, and the position of the gripping devices 369a and 369b. Each time, the gripping devices 369a and 369b are moved to the first position or second position, the motor 80G, under the control of the computer 901, is stopped for time during which the cap gripping mechanism 302 completes a corresponding process. After this time, the motor 80G, under the control of the computer 901, may restart again and make a reverse rotation to rotate the gripping devices 369a and 369b to the second position or respectively the first position. Using the information sent by the proximity switch 90J, the computer 901 may accurately control the motion of the gripping devices 369a and 369b as to grip or release a cap 108 or a capped container 109.

Figure 15F:
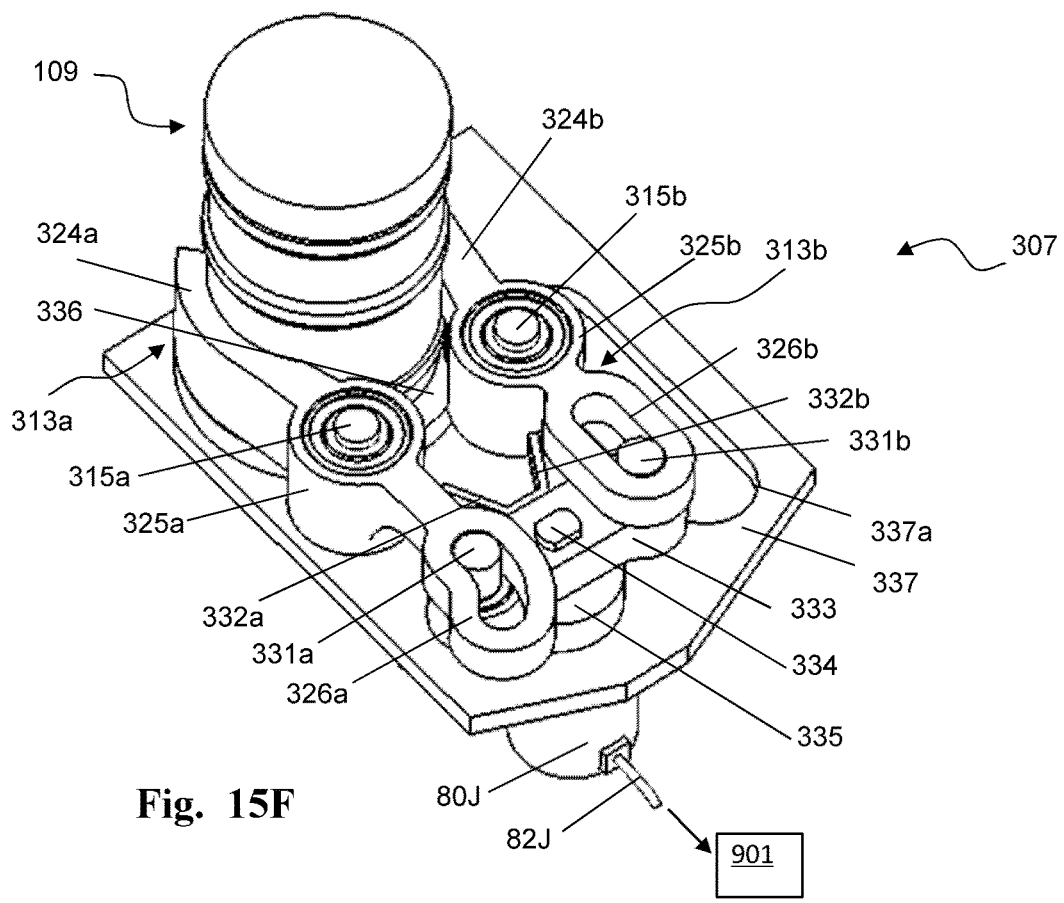
FIGS. 15F-15G show aerial views of a container gripping mechanism.
Figure 15G:
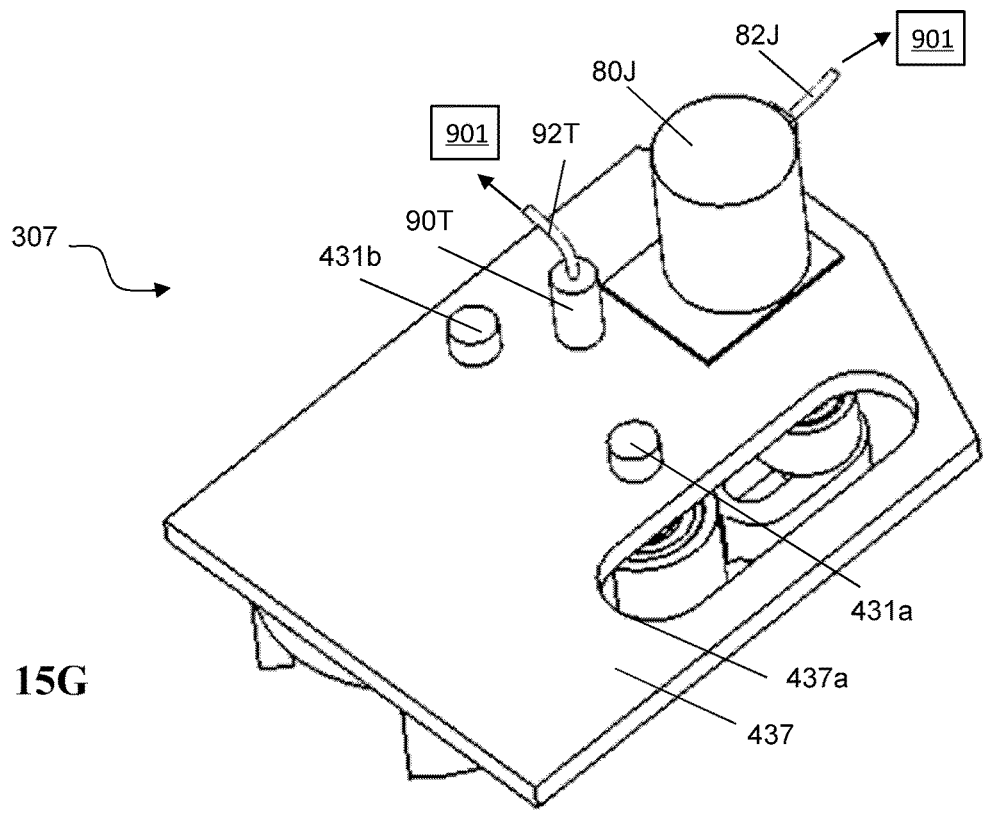

Referring to FIGS. 15F-15G, a container gripping mechanism 307 comprises: a support component 337 comprising a slotted hole 337a; two gripping devices 313a and 313b; two shafts 315a and 315b each of which comprises a vertical axis. The gripping device 313a (or 313b) comprises a curved hole 326a (or respectively 326b), a bearing housing 325a (or respectively 325b), a gripper 324a (or respectively 324b). A part of the surface of the gripper 324a (or 324b) is in the shape of a part of a cylindrical surface. Each of the gripping devices 313a and 313b also comprises a rubber (or silica gel, or other similar elastic material) which is attached to the gripper 324a (or respectively, 324b). Both shafts 315a and 315b are rigidly connected to the support component 337. The bearing housing 325a of the gripping device 313a is constrained to rotate relative to the shaft 315a (or equivalently, relative to the support component 337) around the axis of the shaft 315a. Similarly, the bearing housing 325b of the gripping device 313b is constrained to rotate relative to the shaft 315b (or equivalently, relative to the support component 337) around the axis of the shaft 315b. The gripping device 313a (or 313b) is configured to be a rigid component.

The container gripping mechanism 307 also comprises: shafts 331a, 331b and 334; a bearing housing 335; a holder 336 comprising a flat bottom and a ring-shaped wall with a vertical axis, wherein the holder 336 is configured to position the ingredient container 107 of a capped ingredient container 109 in such a way that the axis of the ingredient container 107 coincides or nearly coincides with the axis of the ring-shaped wall, wherein the axis of the ring-shaped wall is referred to as the axis of the holder 336; and a connector 333 configured to rigidly connect the shafts 331*a*, 331*b* and 334, wherein the axes of the shafts 331*a*, 331*b* and 334 are configured to be vertical; wherein the bearing housing 335 is rigidly connected to the support component 337. A pair of bearings are configured to connect the shaft 334 and the bearing housing 335, so that the shaft 334 is constrained to rotate relative to the bearing housing 335 (or equivalently relative to the support component 337) around the axis of the shaft 334, hence that the connector 333, the shaft 331*a* and 331*b* are constrained to rotate relative to the bearing housing 335 (or equivalently relative to the support component 337) around the axis of the shaft 334. The shaft 331*a* is configured to be inserted in and be constrained by the curved hole 326*a* of the gripping device 313*a*, so that a movement of the shaft 331*a* may induce a rotation in the gripping device 313*a* around the axis of the shaft 315*a*. Similarly, the shaft 331*b* is configured to be inserted in and be constrained by the curved hole 326*b* of the gripping device 313*b*, so that a movement of the shaft 331*b* may induce a rotation in the gripping device 313*b* around the axis of the shaft 315*b*. The holder 336 is configured to be rigidly connected to the support component 337.

The container gripping mechanism 307 also comprises: a motor 80J comprising a shaft and a base component; targets 332*a* and 332*b*; and a proximity switch 90T. The base component of the motor 80J is fixedly connected to the support component 337 and the shaft of the motor 80J is fixedly connected with the shaft 334. When the motor 80J drives a rotation of the shaft 334, the shafts 331*a* and 331*b* are rotated around the axis of the shaft 334. The movement of the shafts 331*a* and 331*b* induces simultaneous rotations in the gripping devices 313*a* and 313*b* toward or away from the axis of the holder 336 (referred to as the central axis of the container gripping mechanism 307) as to grip or release a container 107 or a capped container 109 which is placed on the holder 336. The targets 332*a* and 332*b* are configured rigidly attached on the connector 333. The proximity switch 90T is configured to fixedly connect to the support component 337. The proximity switch 90T is configured to monitor the targets 332*a* and 332*b* when the targets are rotated with the connector 333.

Figure 15H:
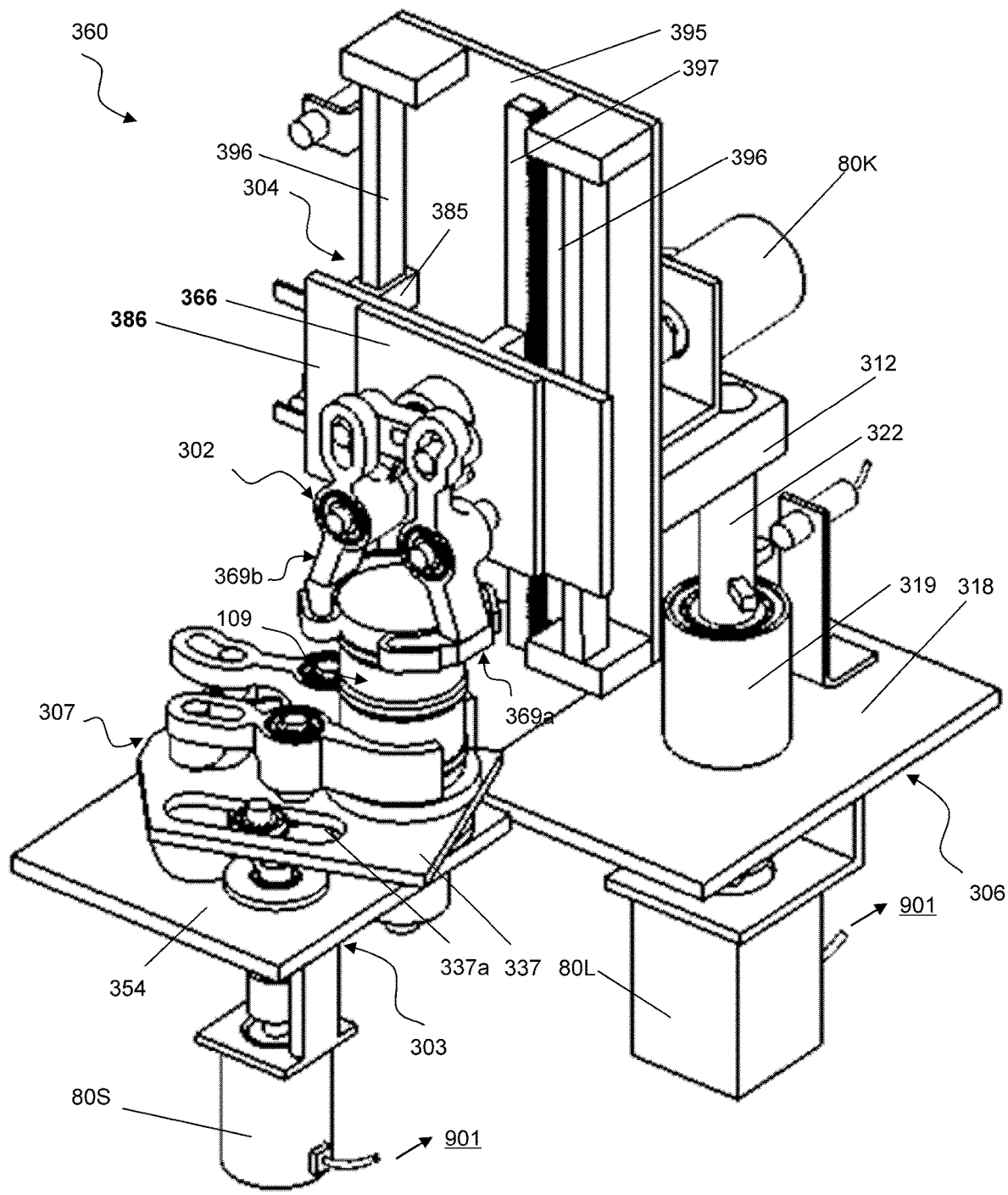
FIG. 15H shows an aerial view of a cap opening apparatus.

Referring to FIG. 15H, a cap opening apparatus 360 comprises: a cap gripping mechanism 302; the container gripping mechanism 307 comprising the support component 337, said container gripping mechanism 307 configured to grip a container 107 of a capped container 109; a motion sub-apparatus configured to produce a relative motion between the support component 337 of the container griping mechanism 307 and the support component 366 of the cap gripping mechanism 302, wherein said motion sub-apparatus comprises the following:

(1) a vertical motion mechanism 304 comprising a second support component 395 and a board 386, the vertical motion mechanism 304 referred to as a first motion mechanism, configured to produce a vertical motion in the board 386, wherein the board 386 is fixedly connected to the first support component 366 of the cap gripping mechanism 302, relative to the second support component 395. The vertical motion mechanism 304 comprises a pair of tracks 396 and a rack 397, all of which are rigidly connected to the support component 395. A pair of linear sliders 385 are rigidly connected to the support component 366, and are configured to slide vertically along the tracks 396. A gear (hidden in figure) is configured to be rotatable relative to the support component 366, and a motor 80K is configured to drive the rotation of the gear. Said gear is engaged with the rack 397, so a rotation of the gear may drive a linear motion of the support component 366 relative to the support component 395;

(2) a horizontal motion mechanism 306 comprising a third support component 318, a bearing housing 319 which is rigidly connected to the support component 318, a shaft 322 and a connector 312 configured to rigidly connect the shaft 322 and the second support component 395. The shaft 322 and the bearing housing 319 are connected by bearings and accessories so that the shaft 322 is rotatable relative to the bearing housing 319, around a vertical axis. A motor 80L is configured to drive the rotation of the shaft 322 relative to the bearing housing 319. The motor is connected to computer 901 so that computer 901 may control the rotation of the motor. The horizontal motion mechanism 306 referred to as a second motion mechanism, configured to produce a rotation around a vertical rotational axis, in the second support component 395 relative to the third support components 318;

(3) a rotational motion mechanism 303 comprising a support component 354, said rotational motion mechanism 303 configured to drive an oscillatory rotation of the support component 337 of the container gripping mechanism 307 relative to the support component 354. The support component 354 is configured to be rigidly connected to the third support component 318. Thus, the rotational motion mechanism 303 produces a relative rotation between the third support component 318 and the support component 337 of the container gripping mechanism 307.

Under the control of the computer 901, the cap opening apparatus 360 can remove a cap of a capped container in seven steps, as follows.

At step 1, the connector 312 of the horizontal motion mechanism 306 is rotated, and the board 386 of the vertical motion mechanism 304 is moved down to a position so that the gripping devices 369*a* and 369*b* of the cap gripping mechanism 302, if moved towards the central axis, can grip the cap 108 of the capped container 109.

At step 2, the gripping devices 369*a* and 369*b* of the cap gripping mechanism 302 are rotated towards the central axis as to grip the cap 108.

At step 3, the gripping devices 313*a* and 313*b* of the container gripping mechanism 307 are rotated towards the central axis of the container gripping mechanism 307 to a certain position as to grip the container 107 of the capped container 109.

At step 4, the support component 386 is moved upward relative to the support component 395 in the vertical motion mechanism 304, as driven by the motor 80K. At the same time, the gripped container 107 and gripping devices 313*a* and 313*b* are constrained to make an oscillatory rotation relative to the support component 354 (or equivalently, relative to the cap 108 fixedly held by the gripping devices 259*a* and 259*b*) by the motor 80S, as to make it easy open the cap 108 from the container 107.

At step 5, together with the gripped cap 108, the support component 386 of the vertical motion mechanism 304 is moved up, as driven by the motor 80K.

At Step 6, the connector 312 of the horizontal motion mechanism 306 is rotated to a certain position, as driven by the motor 80L. At this position, the gripped cap 108 can be released (or ungripped) by the griping devices 369*a* and 369*b*, as to be dropped in a certain location.

Figure 16A:
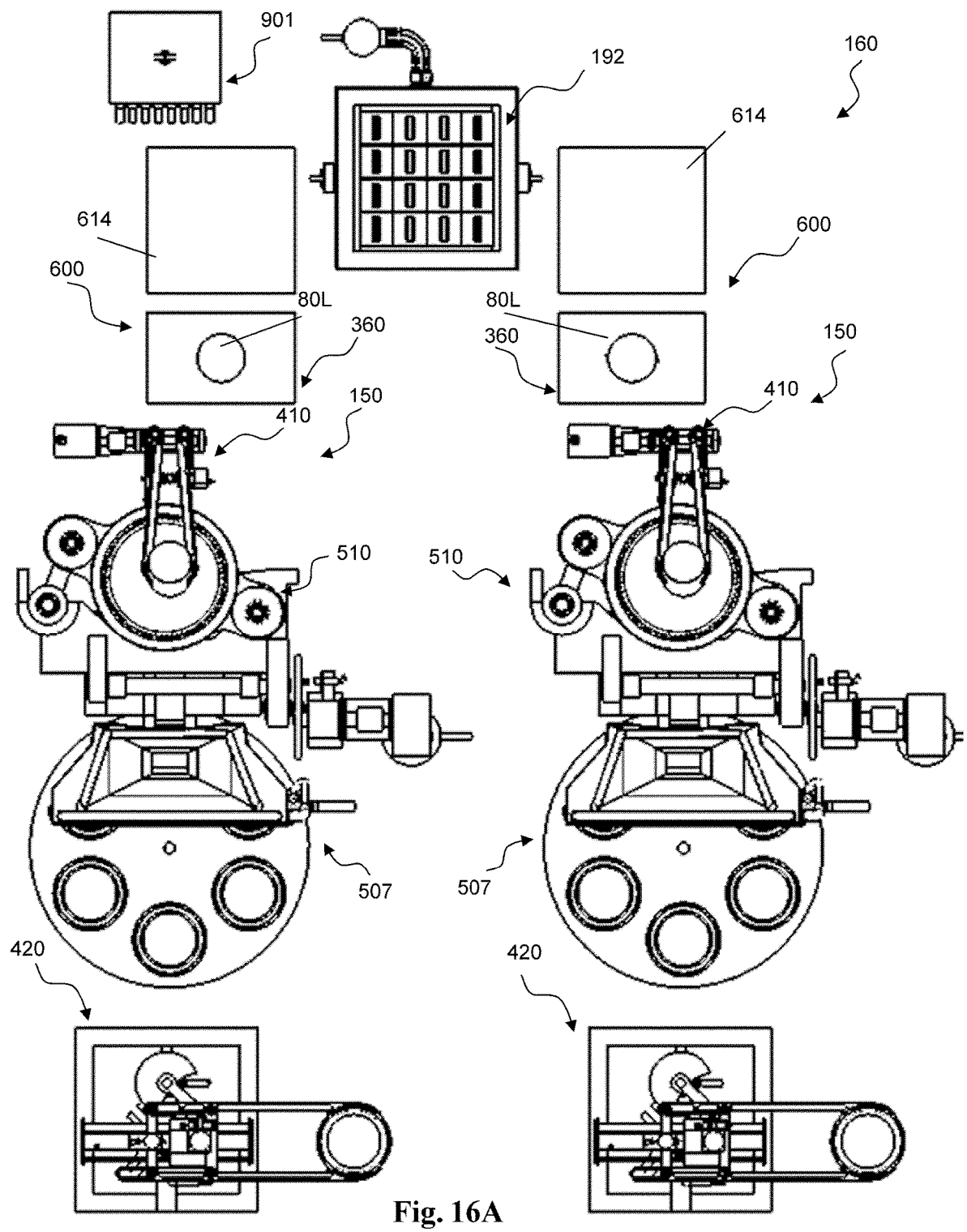
FIG. 16A shows a plane view of an automated kitchen which comprises the storage apparatus shown in FIG. 15C and one or more cooking stations.

Referring to FIG. 16A, an automated kitchen 160 comprises: a first computer 901; the storage apparatus 192; cooking stations 150; a plurality of capped ingredient containers 109; container transfer apparatus 600 wherein each container transfer apparatus 600 is configured to grip and move out capped ingredient containers 109 of the storage apparatus 192. Each container transfer apparatus 600 comprises a support component 614 and a cap opening apparatus 360 configured to remove the cap 108 from the capped ingredient container 109.

The support component 434 of the ingredient dispensing apparatus 410 of each cooking station 150 and the support component 614 of the corresponding container transfer apparatus 600 are properly fixedly, so that the ingredient dispensing apparatus 410 can grip an ingredient container 107 when the container transfer apparatus 600 transfer the ingredient container 107 to a proper position near the ingredient dispensing apparatus 410, and then rotate it a certain angle to dispense the food or food ingredients in the ingredient container 107 into the cookware 100. As explained earlier, the first computer 901 is configured to communicate with all electric or electronic devices in the storage apparatus 192, in the cooking stations 150 and in the container transfer apparatus 600.

Examples of cap opening apparatus 360 and container transfer apparatus 600 are disclosed in U.S. patent application Ser. No. 15/921,908, Filed Mar. 15, 2018; the disclosures of which are included here in their entirety. More precisely, the container transfer apparatus 600 of present patent application can comprise the transfer apparatus 340, the cap opening apparatus 360, in the U.S. patent application Ser. No. 15/921,908, Filed Mar. 15, 2018.

The sensors and electric devices of the container transfer apparatus 600 are configured to connect to the first computer 901 via wires or via wireless means. Thus, the first computer 901 is configured to process the data sent by the sensors, and then send signals to control the electric devices of the automated kitchen 160 as to control the respectively mechanisms or apparatus of the automated kitchen 160 to complete progresses.

The automated kitchen 160 may complete the cooking of a dish by follow steps.

Step 1, the container transfer apparatus 600 is configured to grip and move out a capped ingredient container 109 of the storage apparatus 192.

Step 2, the container transfer apparatus 600 open the cap 108 from the capped ingredient container 109 and transfer the ingredient container 107 to the proper position near the ingredient dispensing apparatus 410 of one of the corresponding cooking station 150.

Step 3, the ingredient dispensing apparatus 410 grips the ingredient container 107 and then rotate it a certain angle to dispense the food or food ingredients in the ingredient container 107 into the cookware 100 when the cookware 100 is positioned upright. Then the emptied ingredient container is rotated back and released to the container transfer apparatus 600.

Step 4, the cooking apparatus 501 of the cooking station 150 completes the progress of cooking the food ingredients.

Step 5, the cooked food unloading mechanism 505 of the cooking station 150 drives a rotation of the support component 512 of the cooking apparatus 501 around the axis of the shaft 535 as to be able to dispense the cooked food into a food container 182 of the receiving apparatus 507 through the funnel 561 of the cooked food unloading mechanism 505.

Step 6, the transfer mechanism 506 of the receiving apparatus 507 rotate the food container 182 held cooked food to a proper position near the dish loading apparatus 420.

Step 7, the dish loading apparatus 420 grips the food container 182 and then transfer it to a container holder (i.e. the container holder 159 of a marked vehicle when the vehicle is moved to a proper position relative to the support component 494 of the dish loading apparatus 420).

Referring to FIG. 16B, the following tasks are performed prior to taking an order for cooking a prepared food.

In Step 710, store a plurality of sub-programs in the first computer 901, wherein each sub-program comprises procedures for the first computer 901 to control one or more electric or electronic devices which are connected to the first computer 901 as to perform specific functions, and/or procedures for the second computer 902 to read the information of sensors or other electric or electronic devices, and then have the information sent to the first computer 901. The start time of a sub-program can be scheduled later, in accordance of needs. Also, install a database in the first computer 901. The database will store some lists of data, including the lists as described in the following. Each cooking system is given an ID. The IDs of all cooking systems are stored in the first computer 901. Each second computer 902 is given an ID. The IDs of the second computers 902 are stored in the first computer 901.

In Step 711, the first computer 901 stores a menu, which is a list of prepared foods. For each prepared food, the first computer 901 stores a "list of container content types and numbers and relative timings," and a "list of cooking sub-programs and relative timings," wherein each cooking sub-programs controls the functions of the electric or electronic devices in the cooking station, and each cooking sub-program comprises a start time, which is relative to the start times of other sub-programs in the same list. The "list of container content types and numbers and relative timings" of each prepared food is a list of container content types and the number of containers of the particular type that are needed for cooking the prepared food, wherein an "container content type" refers to the type of the ingredient content contained in an ingredient container. For our applications, a single container of food ingredients is used for the cooking of one prepared food; and the cooking of a single prepared food may require several containers of food ingredients. The timing of unloading of the ingredient content of each container content type is relative to the start times of the sub-programs in the list of cooking sub-programs and relative timings.

In Step 712, Store the information of the storage apparatus 192, including a list of positions for the containers of food ingredients, in the first computer 901.

In Step 713, make a "list of transport and cap-opening sub-programs and relative timings" for controlling the electric and electronic devices in the container transfer apparatuses 600, for the purpose that a container in the position in the storage apparatus 192 is transferred out, and has its cap removed and then is transferred to a cooking station. The start time of each sub-program is determined or limited relative to the start times of some other sub-programs in the same list.

Referring to FIG. 16C, the following tasks are dynamically performed.

In Step 721, Create and store in the first computer 901 a "list of containers of food ingredient in the storage apparatus," wherein the list has the information of the position of each container of food ingredient, and the type of the content contained in each container.

In Step 722, when an inquiry is made for availability of a prepared food, usually by a person using another computer which is connected to the first computer 901, the first computer 901 is configured to read the "list of container content types and numbers and timings" of the prepared food and determine if there are enough containers containing the container content types and numbers in the "list of containers of food ingredient in the storage apparatus" as required to cook the prepared food. If yes, then allow an order for the prepared food. If not, then do not allow an order for the prepared food.

In Step 723, if an order for a prepared food is made, determine the positions of the containers in the storage apparatus which are to be used for cooking the prepared food, and remove these containers from the "list of containers of food ingredient in the storage apparatus."

In Step 724, for the prepared food ordered in Step 723, the first computer 901 is configured to schedule the following: (1) the cooking of the next ordered food at the next available cooking station; (2) for each container of food ingredient that is needed for cooking the ordered food, the position of the container in the storage apparatus 192, and the position of the container holder to position or hold the container on the container transfer apparatus 600 of the "next available cooking station" as scheduled in Part (1).

In Step 725, for the prepared food ordered in Step 723 the first computer 901 is configured to add the following to the "list of instructions" on the first computer 901: (1) the "list of cooking sub-programs and relative timings" of the ordered food item, with timings as scheduled in Step 724; (2) the "list of transport and cap-opening sub-programs and relative timings" with specified start times as scheduled in Step 724.

In Step 726, the first computer 901 is configured to run the "list of instructions" and thus control the various apparatuses in the automated kitchen.

In the following, a vehicle may mean a vehicle 103, or a marked vehicle.

Figure 17A:
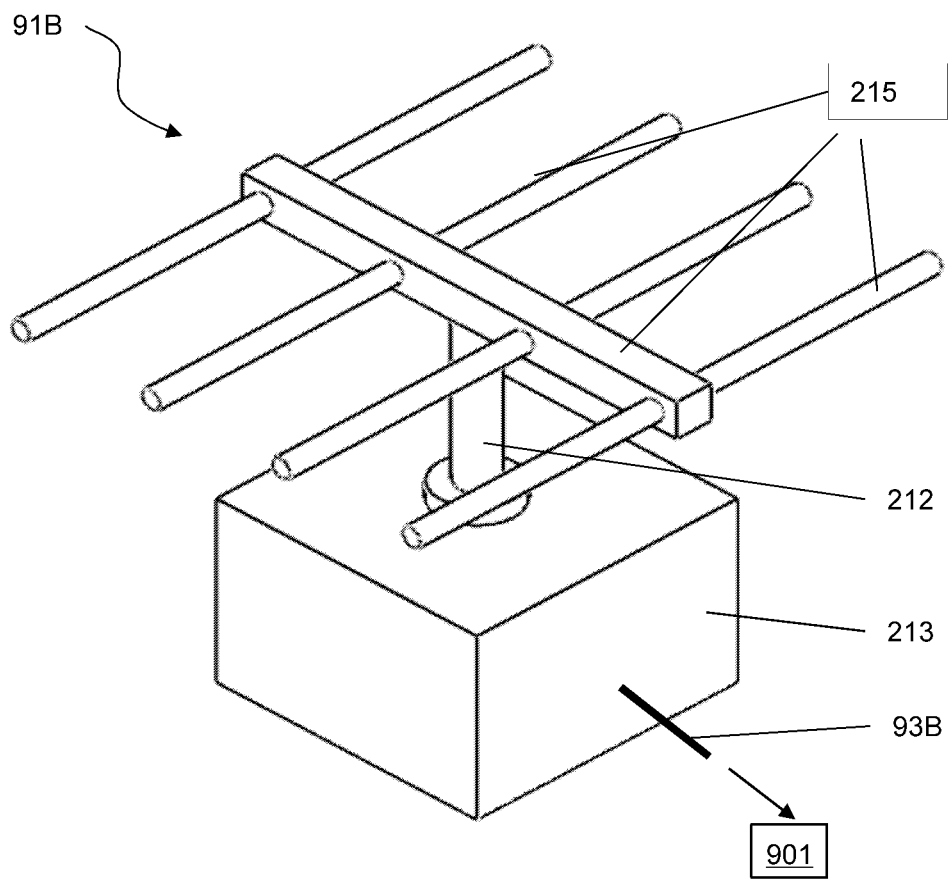
FIG. 17A shows an aerial view of a radar.

Referring to FIG. 17A, a radar 91B comprises: a communication device 215; a shaft 212; and a sub-apparatus 213. The communication device 215 is rigidly connected to the shaft 212. The shaft 212 and the communication device 215 are constrained to rotate relative to the sub-apparatus 213 around the axis of the shaft 212. The sub-apparatus 213 comprises a motorized mechanism (hidden in figure), wherein the motorized mechanism is configured to drive the shaft 212 and the communication device 215 a rotation relative to the sub-apparatus 213 around the axis of the shaft 212. When the motorized mechanism of the sub-apparatus 213 drives a rotation of the communication device 215, the radar 91B measures distance to objects in the restaurant by emitting electromagnetic waves to objects and measuring the reflected pulses with a sensor. Differences in electromagnetic waves return times and wavelengths can then be used to make digital 3-D representation of the objects. By dynamically making digital 3-D representation of the objects in the restaurant, the radar 91B may obtain information on the positions, the speeds, and the shapes of the objects. These objects may include furniture or fixtures, humans, vehicles etc. The radar 91B may also be used to track the dynamical motion of a moving object such as a person in motion, or a vehicle in motion. The radar 91B is configured to connect to the first computer 901 via the wires 93B, so that the first computer 901 may receive the signals from the radar 91B as to obtain the messages of the objects around the radar 91B.

Figure 17B:
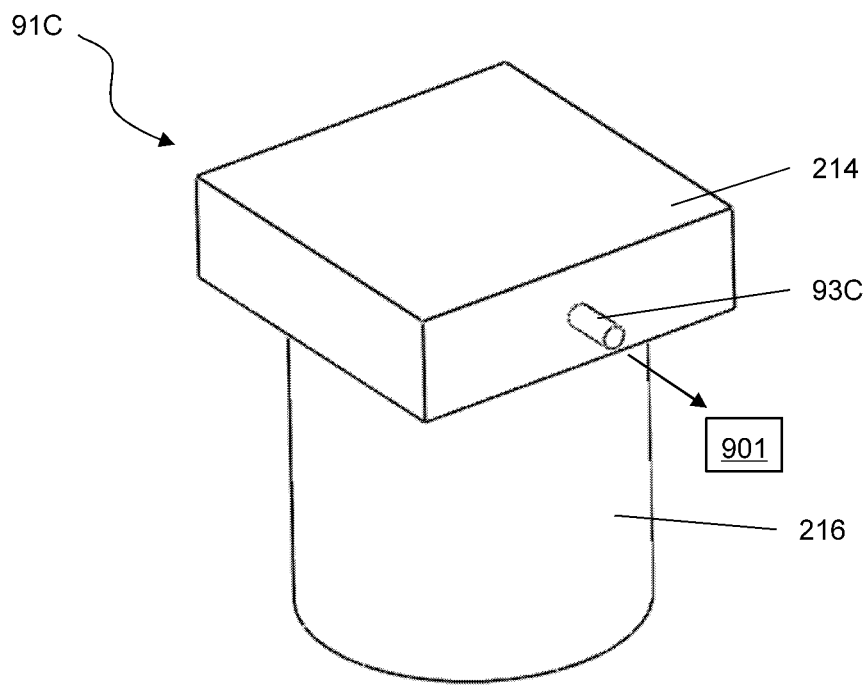
FIG. 17B shows an aerial view of lidar.

Referring to FIG. 17B, a lidar 91C comprises: a base component 214; a sub-apparatus 216 and wires 93C. The lidar 91C measures distance to objects in the restaurant by illuminating the objects with pulsed laser light and measuring the reflected pulses with a sensor. Differences in laser return times and wavelengths can then be used to make digital 3-D representation of the objects. By dynamically making digital 3-D representation of the objects in the restaurant, the lidar 91C may obtain information on the positions, the speeds, and the shapes of the objects. These objects may include furniture or fixtures, humans, vehicles etc. The lidar 91C may also be used to track the dynamical motion of a moving object such as a person in motion, or a vehicle in motion. The lidar 91C is configured to connect to the first computer 901 via the wires 93C, so that the first computer 901 may receive the signals from the lidar 91C as to obtain the messages of the objects around the lidar 91C.

Figure 18A:
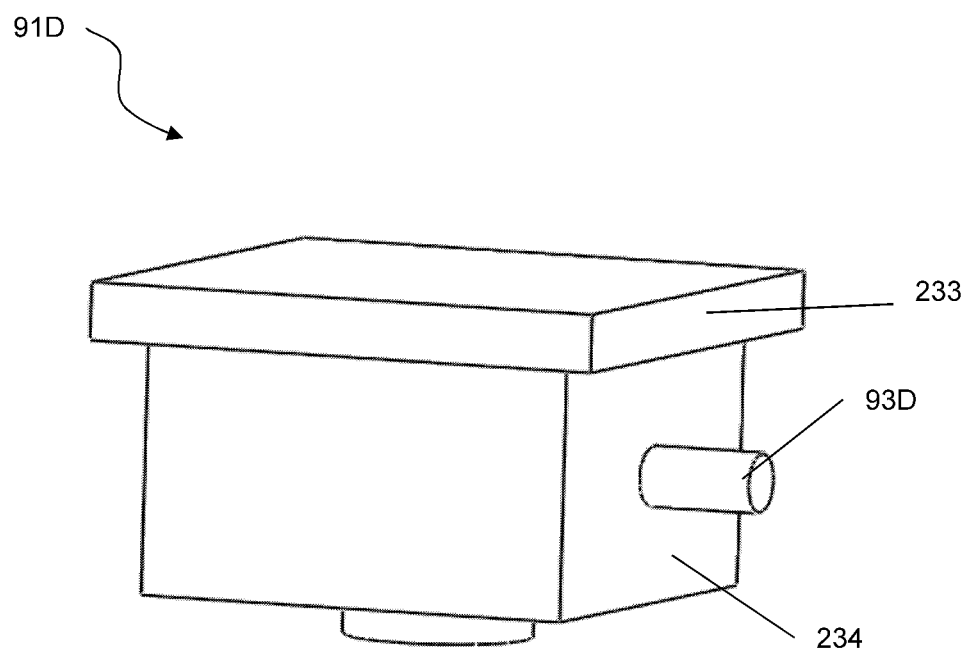
FIG. 18A shows an aerial view of a camera.

Referring to FIG. 18A, a camera 91D comprises: a base component 233; a sub-apparatus 234; and wires 93D. The camera 91D is configured to capture a 2D digital image of objects. The camera 91D is configured to be connected to the first computer 901 via wires 93D. The digital images captured by the camera 91D may be sent to the first computer 901.

Figure 18B:
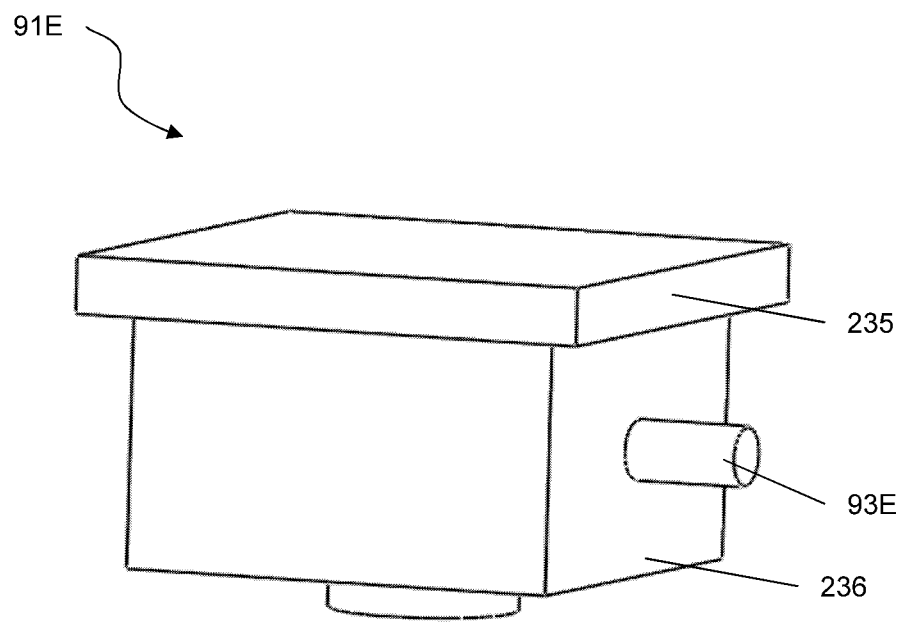
FIG. 18B shows an aerial view of another kind of camera.

Referring to FIG. 18B, a camera 91E comprises: a base component 235; a sub-apparatus 236; and wires 93E. The camera 91E is a range camera configured to capture a digital range image of objects, wherein a range image is a 2D image showing the distance to points in the scene from a specific point. Thus, a range image is a 3D image in essence. The camera 91E is configured to be connected to the first computer 901 via wires 93E. The digital images captured by the camera 91E may be sent to the first computer 901.

In some embodiments, referring to FIGS. 19A-24, an automated restaurant 170 comprises: a customer-tracking area 207, which is located in a part or all of a building 206; the automated kitchen 160, as described above, which is located in a part of the building 206; the first computer 901. The customer-tracking area 207 comprises: the dining area; waiting area; and the area in the restaurant that are next to any of the entries to the restaurant. Some tables 204 and chairs 205 are placed in the customer-tracking area 207 (FIGS. 21A-21B). A display (or sign) 219 may comprise a flat surface with a number and a QR code printed on it (FIG. 21C). The display 219 may be fixedly attached to a table 204 (see FIG. 21A), or to a wall. The restaurant 170 comprises a plurality of displays 219, each comprising a unique number and a unique QR code. Each QR code has a unique specific information, and the computer 901 may use the specific information to identify the location of the QR code.

The automated restaurant 170 comprises floors 206f and 206g, and doors 229, 231 and 232. The floor 206f is located in the customer-tracking area 207, and the floor 206g is located in the automated kitchen 160 (see FIG. 19G). The door 232 is configured to connect the automated kitchen 160 and the customer-tracking area 207. A person (e.g., a repair person or an employee) can go from the automated kitchen 160 to the customer-tracking area 207 (and vice versa) through the door 232. The door 231 is configured to connect the customer-tracking area 207 and two restrooms (the restrooms are not shown in figures). The door 229 is configured to connect the customer-tracking area 207 and the outside of the automated restaurant.

The automated restaurant 170 further comprises a dish transport system 208 comprising marked vehicles 103X, 103Y and 103Z, which are connected to the first computer 901. The vehicles are configured to move on the floors of the restaurant. In particular, the vehicles can move on the floors 206f and 206g in the automated kitchen 160 and customer-tracking area 207. The second computer 902 on each marked vehicle is configured to communicate with the first computer 901 via the wireless communication devices 922 of the second computer 902 and the wireless communication device 921 of the first computer 901.

For any two marked vehicles, either the first colors of their markings are different, or the second colors of their markings are different, or the third colors of their markings are different. Thus, the identity of the marked vehicle is uniquely determined by the combination of the first, second and third colors of the marking.

The first computer 901 comprises an image analysis program configured to extract information from digital images, whether two-dimensional or three-dimensional images. Among various tasks, the image analysis program may categorize digital images of human faces as to be able to identify various digital images of a same person. The image analysis program is also configured to analyze images of other objects, such as images of vehicles in motion. The image analysis program can be using known techniques, such filtering, clustering, similarity detention, and classification. The image analysis program may comprise a deep neural network component and is capable of deep learning.

Figure 20:
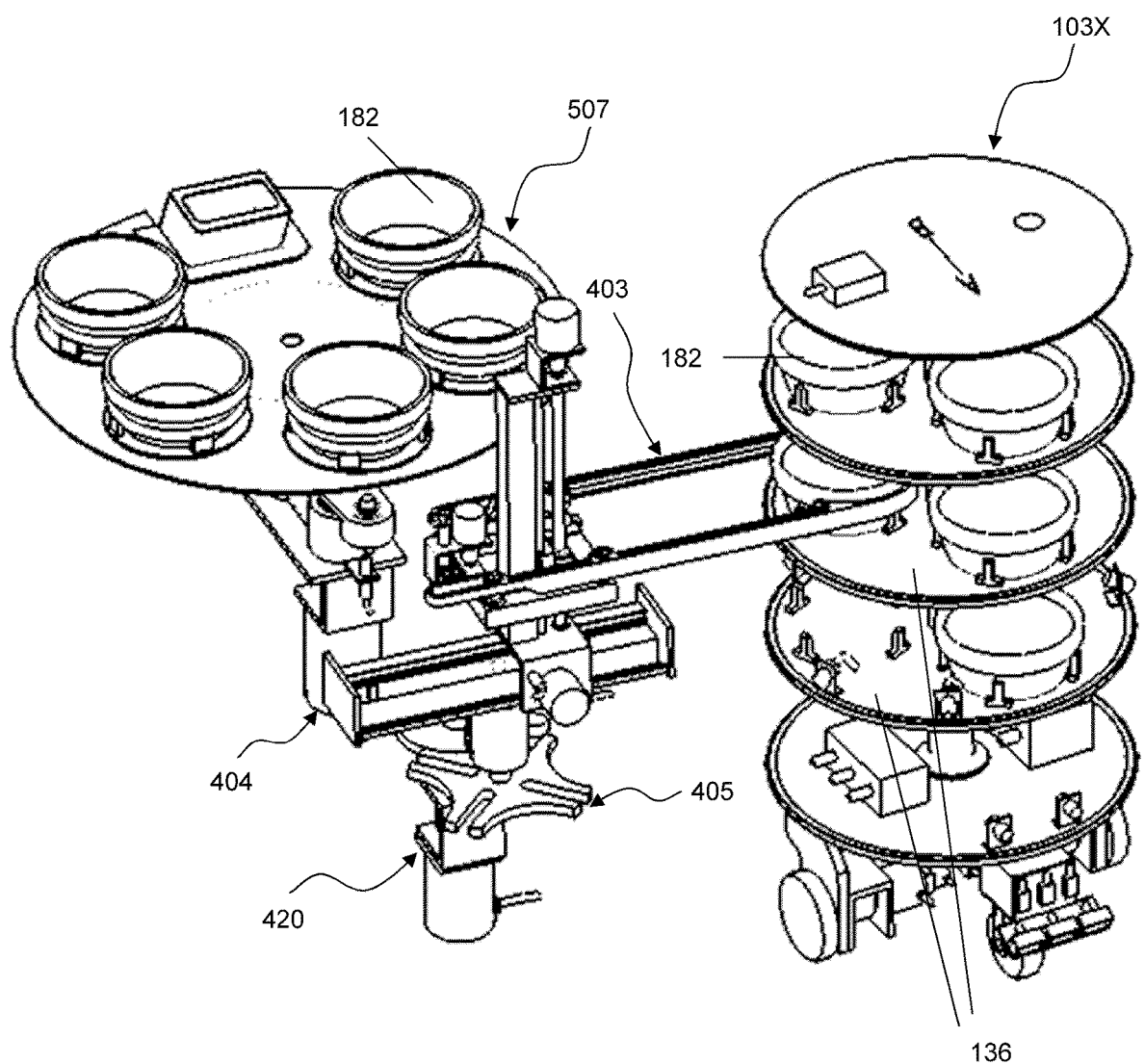

As shown in FIG. 20, when the vehicle 103X (or 103Y, or 103Z), moves to a proper position relative to the support frame 237 of a cooking stations 150 of the automated kitchen 160, the dish loading apparatus 420 of the cooking station 150 may transfer a food container 182, which holds a cooked food, from a container holder of the receiving apparatus 507 of the cooking station 150, to a container holder 159 of the vehicle 103X (or respectively 103Y, 103Z). It should be noted that the dish loading apparatus 420 comprises a gripping mechanism 403 which may grip a food container 182, wherein the rigid component 464 of the gripping mechanism 403 can be moved by a composition of a vertical linear motion, a horizontal linear motion, and a horizontal rotation. As explained before, the gripping mechanism 403, when the rigid component 464 is moved to a proper position, may grip the food container 182 from a container holder of the receiving apparatus 507. Then the food container 182, being gripped by the gripping devices of the gripping mechanism 403, may be moved together with the gripping mechanism 403 to be positioned right on a container holder 159 of the vehicle 103X (or 103Y, or 103Z); and then the gripping devices of the gripping mechanism 403 may be rotated as to un-grip the food container 182, and the food container 182 may then be placed on the container holder 159. The timing of the above procedures is configured to be controlled by the first computer 901, in coordination of the stop and motion of the vehicle 103X (or 103Y, or 103Z).

Figure 22:
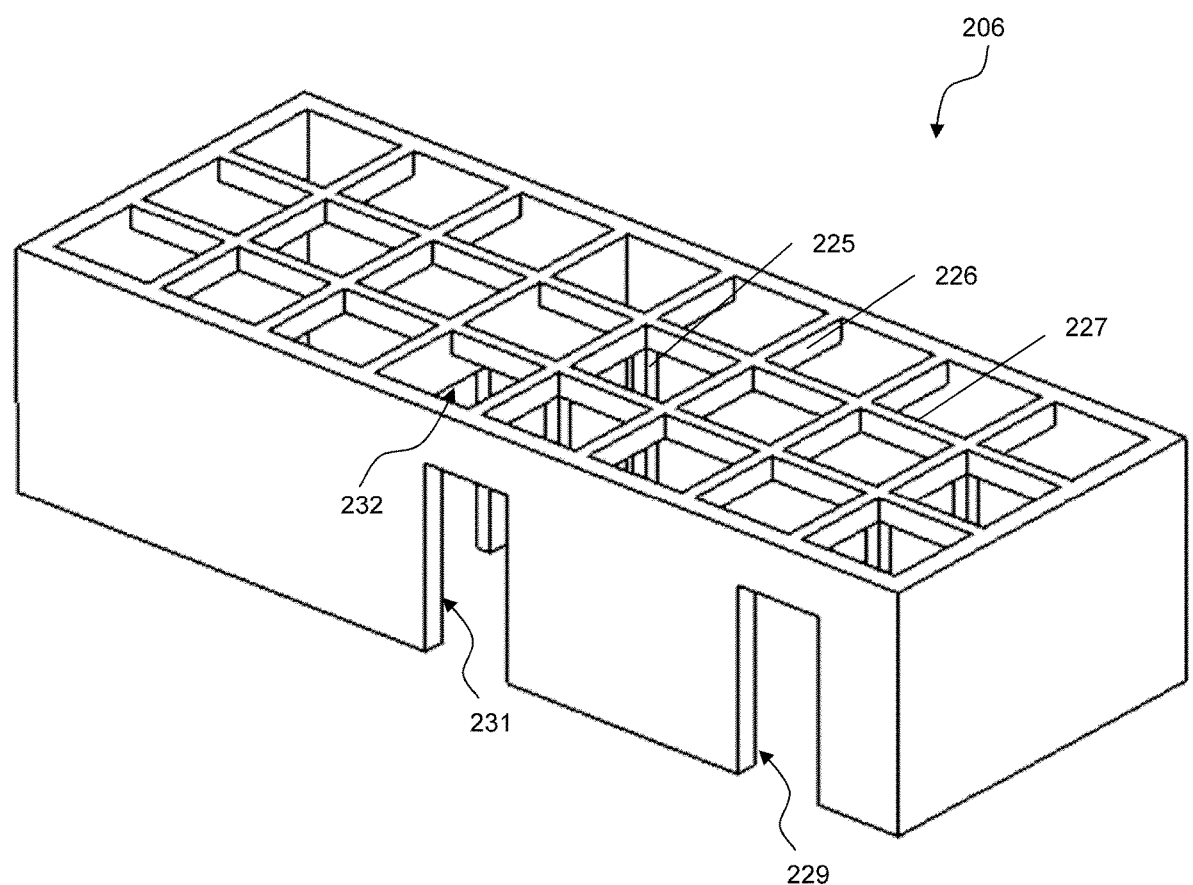

The automated restaurant 170 further comprises: beams 226 and 227; and pillars 225; wherein the beams 226 and 227 are positioned horizontally, and the pillars 225 are configured to support the beams 226 and 227 (see FIG. 22). The beams and pillars are also part of the building 206.

Figure 19A:
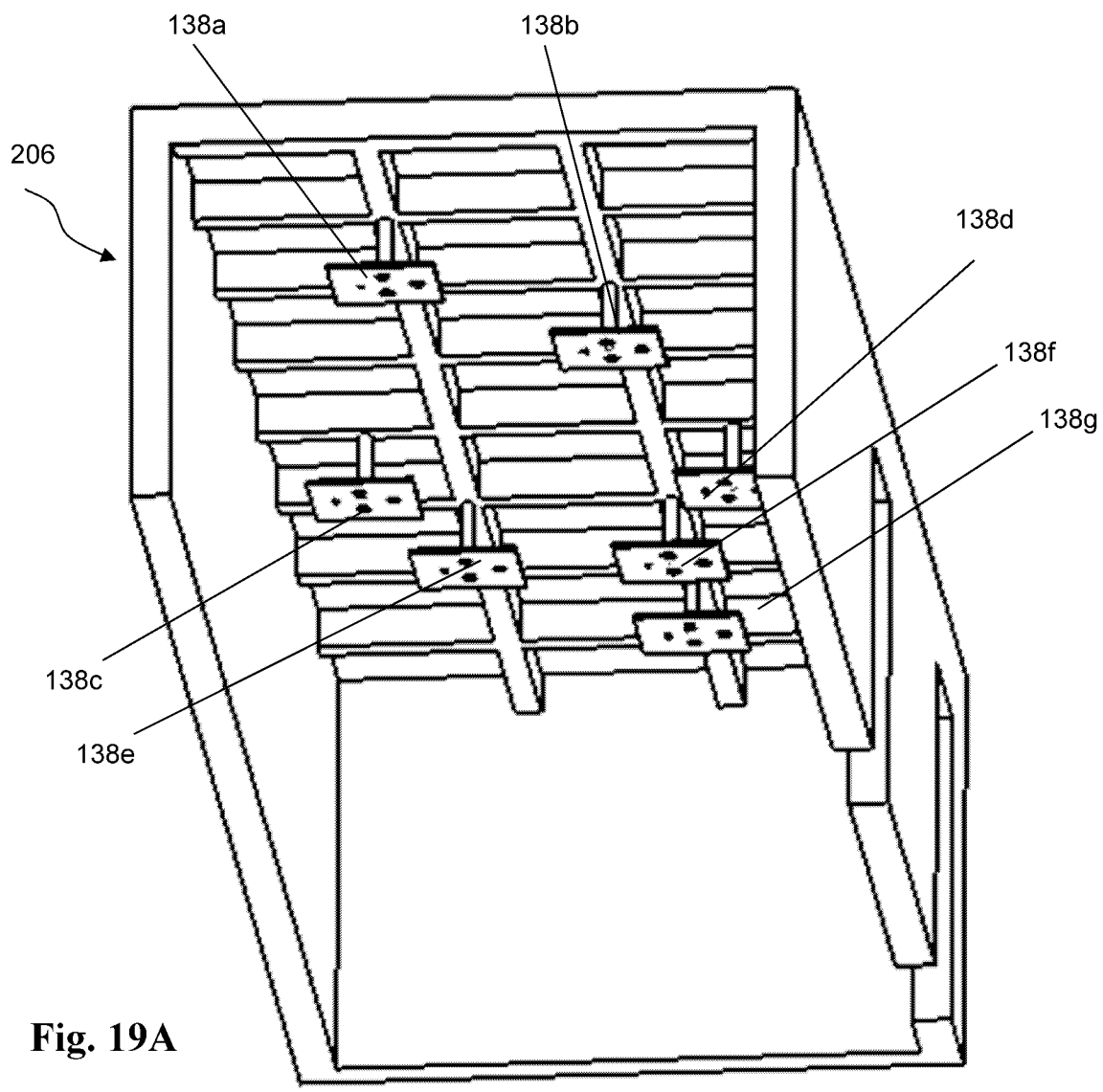
FIG. 19A shows an aerial view of a building.
Figure 19B:
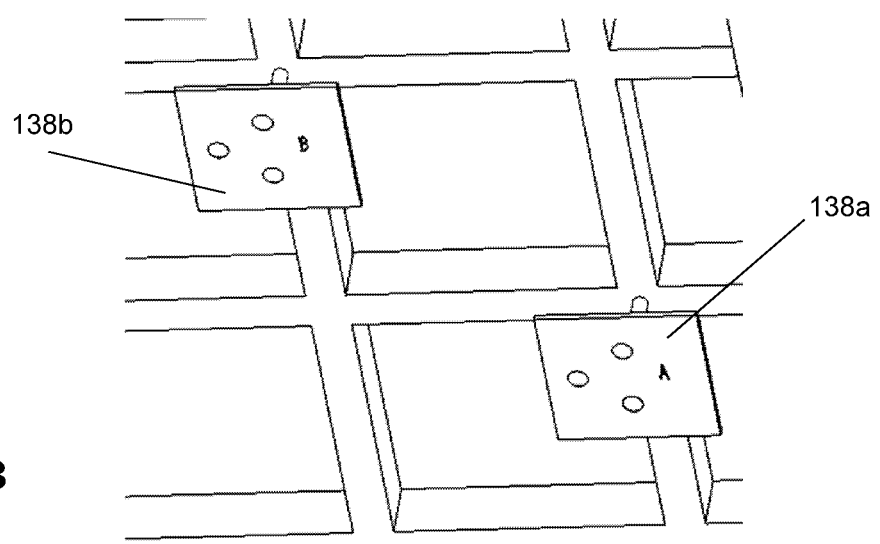
FIG. 19B shows an aerial view of parts of the building.

The automated restaurant 170 further comprises a plurality of marked plates 138a, 138b, 138c, 138d, 138e, 138f and 138g (see FIG. 19A-19B). Wherein each marked plate comprises a marking, and each marked plate is fixedly mounted on the different positions of the beams 226 and 227 of the building 206 via a connector; wherein the markings of the marked plates are similar to the marking 131X of the marked vehicle 103X, and the markings of the marked plates are configured to be different from each other. Thus, the second computer 902 may figure out the position of a vehicle in the automated restaurant 170 using the digital images of the marked plate captured by the camera of the vehicle, then send signals to the first computer 901.

The automated restaurant 170 further comprises a plurality of computers 904; wherein each computer 904 is connected to the first computer 901 via wires 94C. See FIG. 21D. Orders by customers may be placed and be paid with any computer 904, and the information of the orders placed by any computer 904, whether paid or unpaid, are sent to and stored by the first computer 901; and the information of all orders stored by the first computer 901 may also be accessed by any of the computers 904. Two cameras 91E and 91D are configured to be installed on each computer 904 so that the cameras may take images of the face of a human who uses the computer 904 and the images are sent to and stored by the first computer 901. Each computer 904 is connected to the floor of the customer-tracking area 207 by a leg 217 and a disk 218.

The automated restaurant 170 further comprises a tracking system 209 comprising: radars 91B; lidars 91C; a plurality of cameras 91D; a plurality of cameras 91E, some installed in the automated kitchen 160 and some in the customer-tracking area 207. The radars 91B, lidars 91C, cameras 91D and 91E are all connected to the first computer 901, so that the digital images captured by these can be continuously sent to the first computer 901.

Figure 19C:
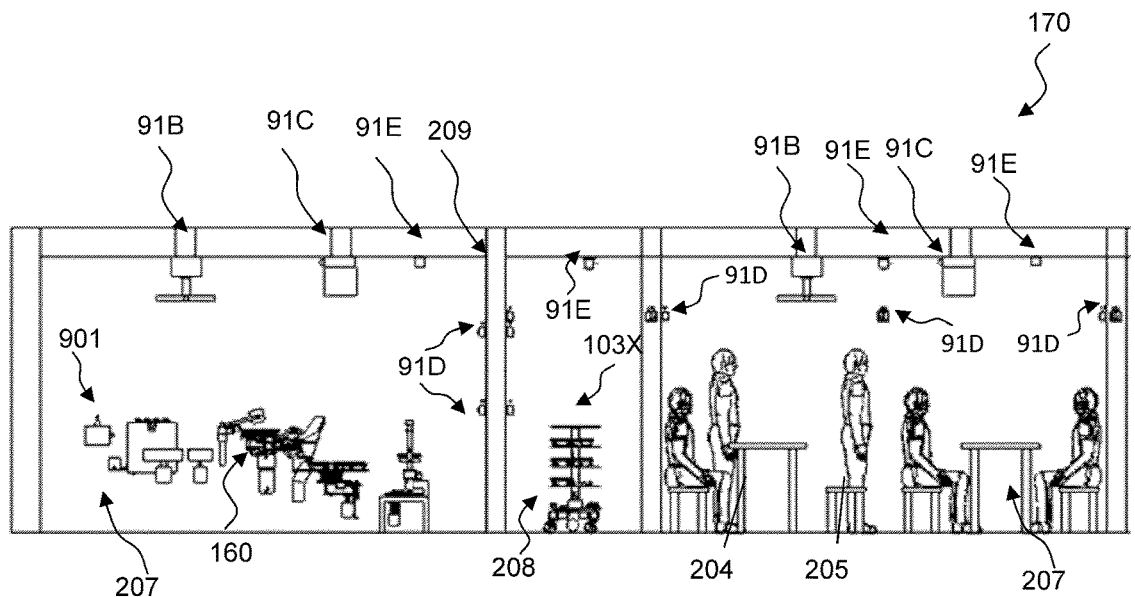
FIG. 19C shows a side view of an automated restaurant.
Figure 19D:
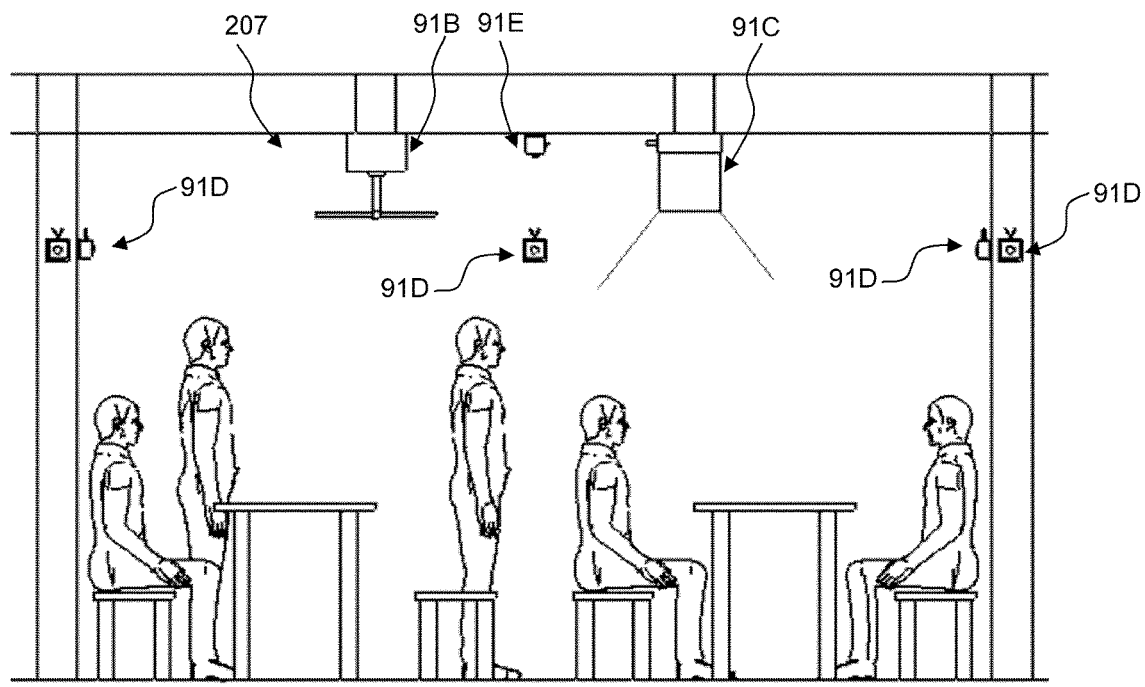
FIG. 19D shows a side view of parts of the automated restaurant.
Figure 19E:
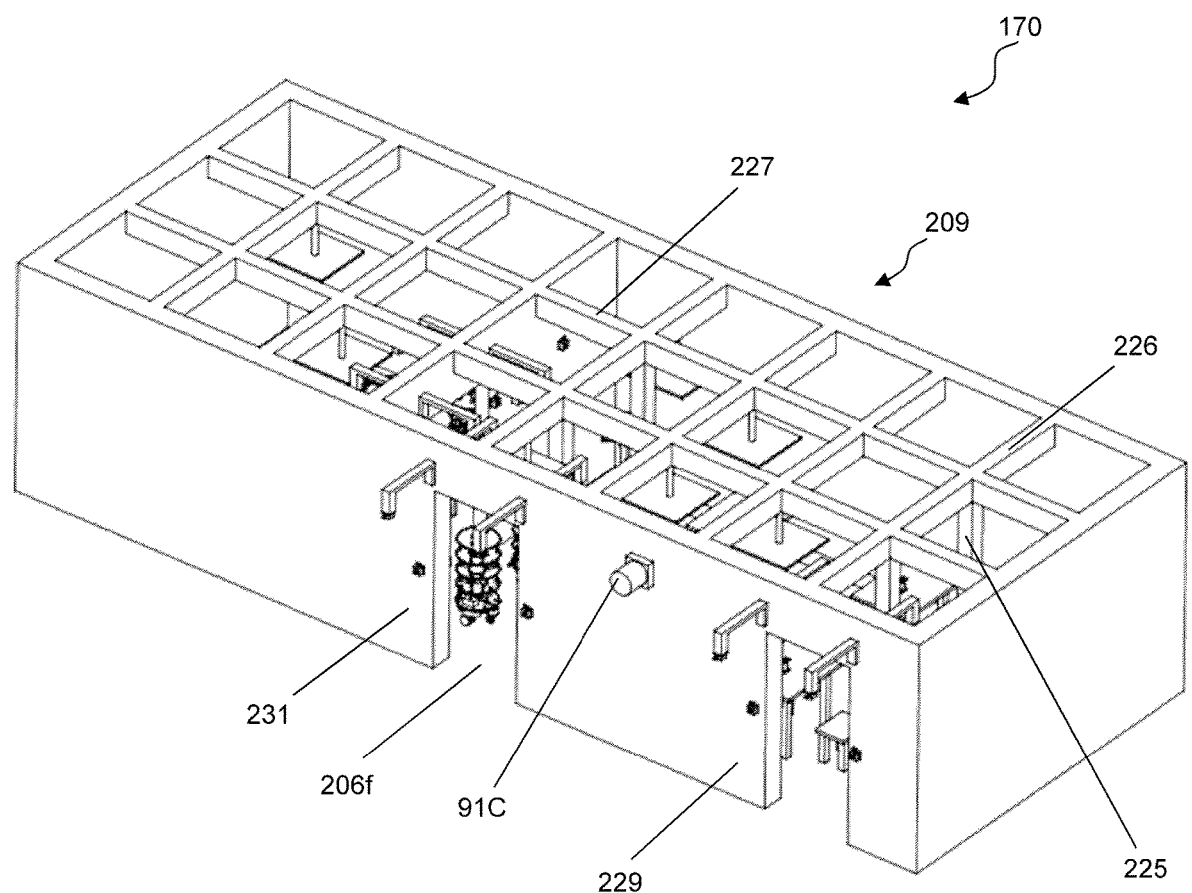
FIGS. 19E-19F show cut views of the automated restaurant.
Figure 19F:
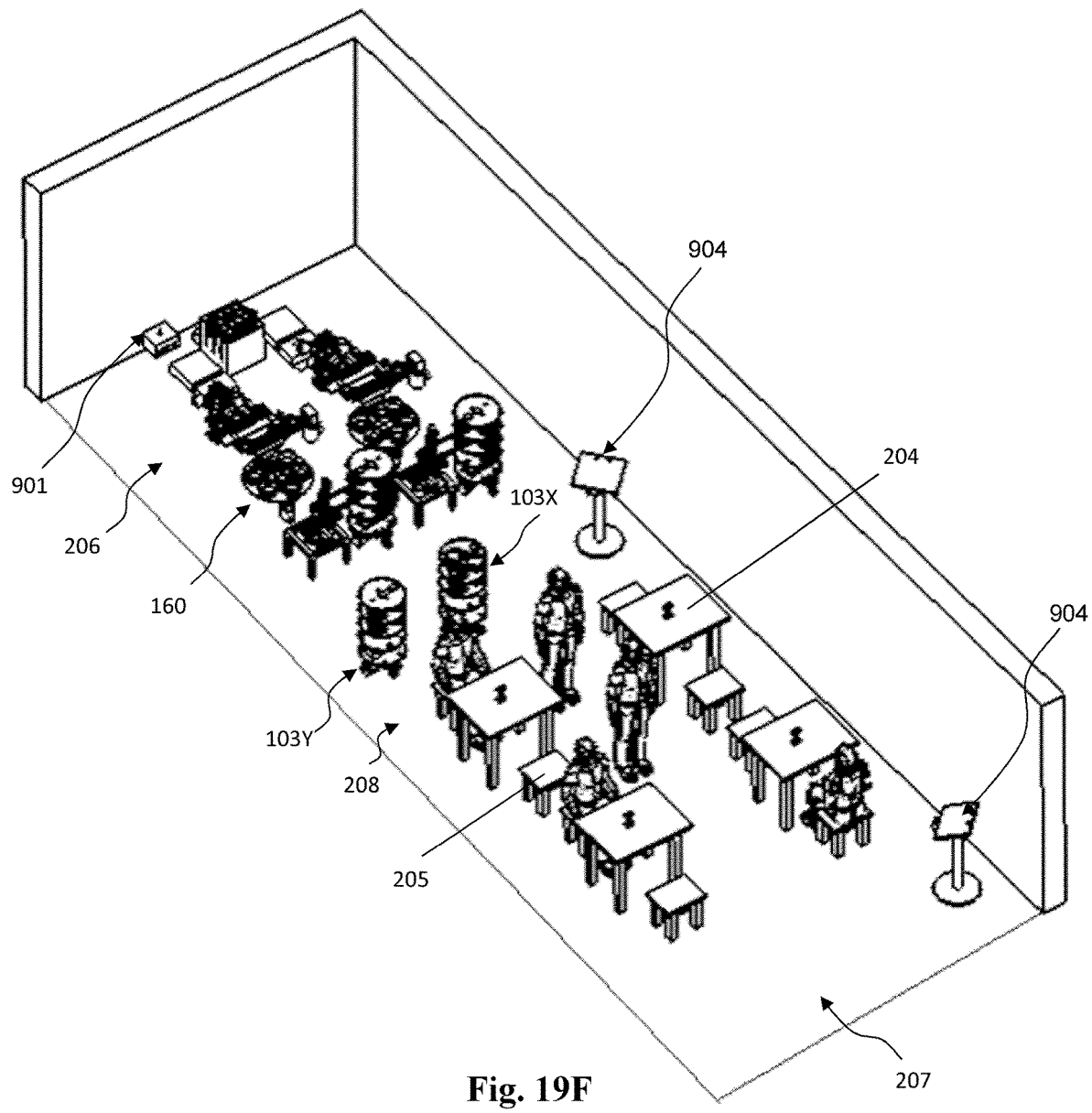
Figure 19G:
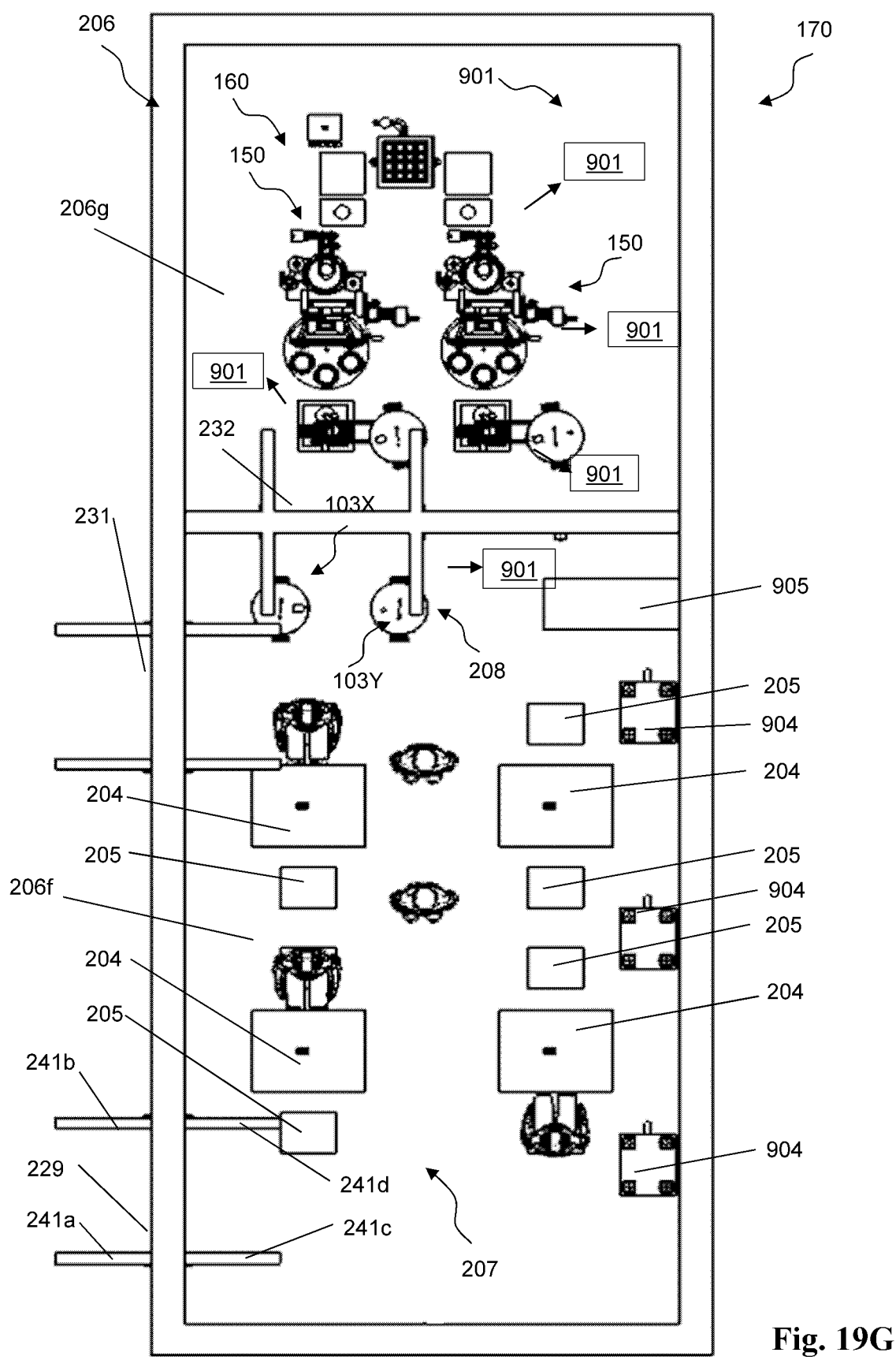
FIG. 19G shows a plane view of the automated restaurant.

One of the radars 91B is fixedly mounted to a beam 226 which is above the location of the automated kitchen 160; and the radar is configured to capture digital images of the objects in the automated kitchen 160 (see FIGS. 19C-19D). Another one of the radars 91B is fixedly mounted to a beam 227 which is above the customer-tracking area 207; and the radar is configured to capture digital images of the objects in the customer-tracking area 207. One of the lidars 91C is fixedly mounted to a beam 226 which is above the automated kitchen 160; and the lidar is configured to capture digital images of the objects in the automated kitchen 160. One of the lidars 91C is fixedly mounted to a beam 227 which is above the customer-tracking area 207; and the lidar is configured to capture digital images of the objects in the customer-tracking area 207.

One of the lidars 91C is mounted on the outside wall of the restaurant to capture digital images of outgoing customers who have ordered but not paid for meals in the restaurant (the third list below). When the customer returns to the restaurant, these digital images can be used to identify the customer among persons entering the restaurant.

Some cameras 91E and 91D are fixedly mounted on the beams 226 and 227. Some cameras 91E and 91D are fixedly mounted on the pillars 255. Some cameras 91E and 91D are fixedly mounted on the walls of the automated restaurant 170 (see FIGS. 19C-19D). These cameras are configured to capture digital images of the objects inside the restaurant.

Figure 23A:
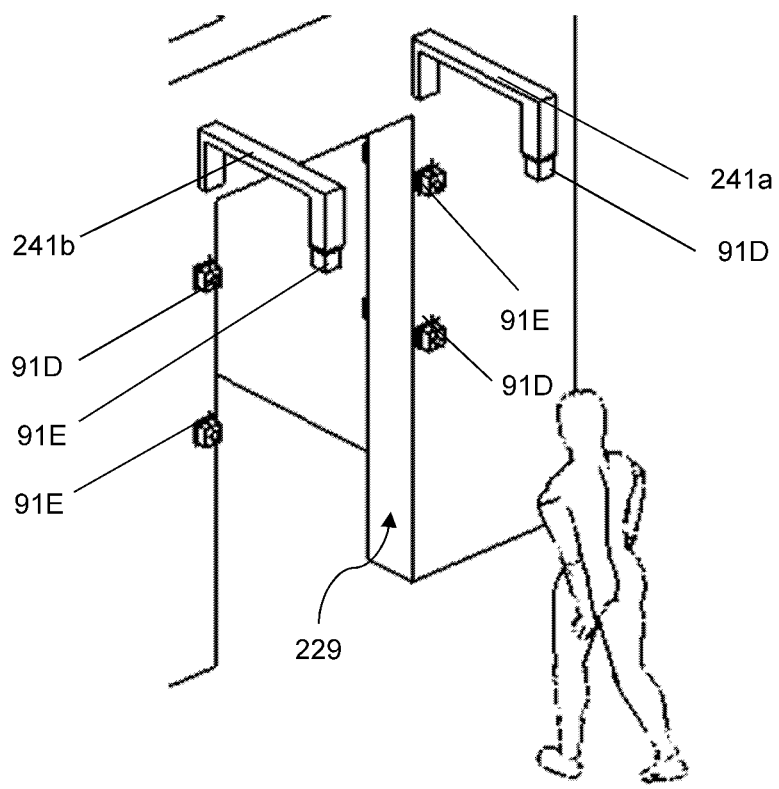
FIGS. 23A-23D show various aerial views of a human walking through a door in the automated restaurant.
Figure 23B:
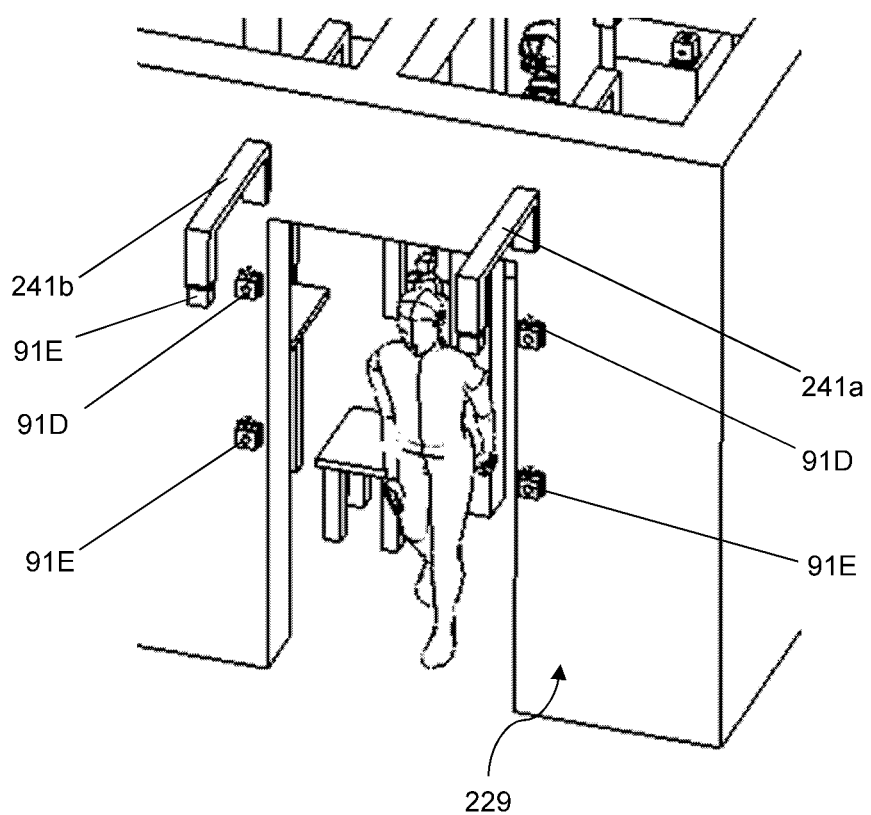
Figure 23C:
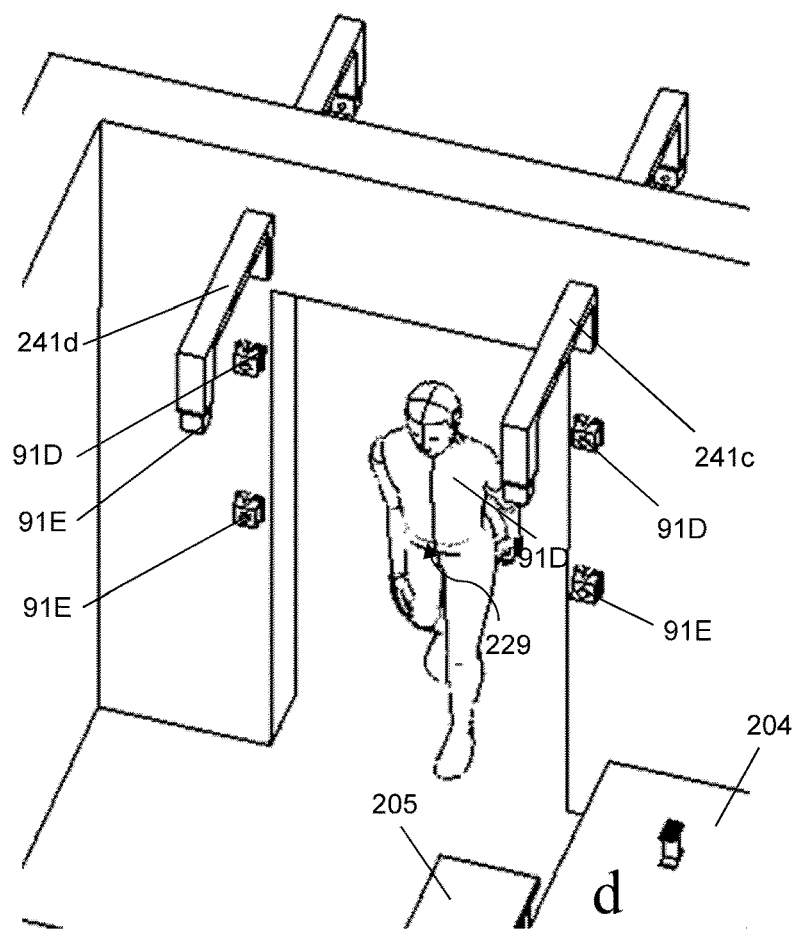
Figure 23D:
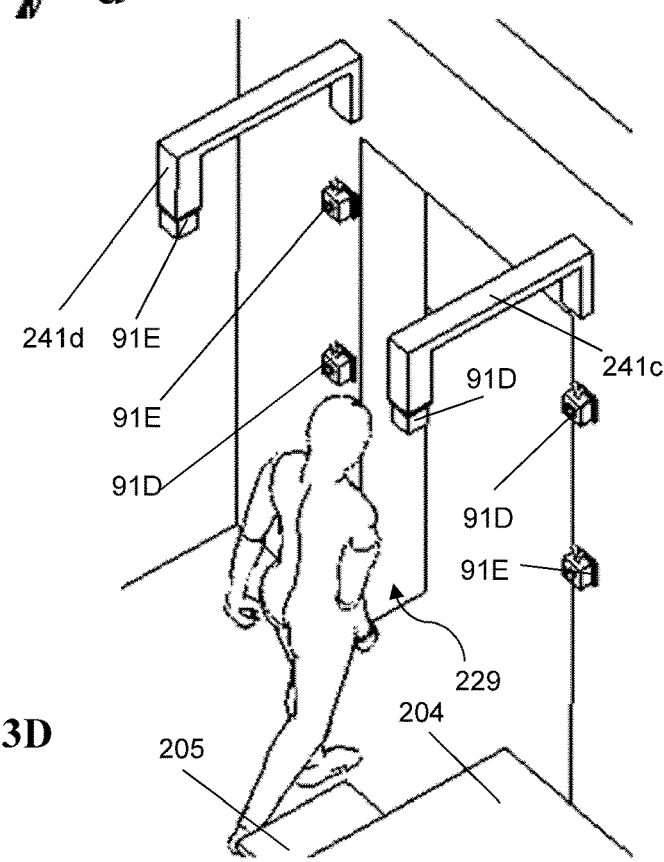

As part of the tracking system 209, a plurality of cameras 91D and 91E are fixedly mounted just outside of the door 229, some attached to the door frame and some connected via connector 241a and 241b, wherein the cameras 91D and 91E are configured to capture digital images of the front or the back of any person who passes through the door 229, wherein the front of a person is meant to include the face of the person (see FIGS. 23A-23B). A plurality of cameras 91D and 91E are fixedly mounted just inside of the door 229, some attached to the door frame, and some connected via connectors 241c and 241d, wherein the cameras 91D and 91E are configured to capture digital images of the front or the back of any person who passes through the door 229 (see FIGS. 23C-23D). The digital images captured by these cameras 91D and 91E are sent to the first computer 901.

Similarly, cameras 91D and 91E are mounted to surround the doors 231 and 232, in the same way as these mounted next to the door 229. As explained, these cameras are configured to be connected to the first computer 901 by wires, so that digital images captured by the cameras are sent to the first computer 901.

Figure 24A:
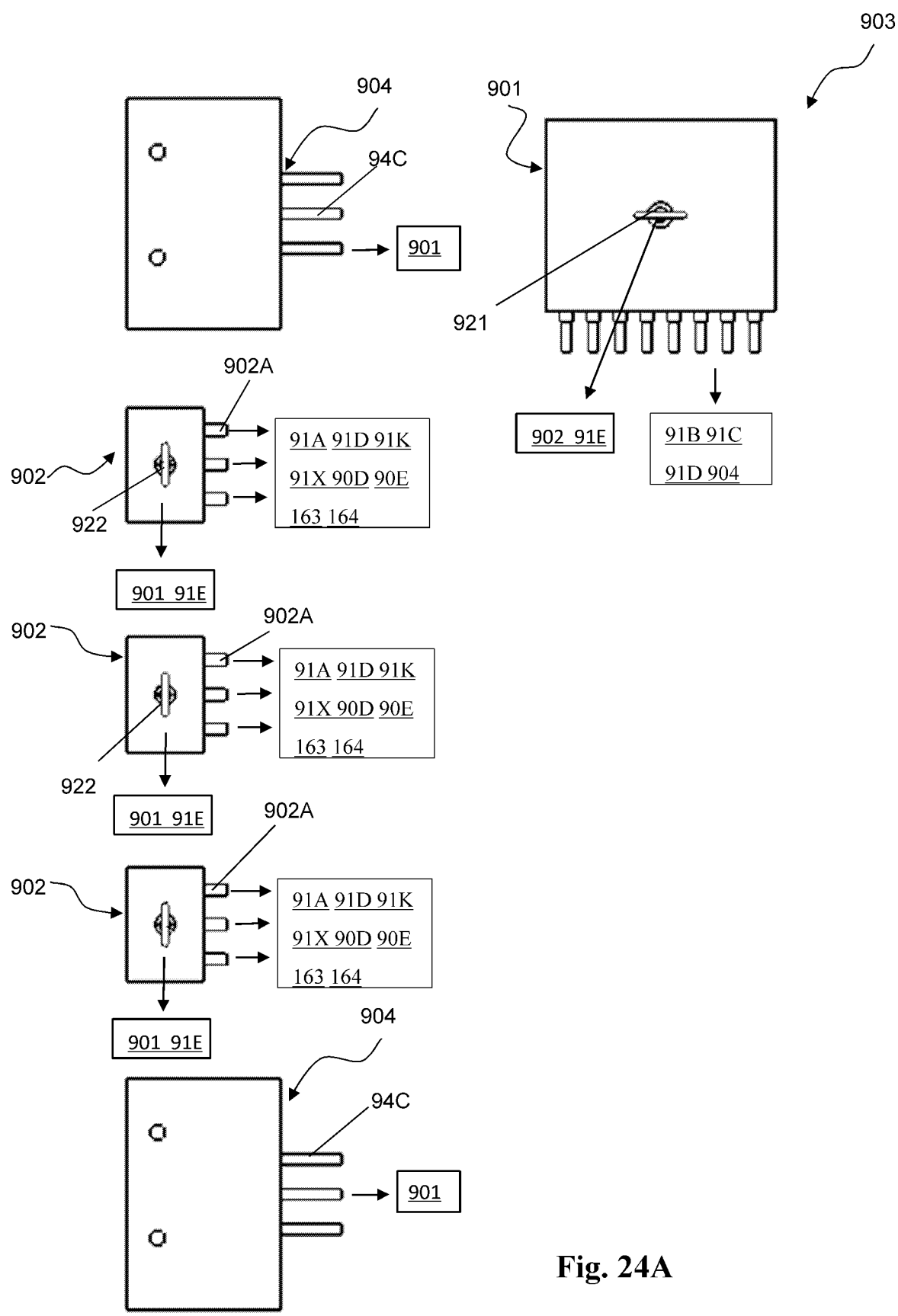
FIG. 24A shows a schematic view of a computer network of the automated restaurant.

As shown in FIG. 24A, the first computer 901, the second computers 902 and the computers 904 are configured to form a computer network 903 which may perform various tasks together. The second computers 902 are connected to the first computer 901 and the cameras 91E of the vehicles via the wireless communication devices 922. The computers 904 are connected to the first computer 901 via wires 94C. The first computer 901 and the second computers 902 are connected via wires to electrical or electronic devices 91A, or 91B, or 91C, or 91D, or 91E etc.; which can be encoder, cameras, lidars, radars, proximity switches, orientation sensors, etc., in the automated restaurant 170. The first computer 901 and the second computers 902 are connected via wires to electrical or electronic devices, which can be various of types of motors, inductive stoves or electric stoves, refrigeration apparatus, display etc., in the automated restaurant 170. In other words, the bigger computer network 903 is configured to control the function of apparatuses of the automated restaurant 170 by receiving or sending signals to electrical or electronic devices.

Figure 24B:
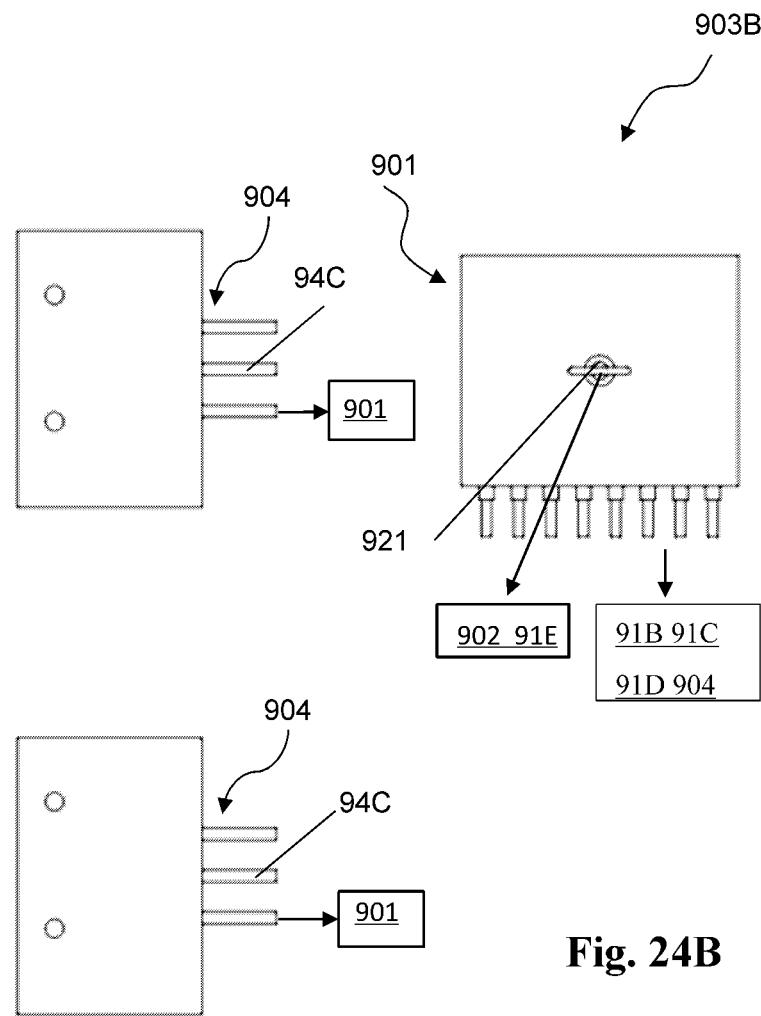
FIG. 24B shows a schematic view of a computer system of the automated restaurant.
Figure 24C:
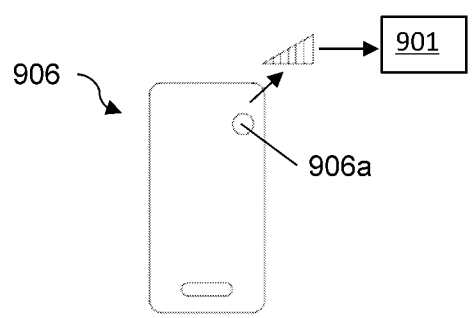
FIG. 24C shows a drawing of a smart phone.

As shown in FIG. 24B, the first computer 901a and the computers 904 are configured to form a computer system 903B which may perform various tasks together. As explained before, the computers 904 are connected to the first computer 901 via wires 94C. The computer system 903B is a part of the computer network 903, described in the previous paragraph. The computer 901 is configured to be connected to a local WIFI network. As shown in FIG. 24C, a smart phone 906 is also connected to the local WIFI network. Thus, the smart phone 906 may communicate with the computer 901 via the WIFI network. The smart phone 906 comprises a camera 906a that may be used to scan a QR code. The smart phone may be possessed by a customer or by the business that runs the restaurant. The smart phone comprises a computer. The smart phone may be substituted by a pad or other types of computers.

As shown in FIG. 25, before the restaurant opens for business, the following tasks are to be completed in steps, although the order of the steps may or may not be rigorously followed and some of the steps may be repeated from time to time.

In Step 801, a three-dimensional map of all floors, walls, doors, and fixtures of the restaurant is created (using measurements and/or other means) and stored by the first computer 901. Techniques of measurements for creating the 3-dimensional map are well known. The points in the 3-dimensional map are represented by three rectangular coordinates X, Y, Z; where X and Y are coordinates in a horizontal plane, and Z is the coordinate on a vertical axis. The vectors or directions in the 3-dimensional space occupied by the restaurant are also well represented by coordinates in the first computer 901. At any time, the position of any object, including human, can be described in the 3-dimensional map which is stored in the first computer 901.

In Step 802, the 3D representation of each movable furniture (or non-human object) of the restaurant is made and stored in the first computer 901. Information on their positioning relative to the floors, walls and fixtures is also stored in the first computer 901. For example, unlike balloons, chairs cannot be floated in the air due to gravity, and such information is stored by the first computer 901.

In Step 803, a unique ID is assigned to each dining table, and the information of the tables are stored by the first computer 901. Such information includes ID, geometric shape and size, positions of legs relative to the top surface of the table, images of surfaces or covers, etc. It should be noted that the dining tables may be a fixture (not movable), or a furniture (movable).

In Step 804, all technical information of the cameras, lidars and radars are stored in the first computer 901. The positions of all cameras, lidars, and radars are measured and stored by the first computer 901. The information on positions include the 3-dimensional positions of points on the devices and information on all directions, such as the devices' emitting and/or receiving directions. It should be noted that the captured digital images of floors, walls, doors and fixtures may be matched with the images in the 3-dimensional map which are created with better measurements, and the positions of the cameras, lidars and radars may be more precisely determined by the first computer 901.

In Step 805, each marked vehicle of the restaurant is assigned a unique ID. The ID numbers of the marked vehicles are stored in the first computer 901. The markings on the marked surfaces of the marked vehicles are configured to be mutually different, so that one marking is never geometrically similar to another. The information on the marking of the marked vehicle with any particular ID number is stored in the first computer 901. The information on the position of the marking relative to the first support component 152 of any marked vehicle 103X (or 103Y, or 103Z) is stored in the first computer 901. As previously described, the marking of a marked vehicle comprises three circles, which do not overlap with each other, and which do not overlap with other parts of the marking. The center of the first circle will be referred to as the first distinguished point of the marked vehicle; the center of the second circle will be referred to as the second distinguished point of the marked vehicle; and the center of the third circle will be referred to as the third distinguished point of the marked vehicle. The locations of the three distinguished points of each marked vehicle relative to the first support component 152 of the marked vehicle 103X (or 103Y, or 103Z) is stored in the first computer 901. The information of the first color, the second color, and the third color of the vehicles are also stored in the first computer 901. Furthermore, the radius of the first and second drive wheels, and the location of the first drive wheel of each marked vehicle relative to the three distinguished points is stored in the first computer 901; and if the marked vehicle is placed on a flat floor, then the height of each distinguished point to the flat floor is known to the first computer 901 (as the first drive wheel touches the flat floor).

Thus, the first computer 901, with a generic algorithm, can figure out the position of the first support component 152 and thus the location of the first drive wheel of the marked vehicle from the position of the marking of the marked vehicle. That is because, the marking is rigid relative to the first support component 152 of the marked vehicle 103X (or 103Y, or 103Z), and positions of three non-collinear points of a rigid body determines the position of the rigid body. The three distinguished points of each marked vehicle are configured to be non-collinear. Thus, the position of the first support component 152 of the marked vehicle 103X (or 103Y, or 103Z) is uniquely determined by the positions of the three distinguished points, as the first support component 152 is fixed relative to the three distinguished points.

In Step 806, firstly create a dense net of points on the floors of the restaurant; wherein the dense net may optionally be a rectangular net, or hexagonal net or other type of net. Store the dense net in the first computer 901. Then (manually or otherwise) move a marked vehicle 103X (or 103Y, or 103Z) on the floor and stop until the central axis of the vehicle passes through each point of the dense net. Place the marked vehicle in various orientations (by rotating the vehicle on the floor in small incremental angle), while keeping the central axis passing through the point of the dense net, and let the lidars, radars and cameras capture digital images of the marked vehicle. The digital images, together with the position of the point of the net, are sent to the first computer 901. Then measure the positions of the three distinguished points and store the information of the positions in the first computer 901. In some cases, such as when the marked vehicle is on a flat floor, from the information of the digital images captured by a camera, one may compute the positions of the three distinguished points (more on this later); and in such cases, the cameras and the first computer 901 may be tools for measurements.

In Step 807, each employee is assigned a unique ID, and the information of the employees and their IDs are stored in the first computer 901. The images of all employees captured by cameras, lidars and radars are stored in the computer system together with the employees' IDs. The first computer 901 comprises a program to build a 3D representation of the employee and store the representation in the computer's memory.

In Step 808, with no human and no vehicle in the restaurant, let cameras, lidars and radars capture images in their ranges, and store the images in the first computer 901. Do this under various light conditions, by turning on various sets of lights in the restaurant. Do this during different times of the day, and under various weather conditions.

The marking of a marked vehicle is configured to be unique, so that a digital image of the marking fully captured by a camera is always geometrically not similar to a digital image of the marking of a different marked vehicle captured by any camera from any direction, under the assumption that the digital images occupy a minimum area in the image frames. Such difference should be recognizable by the image analysis program of the first computer 901, provided that the cameras have good enough resolutions and the first computer 901 has good enough capabilities. The minimum for the areas can be chosen arbitrarily; but, when the minimum is set low, high requirements are needed for the resolutions of the cameras and the capabilities of the first computer 901.

A digital image captured by a camera is two-dimensional, and each point in the image frame can be described by two real-valued coordinates. The image frame of a camera may be a rectangle, or a sphere or hemisphere, or of other shape, depending on the type of the camera. Our technique works with all types of cameras. When the image of the marking of a marked vehicle is captured by the camera and sent to the first computer 901, the coordinates of three distinguished points of the marked vehicle may be computed using the image analysis program of the first computer 901.

Figure 26:
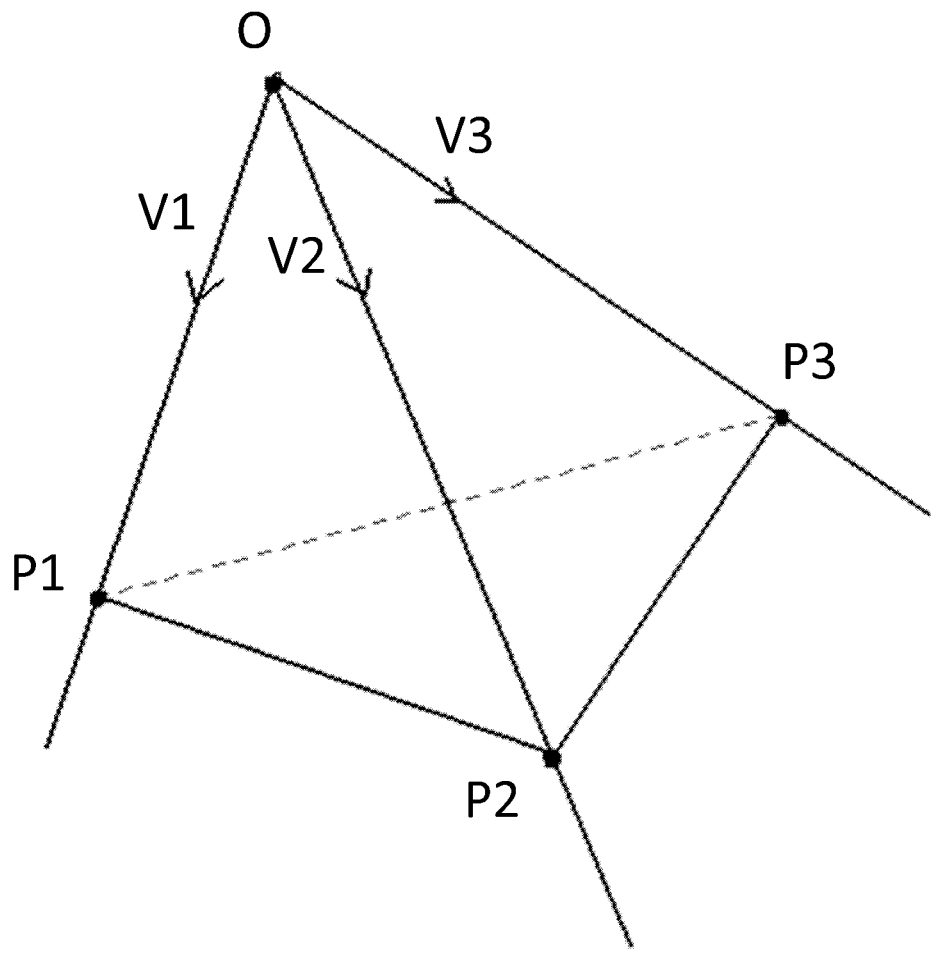
FIG. 26 is an abstract view of positions of three distinguished points of a marked vehicle in a triangular cone in a 3-dimensional map.

Assuming a camera can view the marking from above so that the orientation angles (as measured from horizontal plane) of the line from any point of the marking to the camera sensor is bigger than a minimum threshold (say, at least 30 degrees), using the information of the position of the camera relative to the floors of the restaurant, it is possible to compute the positions of the three distinguished points of the marked vehicle. From the coordinates in the image frame of the three distinguished points, the first computer 901 can build a triangular cone in the 3-dimensional map as mentioned above, so that the three distinguished point lies respectively on the first, second and third edge of the triangular cone. See FIG. 26. Let $P_1$, $P_2$, $P_3$ denote the points in the 3-dimensional map representing the three distinguished points. Let O denote the apex of the cone, wherein the apex represents a point which is determined by image sensor of the camera. Let k denote 1, 2, or 3. Then, we have, $P_k = O + x_k V_k$; where $x_k$ is positive yet unknown at the moment, and $V_k$ is the unit vector parallel to the k-th edge of the triangular cone, in the direction from the apex to a point on the edge. These unit vectors $V_k$ are determined by the coordinates in the image frame of the distinguished points, and they can be computed by the first computer 901 using the information on the position of the camera.

Let (i,j) be a pair of integers, where (i,j)=(1,2), (2,3) or (3,1). Then we have, distance $(P_i, P_j) = D_{ij}$, where $D_{ij}$ is the distance between the i-th and j-th distinguished points, and is stored by the first computer 901 (by Step 805). Equivalently, we have, $$|x_i V_i - x_j V_j|^2 = D^2_{ij},$$

where $|x_i V_i - x_j V_j|$ denotes the length of the vector $x_i V_i - x_j V_j$. We have three equations and three positive unknowns $x_1$, $x_2$, $x_3$, all of which are positive. These equations are quadratic polynomial equations in the three unknowns, and elementary computational methods can be used to solve them as to obtain one or more solutions for the triple $(x_1, x_2, x_3)$. If there is exactly one solution, then the positions of the three distinguished points are represented by $P_k = O + x_k V_k$. If so, the method can be used in measuring the positions of the three distinguished points of a marked vehicle from the images of the marking taken by a camera. If there are more than one solutions to the above equations, then the first computer 901 may further use the information of the orientation sensor 91A which is sent to the first computer 901 through the second computer 902 of the marked vehicle. The Newton's gravitational vector −gN, wherein N represents the unit vector in the vertical direction and g is the magnitude of the gravitational vector, can be represented by a vector in the 3-dimensional coordinate system comprising the central axis and the forward moving axis of the marked vehicle (and a third axis which is perpendicular to both the central axis and the forward moving axis), and the vector may be derived from the information of the orientation sensor. On the other hand, the vector $P_j - P_i$ in the 3-dimensional coordinate system can be figured out via elementary computations. Thus, $A_{ij} = (P_j - P_i) \cdot N$ can be derived by the information of the orientation sensor. Clearly, $$x_j(V_j \cdot N) - x_i(V_i \cdot N) = A_{ij}.$$

Exactly one solution for the triple $(x_1, x_2, x_3)$ can be found to satisfy the last two sets of equations, and thus, the positions $P_k = O + x_k V_k$ of the distinguished points represented in the 3-dimensional map of the first computer 901 are figured out.

In Step 809, the first computer 901 is configured to store a computational program to use the coordinates of the images of the three distinguished points of a marked vehicle in the image frame of a camera, to build the above described cone, and use the above described methods to obtain the true values for $x_1$, $x_2$, $x_3$; and then determine the positions of the three distinguished points of the marked vehicle, $P_k = O +$ $x_k V_k$, in the above described 3-dimensional map. In addition, from the colors of the first circle, second circle and third circle on the marked surface, the first computer 901 may determine the ID of the marked vehicle.

The heights of the cameras from the floors should be limited to under a certain height from floors so that the cameras can have a good view of the markings of the marked vehicles underneath; and the markings should be bigger than a certain area size. If ceiling beams are too high, then one may use rigid connectors from ceiling beams to the cameras, as to fixedly mount the cameras at desired heights. The tracking System 209 is configured so that the cameras are so dense so that the marking of the marked surface of a marked vehicle on the floors of the restaurant is always entirely in the range of a camera, and that the orientation angles (as measured from horizontal plane) of the light line from any point of the marking to the camera sensor is higher than a certain angle; wherein the certain angle is configured to be sufficiently close to 90 degrees, so that the above mentioned computational program using images captured by at least one of the cameras can yield more accurate solution for the position of any marked vehicle on the floors of the restaurant.

A sequence of digital images captured by a camera over varying times may be used to figure out the direction and speed of the motion of the three distinguished points on the marked vehicle.

When the cameras 91D and 91E capture digital images of a dining table and sent the information to the first computer 901, the first computer 901 can map the position of the dining table in the above mentioned 3-dimensional map. The dining tables may or may not be movable. In case a dining table is movable, the first computer 901 may track the movement by two means. First means: we may place some markings on the dining tables, similar to the markings on the marked vehicles, and we may identify the dining tables by analyzing the images of the markings captured by the cameras. Second means: the first computer 901 may dynamically track the movement of each dining table, using the image analysis program of the first computer 901.

The cameras 91D and 91E may also capture digital images of other objects in the building 206 and send the digital images to the first computer 901. Optionally, all movable objects of larger sizes, such as chairs, may be marked with markings, so that the first computer 901 may recognize them by working with the images of the markings captured by the cameras.

When a marked vehicle is moving on the floors of the restaurant, the marked vehicle should avoid running into other objects in the restaurant, whether a human or a non-human.

As shown in FIG. 27A, from the moment when the automated restaurant opens its doors to any person (whether customer or employee), until the automated restaurant closes. the following tasks are performed.

In Step 811, the first computer 901 is programmed to continuously analyze the digital images as to continuously analyze digital images captured by lidars, radars and cameras to classify all movable objects, including vehicles and persons. The first computer 901 is programmed to continuously analyze the digital images as to continuously determine the positions of all movable objects, and to determine if the movable object is a person, a vehicle or other object. The first computer 901 is programmed to continuously analyze the digital images to determine if a person is entering the area 207 or if a person is leaving the area 207.

In Step 812A, the first computer 901 is programmed to continuously analyze the digital images in combination with ordering, food serving, and payment information if person has placed an order, and if the person has been fully served the ordered food, and if the person has fully paid for an order placed. The first computer 901 is configured to store the following lists: "$1^{st}$ list," which lists persons in the area 207 who has not placed an order; "$2^{nd}$ list," which lists persons who placed orders but the orders are not fully serviced or not fully paid; "$3^{rd}$ list," which lists persons in the "$2^{nd}$ list" who is not in the area 207; "$4^{th}$ list," which lists of persons in the area 207 whose orders are fully serviced and fully paid. Do all of the above until the restaurant closes.

In Step 812B, the first computer 901 is configured to dynamically track the customers in the $1^{st}$ list, the $2^{nd}$ list and $3^{rd}$ list. When the food ordered by a customer is cooked, the computer 901 is configured to order a vehicle to take the food from a cooking station in the kitchen and to move the food from the kitchen to a location near the location of the customer at time of food delivery.

Figure 27B:
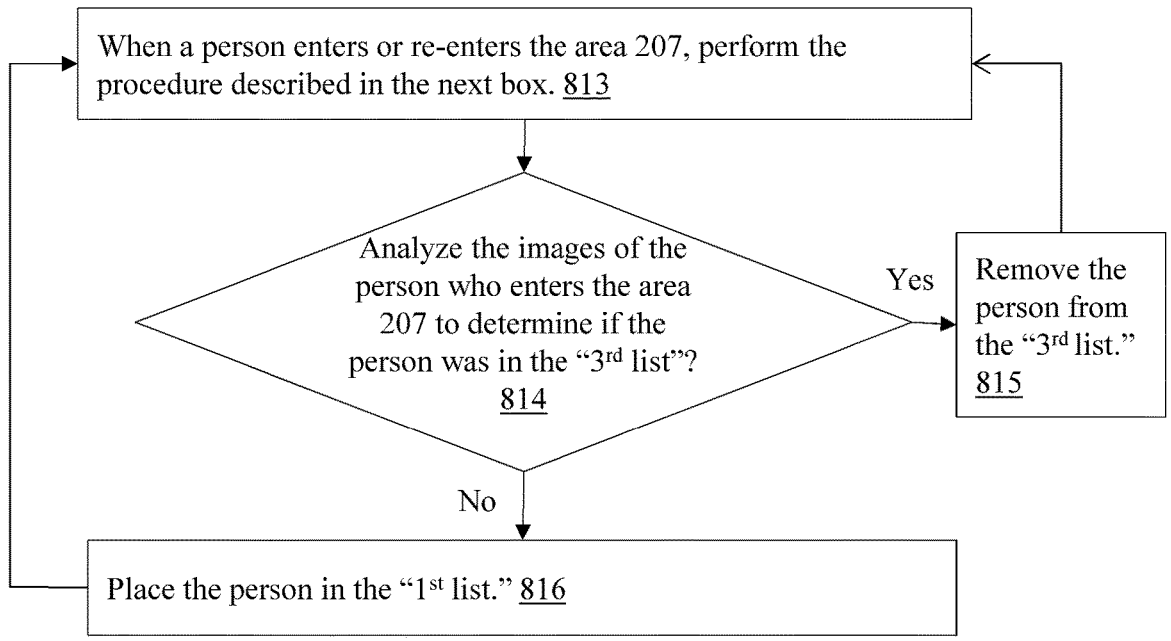

As shown in FIG. 27B, whenever a person enters or re-enters the customer-tracking area 207, the first computer 901 is configured to analyze the digital images of the person captured by various cameras and lidars as to determine if the person was in the "$3^{rd}$ list" before the person enters (or re-enters) the area 207 (Steps 813 and 814). If yes, the first computer 901 may remove the persons form the "$3^{rd}$ list" (Step 815); if not, the first computer 901 may place the person in the "$1^{st}$ list" (Step 816). Steps 813 and 814 are performed non-stop until the restaurant closes. The lidar 91C which is mounted on an outside wall of the restaurant (see FIG. 19E) is used to track the motion of the customer from the moment the customer leaves the customer-tracking area 207 until the customer enters the area 207. The information captured by the lidar can be used to identify the customer among the persons entering the area 207.

Figure 27C:
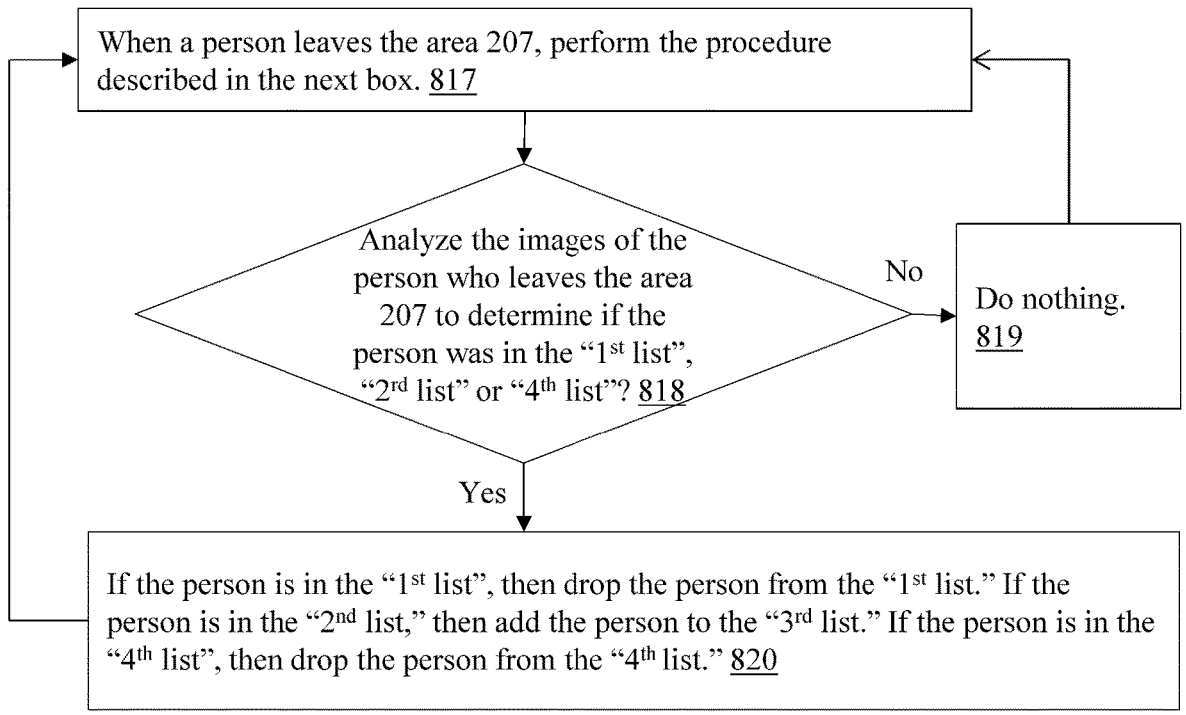

As shown in FIG. 27C, whenever a person leaves the customer-tracking area 207, the first computer 901 is configured to analyze the digital images of the person captured by various cameras as to determine if the person was in the "$1^{st}$ list," the "$2^{nd}$ list," or the "$4^{th}$ list." If the answer is no, then the person must be an employee who entered the area before the restaurant opens, and nothing needs to be done (Step 819). Otherwise, if the person was in the "$1^{st}$ list" or in the "$4^{th}$ list," then the person is dropped from the "$1^{st}$ list." If the person was in the "$2^{nd}$ list," then add the person in the "$3^{rd}$ list" (Step 820). Steps 817 and 818 are performed non-stop until the restaurant closes.

Referring to FIG. 28, the following tasks are dynamically performed prior to using a marked vehicle to receive containers of cooked food from a cooking station, then transport the containers to the table where the customer who ordered these.

In Step 821, store the positions of the support components 237 and 494 of each cooking station in the first computer 901 and second computers 902. Store the "receiving position" of each vehicle, i.e. the position at which the marked vehicle may receive food containers from the dish loading apparatus 420 of each cooking stations, in the first computer 901 and second computers 902.

In Step 822, divide the dining area into furniture area and walkway area, wherein the furniture area may be occupied by dining tables and chairs and the walkway area may be used by customers to walk or for marked vehicles to move as to transport the containers of cooked food to the dining tables. The computers 901 and 902 are configured to store the map of the division. The first computer 901 is programmed to plan possible major routes for the marked vehicles from each receiving position to each part of the dining area using the digital images of the dining area captured by lidars, radars and cameras. The planned maps of the major routes are then stored in the first computer 901 and second computers 902.

In Step 823, store the information of the marked plates 138a, 138b, 138c, 138d etc., of the building 206 in the second computers 902.

In Step 824, measure the positions the marked plates 138a, 138b, 138c, 138d etc., in the above mentioned 3-dimensional map, and then store the information in the second computers 902.

In Step 825, measure the positions of the sensors 91A, 91K, 91X and 91Y of each vehicle, and store the information in the second computer 902 of the vehicle.

In Step 826, measure the positions of the cameras 91D and 91E of each vehicle, and store the information in the second computer 902 of the vehicle.

Referring to FIG. 29, the following tasks are performed in step when the containers of cooked food that customers ordered are need to be transported by a marked vehicle.

In Step 831, the first computer 901 schedules a task for a marked vehicle to receive containers of cooked food from specific cooking stations, then transport the containers to a position near (the table used by) the customer who ordered these. In particular, the first computer 901 assigns a container holder on the marked vehicle for each container of cooked food to be transported.

In Step 832, the first computer 901 dynamically analyze digital images in the automated restaurant captured by lidars, radars and cameras using the image analysis program of the first computer 901 as to determine a route for the marked vehicle from the current position to the cooking stations, and then to the table.

In Step 833, the first computer 901 informs the second computer 902 of the marked vehicle of the route, and timing for the marked vehicle to stop at the cooking stations in order to receive containers of cooked food.

In Step 834, the sensors of the marked vehicle are in operation from this moment until the scheduled task is finished. Moreover, the sensors are connected to the second computer of the marked vehicle as to continuously send signals to the second computer 902, during the sensors of the marked vehicle are in operation.

In Step 835, the second computer 902 determines the next move for the marked vehicle according to receiving the signals of the sensors of the marked vehicle, and then sends signals to the motors 81A and 81B to rotate anti-synchronously for an angle, so that the moving direction agrees with the moving direction of the assigned route at that position.

In Step 836, the first computer 901, relying on the image analysis program, determines the length of "safe distance" on the route for the marked vehicle to move from the current position, and sends this information to the second computer 902 of the marked vehicle.

In Step 837, the second computer 902 sends signals to the motors 81A and 81B to move synchronously by an angle so that distance traveled by the marked vehicle is less than the "safe distance".

In Step 838, go back to Step 835, and repeatedly performed Steps 835 to 837, until the scheduled task for the marked vehicle is finished.

Figure 30:
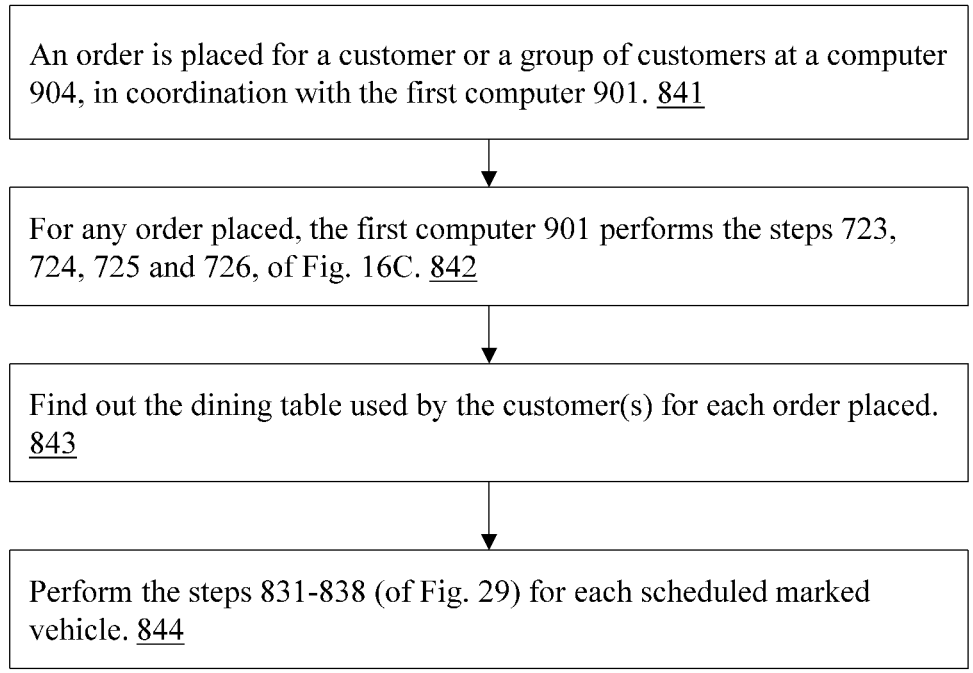
FIG. 30 is a flow chart showing a process of the automated restaurant when an order is placed by a customer.

Referring to FIG. 30, the following tasks are performed in steps when an order (of food items) is placed by a customer.

In Step 841, an order is placed for a customer or a group of customers at a computer 904, which is configured to be in communication with the first computer 901. In particular, any order made at the computer 904 is sent to the first computer 901.

In Step 842, for any order placed, the first computer 901 performs the steps 723, 724, 725 and 726, of FIG. 16C. the first computer 901 is configured to control various apparatuses and mechanisms and devices in the automated kitchen, as to complete the cooking process of the ordered food.

In Step 843, the computer 901 is configured to dynamically analyze the digital images of the customers captured by various lidars, radars and cameras, as to find out the ID of the dining table used by each customer(s).

In Step 844, perform the steps 831-838 (of the flowchart in FIG. 29). When a marked vehicle is scheduled by the first computer 901, the first computer 901 may send the information of the dining table to the second computer 902 of the scheduled marked vehicle.

As shown in FIG. 31, when an automated restaurant is open, the automated restaurant 170 is configured to perform the following steps.

Step 851, a customer goes into the customer-tracking area 207 of the automated restaurant 170. He/she may place an order in the customer-tracking area 207, using a computer 904. The cameras, lidar and radars may capture digital images of the customer and send the information to the first computer 901. The first computer 901 comprises programs to analyze the digital images captured by the tracking system 209 of the automated restaurant 170 as to track the customer.

Step 852, the first computer 901 tracks the dynamical motion of the person, so that the first computer 901 may determine the position of the person, and/or the ID of the table used by the customer.

Step 853, the first computer 901 schedules the cooking of each food ordered at a cooking station 150 and sends signals to the electrical or electronic devices of automated kitchen 160 as to cook the food at the cooking station.

Step 854, the first computer 901 schedules delivery of cooked food from a cooking station to a position near the customer, or near the table used by the customer. The marked vehicle 103X (or 103Y, 103Z) of the dish transport system 208 is used to move to a proper position relative to the support frame 237 of the cooking station 150 of the automated kitchen 160, so that: the dish loading apparatus 420 may grip the food container 182 and transfer it to a container holder 159 of the marked vehicle 103X (or 103Y, 103Z).

Step 855, the dish loading apparatus 420 of the cooking station 150 grips the food container 182 on the turntable 566 of the receiving apparatus 507 and transfer it to a container holder 159 of the marked vehicle 103X (or 103Y, 103Z) of the dish transport system 208.

Step 856, the marked vehicle 103X of the dish transport system 208 transfers the food container 182 from the kitchen room to a position near the table 204 which is used by the customer.

Step 857, a person may remove the container(s) of cooked food(s) from the marked vehicle 103X (or 103Y, 103Z). The vehicle then moves to a storage area, or to work on the next task.

As shown in FIG. 32, when an automated restaurant is open, the automated restaurant 170 is configured to perform the following steps with cooperation of a customer.

Step 861, a smart phone 906 used by a customer may be connected automatically to a WIFI network; and the computer 901 is also connected to the same WIFI network. The smart phone 906 can be owned by the customer.

Step 862, each QR code on the displays 219 has a unique specific information identifying the location of the QR code and thus the location of the display 219 containing the QR code. A customer may use a first program in the smart phone 906 to scan the QR code on a display 219 that is fixedly attached on a table (FIG. 21C and FIG. 21A) or on a wall. The scanning of the QR code will automatically lead the customer to install and/or open a second program in the smart phone; wherein the installation and/or opening of said second program may be conditioned on the customer's acceptance. Said second program is configured to record both the time of the QR code scanning and the specific information contained in the QR code. At the same time, digital images taken by the cameras of the restaurant of the person and of the surroundings of the QR code are saved in the memories of the computer system 903B. In fact, digital images taken by all cameras are saved in the memories of the computer system 903B. The digital images are indexed by the times of their taking. It should be noted that the first program can optionally be a third-party program (although this is not a requirement); and the $2^{nd}$ program can either be a program specifically made for the restaurant operation or a sub-program within the $1^{st}$ program.

Step 863, the second program is further configured to allow a customer to make an order of food items, add food items to an existing order later, and to pay for the order although said payment may optionally be made at a much later time. When the customer places an order or add food items to an existing order or make payment for an order using the 2nd program, the information of the time of the customer's QR code scanning and the specific information contained in the QR code are sent to the computer 901. The details of the order placed are also sent to the computer 901.

Step 864, the computer 901 uses the information received from the smart phone 906 to figure out the time and the location of the display 219 that has the QR code when the customer scanned the QR code; and thus approximate position of the customer at the time of scanning the QR code; and thus the identities of the cameras that can capture the images of the display 219 and the customer at the time.

Step 865, the computer system 903B is configured to analyze the image data as to identify the customer on the various lists of people in the restaurant, and move the customer from the $1^{st}$ list to the $2^{nd}$ list; and also in the $3^{rd}$ list if the customer is temporarily outside of the customer-tracking area 207. If the customer has already made an order before, then the two orders may be merged.

Step 866, the customer is dynamically tracked by the cameras, lidars and computers, as explained before. When the food ordered by the customer is cooked, the food will be sent by a vehicle to a location near the location of the customer at time of food delivery.

It should be noted that a motor in the present patent application may be an AC or DC motor, stepper motor, servo motor, inverter motor, pneumatic or hydraulic motor, etc. A motor may optionally further comprise a speed reducer, encoder, and/or proximity sensor.

It should be noted that the electronic or electric devices, such as radars, lidars, encoders, proximity sensors, infrared sensors, and other types of sensors in the automated restaurant may optionally communicate with the first computer via wireless communication.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Depending on the type of the electrical or electronic device, the connection between a computer and an electrical or electronic device may comprise a wire, a wireless communication device, a controller, a driver, a relay, a breaker, a contractor, and/or a switch, etc. Some of these components may be housed in a cabinet. A connection between a computer and a mechanism may be a wired connection or a wireless connection. The mechanism may comprise a motor and the computer may be configured to control the motion of the motor.

A support component described in the present patent application can be any type of rigid component. A support component may be moved or fixed relative to the ground. A rigid component may comprise one or more of the following: a bar, a tube, a beam, a plate, a board, a frame, a structure, a bearing housing, a shaft. A rigid component can be made by metal such as steel or aluminum, or by other materials, or by a combination of several types of materials.

A wheel in the present patent application always comprises an axis. A drive wheel can be any wheel. The rotation of a drive wheel is often produced by a motor.

Only a few examples and implementations are described. Other implementations, variations, modifications and enhancements to the described examples and implementations may be made without deviating from the spirit of the present invention. For example, the term cookware is used to generally refer to a device for containing or holding food ingredients during cooking. For the purpose of present patent application, a cookware can be a wok, a pot, a pan, a basket, a bowl, a container, a board, a rack, a net, or any object used to contain or otherwise hold food or food ingredients during a cooking process. The cooking also is not limited to any particular ethnic styles. The cooking may include but is not limited to frying (including stir frying), steaming, boiling, roasting, baking, smoking, microwaving etc. The cooking apparatus may or may not use a heater.

Similarly, a food container, ingredient container, or container, can be a bowl, a plate, a cup, ajar, a bottle, a flat board, a basket, a net, a wok, a pan, or any object used to contain or otherwise hold a food or food ingredients. A container can have a rather arbitrary geometric shape.

For the purpose of the present patent application, a connection of a computer (or computer system) and an electric or electronic component may compromise a wired and/or wireless connection between the computer (or computer system) and the electric or electronic device, as to allow the computer to communicate with said electric or electronic component. A connection of a computer (or computer system) and a mechanism or apparatus may comprise a wired and/or wireless connection between the computer (or computer system) and some (or all) of the electric or electronic components of the mechanism or apparatus as to allow the computer to communicate with said electric or electronic components.

What is claimed is:

1. A restaurant, comprising:
a computer system comprising a first computer;
one or more cooking stations each comprising a cookware configured to contain or otherwise hold a food or a food ingredient;
a plurality of ingredient containers each configured to contain or hold a food ingredient;
a plurality of food containers each configured to contain or hold a food;
a storage configured to store a number of said ingredient containers;
a customer-tracking area comprising a dining area;
a plurality of vehicles each configured to transport a said food container, wherein each said vehicle comprises:
a support component;
a first drive wheel configured to be rotatable relative to the support component;
a second computer;
a first motor configured to drive the motion of the first drive wheel;
a connection of the second computer to the first motor to allow the second computer to control the first motor; and
a battery; and
a plurality of digital cameras configured to capture digital images of objects in the restaurant, each said digital camera being configured to be connected to the computer system as to allow the computer system to receive digital images from the digital camera;
wherein the computer system is programmed to analyze the digital images captured by the cameras;
wherein the computer is programmed to dynamically compute the position of a person (if any) in the customer-tracking area.

2. The restaurant of claim 1, wherein the computer system is programmed to track a customer (if any) who has placed an order of a number of food items.

3. The restaurant of claim 1, wherein each said vehicle further comprises:
a second drive wheel;
a second motor configured to drive the motion of the second drive wheel; and
a connection of the second motor to the second computer of the vehicle.

4. The restaurant of claim 1, wherein at least one of the cooking stations further comprises a motion mechanism configured to move the cookware to dispense a cooked food from the cookware, said motion mechanism comprising a motor, wherein said motor is configured to be connected to the computer system as to allow the computer system to control the motor.

5. The restaurant of claim 1, further comprising a transfer apparatus configured to transfer a said ingredient container from the storage, said transfer apparatus being configured to be connected to the computer system as to allow the computer system to control said transfer apparatus, said transfer apparatus comprising:
a gripping mechanism comprising a support component and one or more gripping devices, said gripping mechanism being configured to grip the ingredient container; and
a motion mechanism comprising a motor, said motion mechanism being configured to move the support component of the gripping mechanism.

6. The restaurant of claim 1, wherein at least one of the cooking stations further comprises a dish loading apparatus configured to move a said food container from the cooking station to a said vehicle, said dish loading apparatus comprising:
a gripping mechanism comprising a support component and one or more gripping devices, said gripping mechanism being configured to grip the food container;
a connection of the gripping mechanism with the computer system as to allow the computer system to control the gripping mechanism;
a motion mechanism comprising a motor, said motion mechanism being configured to produce a motion of the support component of the gripping mechanism; and
a connection of the motion mechanism with the computer system as to allow the computer system to control the motion mechanism.

7. The restaurant of claim 1, wherein at least one of the cooking stations further comprises a dish loading apparatus configured to move a said food container from the cooking station to a said vehicle, said dish loading apparatus comprising:
a gripping mechanism comprising a first support component and one or more gripping devices, said gripping mechanism being configured to grip the food container;
a connection of the gripping mechanism with the computer system as to allow the computer system to control the gripping mechanism;
a first motion mechanism comprising a second support component and a motor, said first motion mechanism being configured to produce a motion of the first support component relative to the second support component;
a connection of the first motion mechanism with the computer system as to allow the computer system to control said first motion mechanism;
a second motion mechanism comprising a third support component and a motor, said second motion mechanism being configured to produce a motion of the second support component relative to the third support component; and
a connection of the second motion mechanism with the computer system as to allow the computer system to control said second motion mechanism.

8. The restaurant of claim 1, wherein each vehicle further comprises one or more container holders, wherein each container holder is configured to position or hold a said food container.

9. The restaurant of claim 1, wherein the computer system further comprises a third computer that is located in the customer-tracking area, said third computer configured to be used by a person to place an order of a number of food items and/or to pay for the order, said third computer being configured to be connected to the computer system to allow the computer system to communicate with the third computer.

10. The restaurant of claim 1, wherein the computer system is programmed to:
take an order of a number of food items;
schedule the cooking of a said food item at a said cooking station;
control the automated kitchen to cook said food item; and
schedule a said vehicle to transport the food item, after it is cooked, from the cooking station to a position near the customer, or to a position near the table (if any) used by the customer.

11. The restaurant of claim 1, further comprising:
a lidar configured to dynamically take digital images of the customer-tracking area; and a connection of the lidar to the computer system to allow the lidar to send the digital images of the lidar to the computer system.

12. The restaurant of claim 1, wherein at least one of the cooking stations further comprises an ingredient dispensing apparatus configured to dispense food ingredients from an ingredient container to the cookware, said ingredient dispensing apparatus comprising:
a gripping mechanism comprising a support component and one or more gripping devices, said gripping mechanism being configured to grip the ingredient container; and
a motion mechanism comprising a motor, said motion mechanism being configured to move the support component of the gripping mechanism.

13. A restaurant, comprising:
a computer system comprising a first computer;
a plurality of ingredient containers each configured to contain or hold a food ingredient;
a plurality of food containers each configured to contain or hold a food;
one or more cooking stations each said cooking station comprising a cookware configured to contain or otherwise hold a food or a food ingredient;
a storage configured to store a number of said ingredient containers;
a customer-tracking area comprising a dining area;
a plurality of vehicles each configured to transport a said food container, wherein each said vehicle comprises:
a support component;
a first drive wheel configured to be rotatable relative to the support component;
a second computer;
a first motor configured to drive the motion of the first drive wheel;
a connection of the second computer to the first motor; and
a battery;
a dish loading apparatus configured to move a said food container from a said cooking station to a said vehicle, said dish loading apparatus comprising:
a gripping mechanism comprising a support component and one or more griping devices, said gripping mechanism being configured to grip said food container;
a motion mechanism comprising a motor, said motion mechanism being configured to produce a motion of the support component of the gripping mechanism; and
a connection of the motion mechanism with the computer system as to allow the computer system to control said motion mechanism; and
a lidar configured to capture three-dimensional digital images of objects in the restaurant, wherein the lidar is configured to be connected to the computer system as to allow the computer to receive said digital images;
wherein the computer system is programmed to analyze the digital images captured by the lidar; wherein the computer system is configured to dynamically compute the position of a person (if any) in the customer-tracking area;
wherein the computer system is programmed to take an order of a number of food items;
wherein the computer system is programmed to schedule the cooking of said food items.

14. The restaurant of claim 13, wherein one of the cooking stations further comprises an ingredient dispensing apparatus configured to dispense food ingredients from a said ingredient container to the cookware, said ingredient dispensing apparatus comprising a gripping mechanism comprising a support component and one or more gripping devices, said gripping mechanism being configured to grip the ingredient container; and
a motion mechanism comprising a motor, said motion mechanism being configured to move the support component of the gripping mechanism.

15. The restaurant of claim 13, further comprising a transfer apparatus configured to transfer a said ingredient container from the storage, said transfer apparatus comprising:
a gripping mechanism comprising a support component and one or more gripping devices, said gripping mechanism being configured to grip the ingredient container; and
a motion mechanism comprising a motor, said motion mechanism being configured to move the support component of the gripping mechanism.

16. Restaurant, comprising:
a computer system comprising a computer;
one or more cooking stations each said cooking station comprising:
a cookware configured to contain or otherwise hold a food or a food ingredient;
a motion mechanism configured to move the cookware to dispense a food from the cookware, wherein the motion mechanism comprises a motor which is connected to the computer system to allow the computer system to control said motor; and
an ingredient dispensing apparatus configured to dispense food ingredients from a said ingredient container to the cookware, said ingredient dispensing apparatus comprising a motor configured to be connected to the computer system as to allow the computer system to control said motor, said dispensing apparatus comprising:
a gripping mechanism comprising a support component and one or more gripping devices, said gripping mechanism being configured to grip the ingredient container; and
a motion mechanism comprising a motor, said motion mechanism being configured to move the support component of the gripping mechanism;
a storage configured to store a number of said ingredient containers;
a customer-tracking area comprising a dining area;
a plurality of vehicles configured to transport cooked foods, wherein each vehicle comprises:
a support component;
a first drive wheel configured to be rotatable relative to the support component;
a first motor configured to drive the motion of the first drive wheel;
a second computer configured to receive wireless signals from the computer system;
a connection of the second computer to the first motor; and
a battery; and
a plurality of digital cameras each configured to capture digital images of objects in the restaurant, wherein each said digital camera is configured to be connected to the computer system as to allow the computer system to receive the digital images from the digital camera; and
wherein the computer system is programmed to analyze the digital images captured by the cameras;

wherein the computer system is configured to dynamically compute the position of a person (if any) in the customer-tracking area;

wherein the computer system is programmed to take an order of a number of food items;

wherein the computer system is programmed to schedule the cooking of the food items in said order.

17. The restaurant of claim 16, further comprising a lidar configured to dynamically take digital images of the customer-tracking area and a connection of the lidar to the computer system to allow the lidar to send said digital images to the computer system.

18. The restaurant of claim 16, wherein at least one of the cooking stations further comprises a dish loading apparatus configured to move a said food container from the cooking station to a said vehicle, said dish loading apparatus comprising:
- a gripping mechanism comprising a support component, said gripping mechanism being configured to grip a food container;
- a connection of the gripping mechanism with the computer system;
- a motion mechanism comprising a second support component, said motion mechanism being configured to produce a motion of the support component relative to the second support component; and
- a connection of the motion mechanism with the computer system to allow the computer system to control the motion mechanism.

19. The restaurant of claim 16, wherein at least one of the cooking stations further comprises a dish loading apparatus configured to move a said food container from the cooking station to a said vehicle, said dish loading apparatus comprising:
- a gripping mechanism comprising a first support component and one or more gripping devices, said gripping mechanism being configured to grip the food container;
- a first motion mechanism comprising a second support component, said first motion mechanism being configured to produce a motion of the first support component relative to the second support component; and
- a second motion mechanism comprising a third support component, said second motion mechanism being configured to produce a motion of the second support component relative to the third support component.

20. The restaurant of claim 16, further comprising a transfer apparatus configured to transfer a said ingredient container from the storage, said transfer apparatus comprising
- a gripping mechanism comprising a support component and one or more gripping devices, said gripping mechanism being configured to grip the ingredient container; and
- a motion mechanism comprising a motor, said motion mechanism being configured to move the support component of the gripping mechanism.

* * * * *